US009427101B2

(12) United States Patent
Abouelsaadat

(10) Patent No.: US 9,427,101 B2
(45) Date of Patent: *Aug. 30, 2016

(54) SYSTEM AND METHOD FOR ENHANCING PRAYER AND HEALING RITUALS

(71) Applicant: Wael Abouelsaadat, Toronto (CA)

(72) Inventor: Wael Abouelsaadat, Toronto (CA)

( * ) Notice: Subject to any disclaimer, the term of this patent is extended or adjusted under 35 U.S.C. 154(b) by 170 days.

This patent is subject to a terminal disclaimer.

(21) Appl. No.: 14/135,781

(22) Filed: Dec. 20, 2013

(65) Prior Publication Data

US 2014/0113260 A1    Apr. 24, 2014

Related U.S. Application Data

(63) Continuation of application No. 12/493,232, filed on Jun. 28, 2009, now Pat. No. 8,647,122.

(60) Provisional application No. 61/076,643, filed on Jun. 28, 2008.

(51) Int. Cl.
  *G09B 19/00* (2006.01)
  *A63B 71/00* (2006.01)
  *A47G 33/00* (2006.01)

(52) U.S. Cl.
  CPC ............. *A47G 33/00* (2013.01); *A47G 33/008* (2013.01); *G09B 19/003* (2013.01)

(58) Field of Classification Search
  CPC ........................ A47G 33/008; A47G 27/0237
  USPC ......................................... 434/245, 250, 256
  See application file for complete search history.

(56) References Cited

U.S. PATENT DOCUMENTS

| 6,336,891 | B1* | 1/2002 | Fedrigon | A63B 22/02 434/247 |
| 6,783,822 | B1* | 8/2004 | Faouaz | A47C 16/04 428/192 |
| 7,508,316 | B1* | 3/2009 | Arrar | A47G 27/0237 340/502 |
| 8,419,538 | B2* | 4/2013 | Mashimo | A63F 13/10 273/148 R |
| 2002/0055419 | A1* | 5/2002 | Hinnebusch | A63B 24/0084 482/8 |
| 2002/0175825 | A1* | 11/2002 | Clerk | B66F 17/003 340/686.6 |
| 2005/0189809 | A1* | 9/2005 | Lombert | A47C 16/04 297/452.26 |
| 2007/0132575 | A1* | 6/2007 | Ellul | G08B 5/38 340/524 |
| 2010/0077261 | A1* | 3/2010 | Jung | G06Q 30/0603 714/48 |
| 2011/0294100 | A1* | 12/2011 | Jamal | A47G 27/0237 434/245 |

* cited by examiner

*Primary Examiner* — Robert J Utama
*Assistant Examiner* — Sadaruz Zaman

(57) ABSTRACT

Interactive prayer systems are provided, which include a pad that is adapted to be repeatedly stepped upon by a user; a first detection means for detecting when the user steps on the pad; a second detection means for detecting, and for creating proximity event data based upon, when the user is standing in proximity of specific areas within the pad; a communications means for communicating touch event data and proximity event data to a computer and a computer program executing on the computer; a display means connected to the computer, which displays the scripture to the user during prayer; and a notification means embedded in the pad for notifying the user when, and if, an error in the user's performance of the one or more prayer rituals is detected by the computer program. Methods of using such interactive prayer systems are also provided.

9 Claims, 63 Drawing Sheets

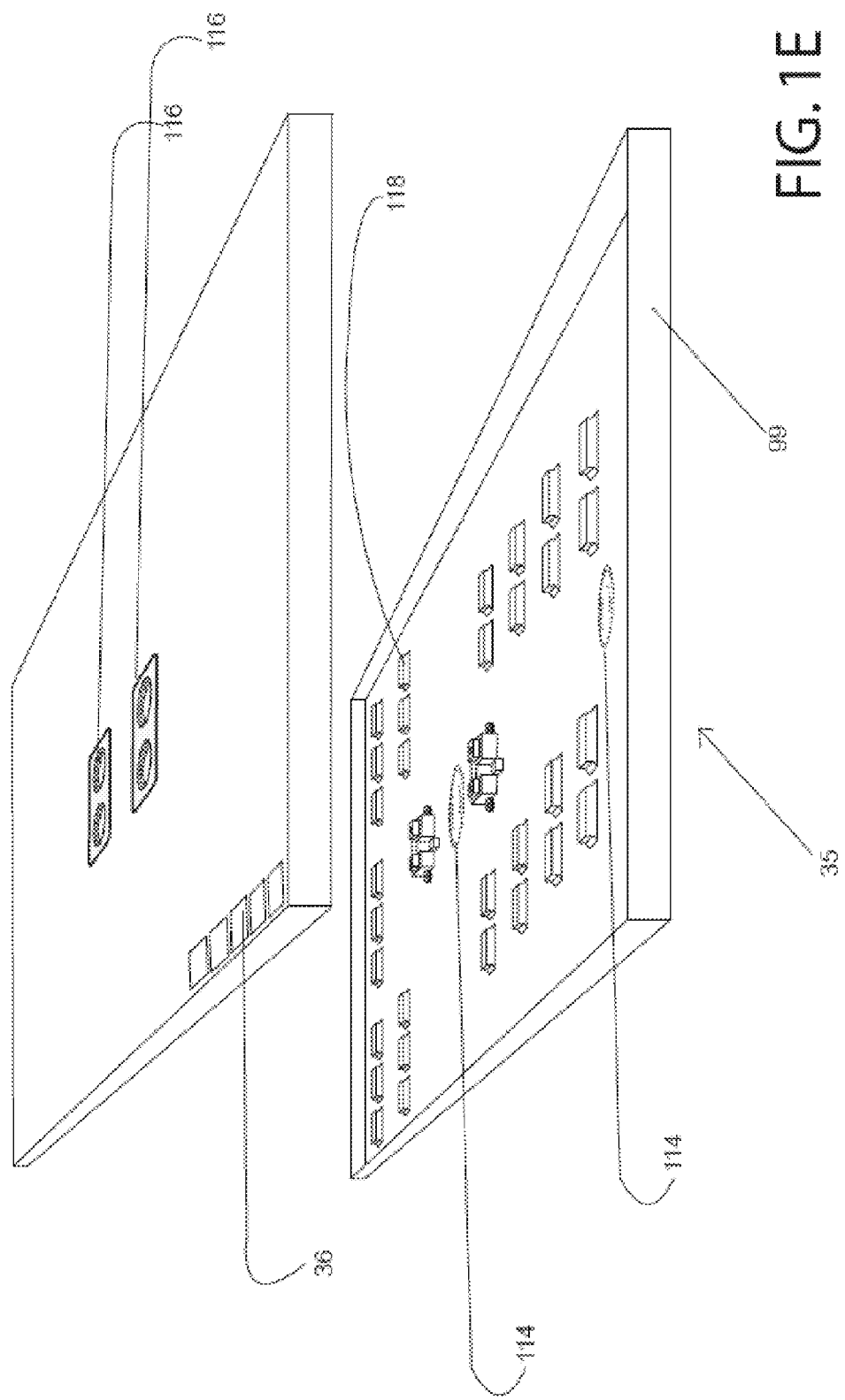

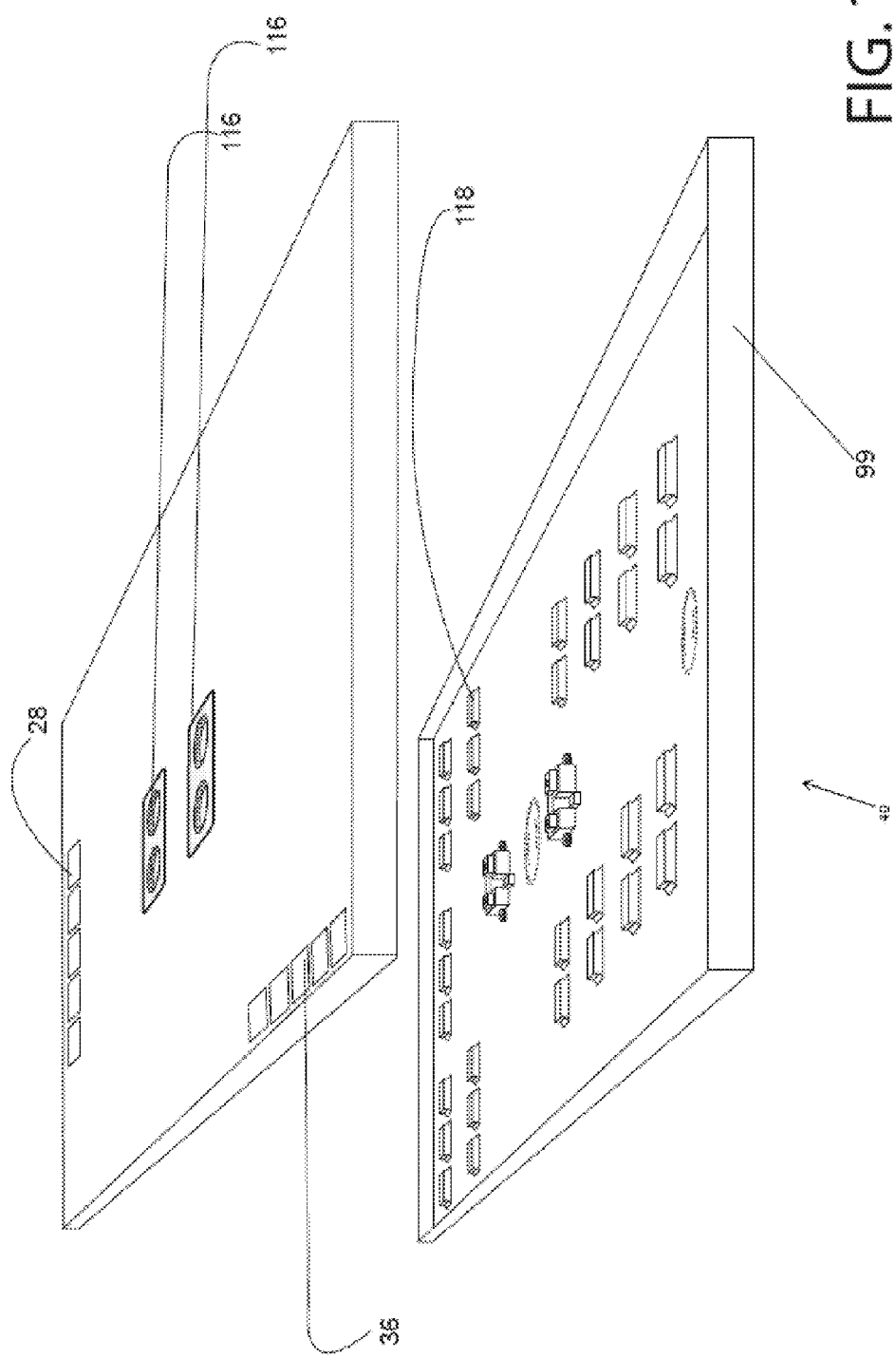

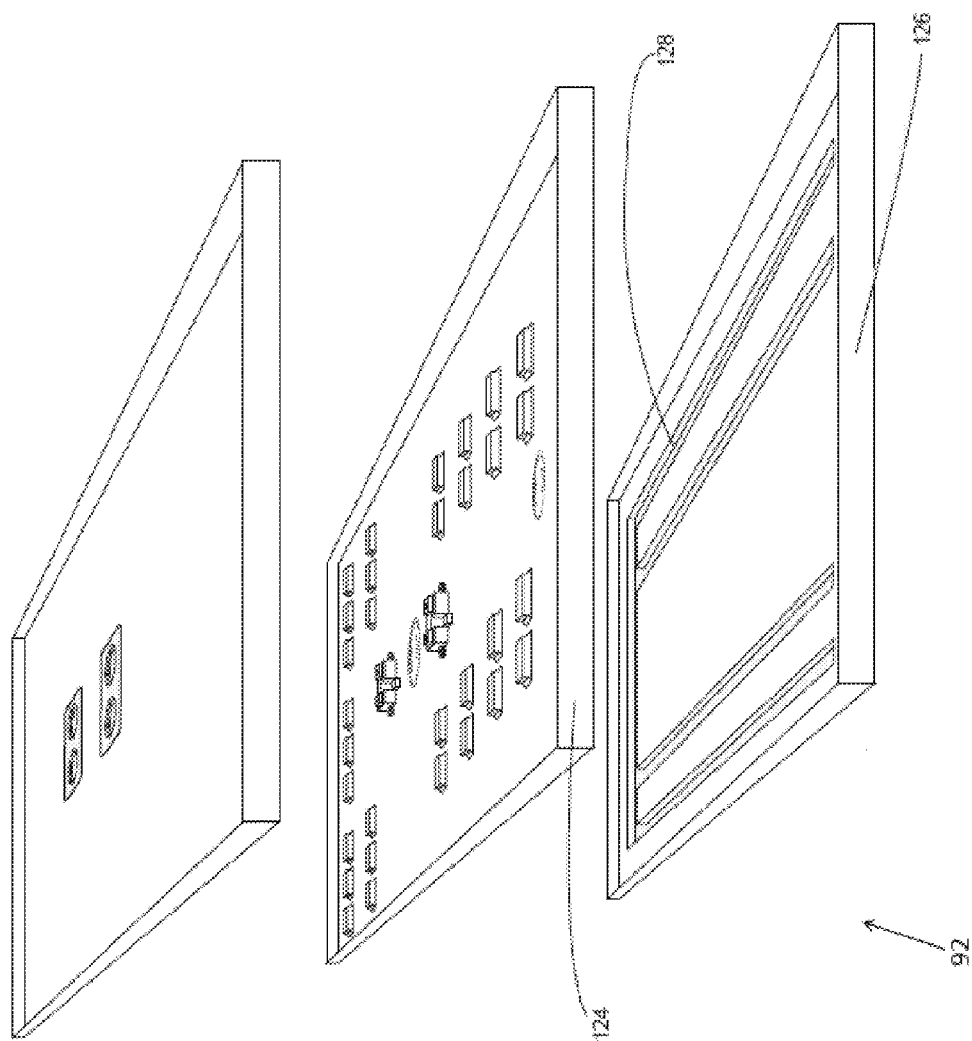

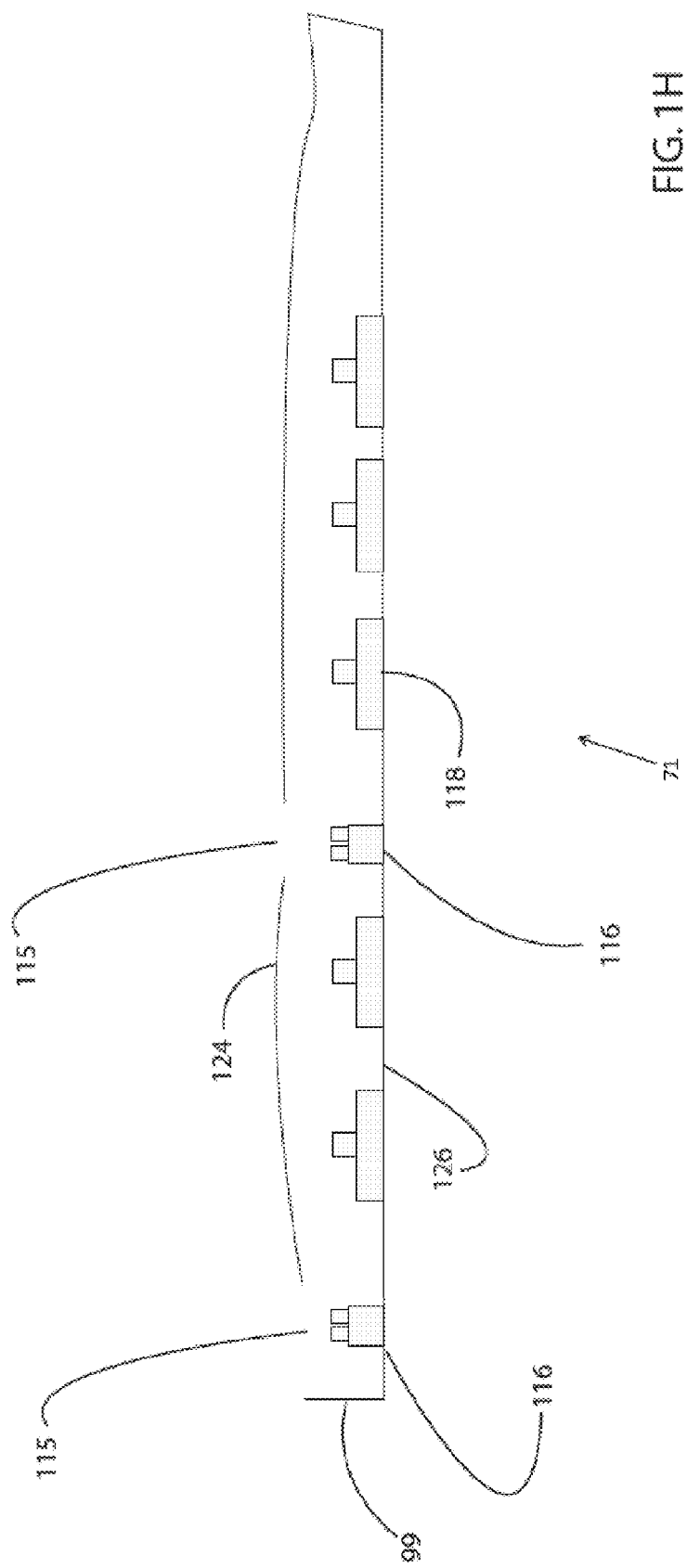

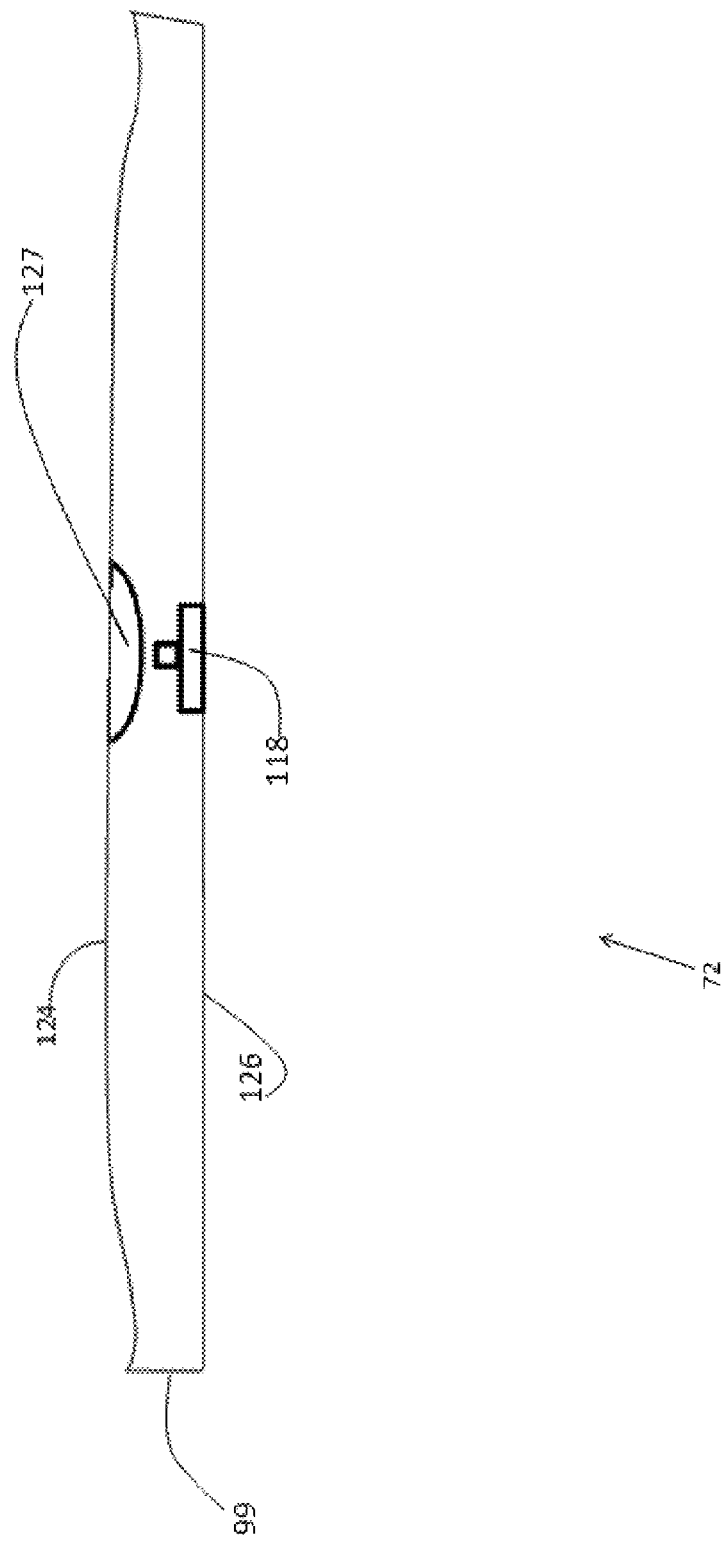

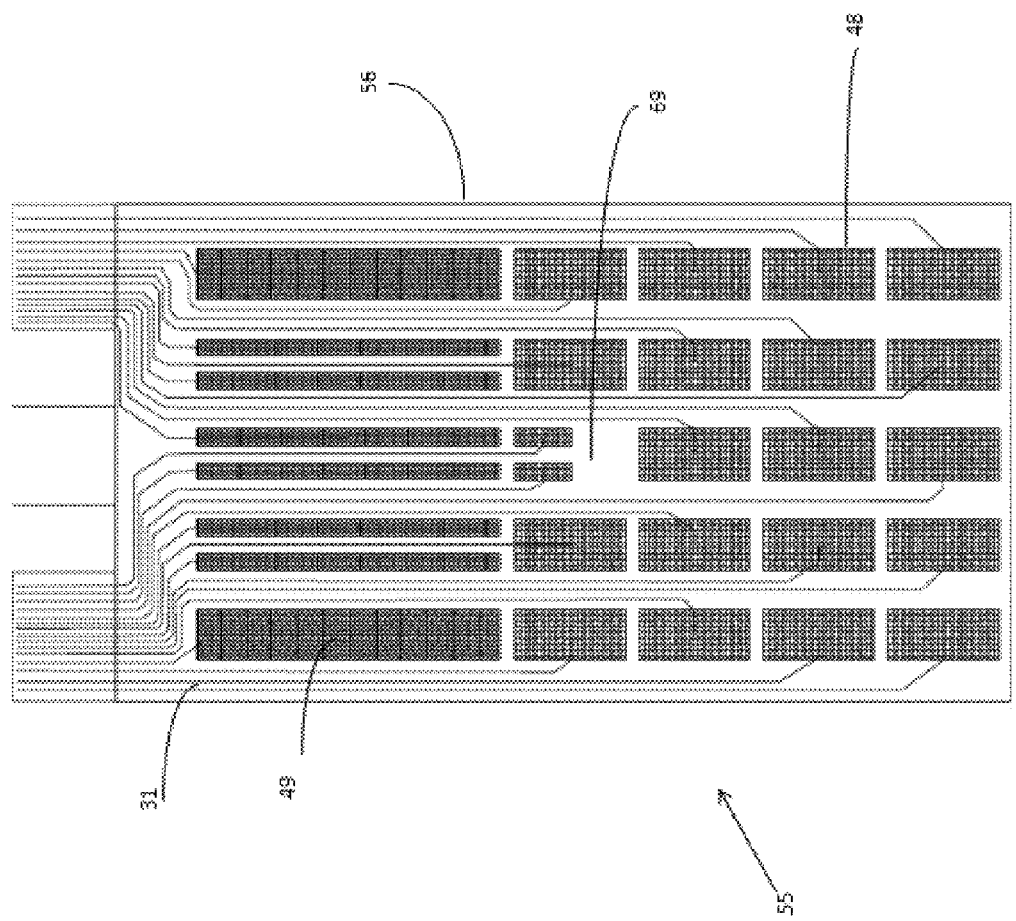

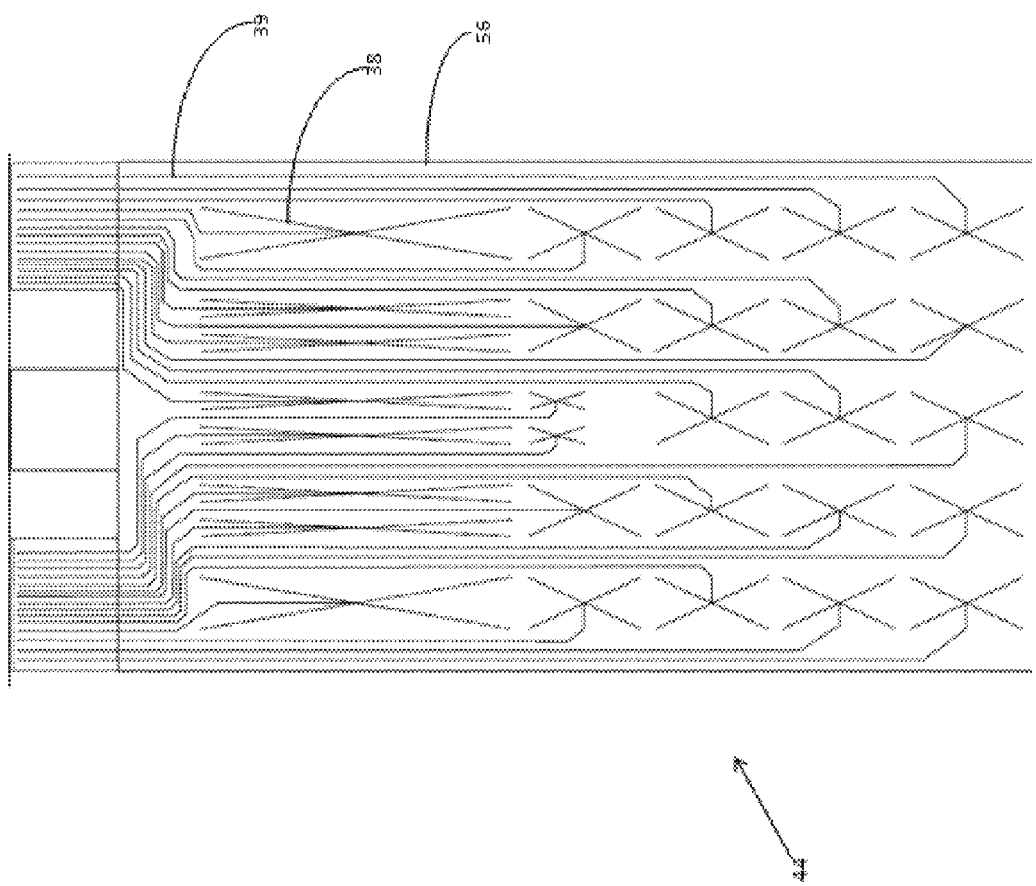

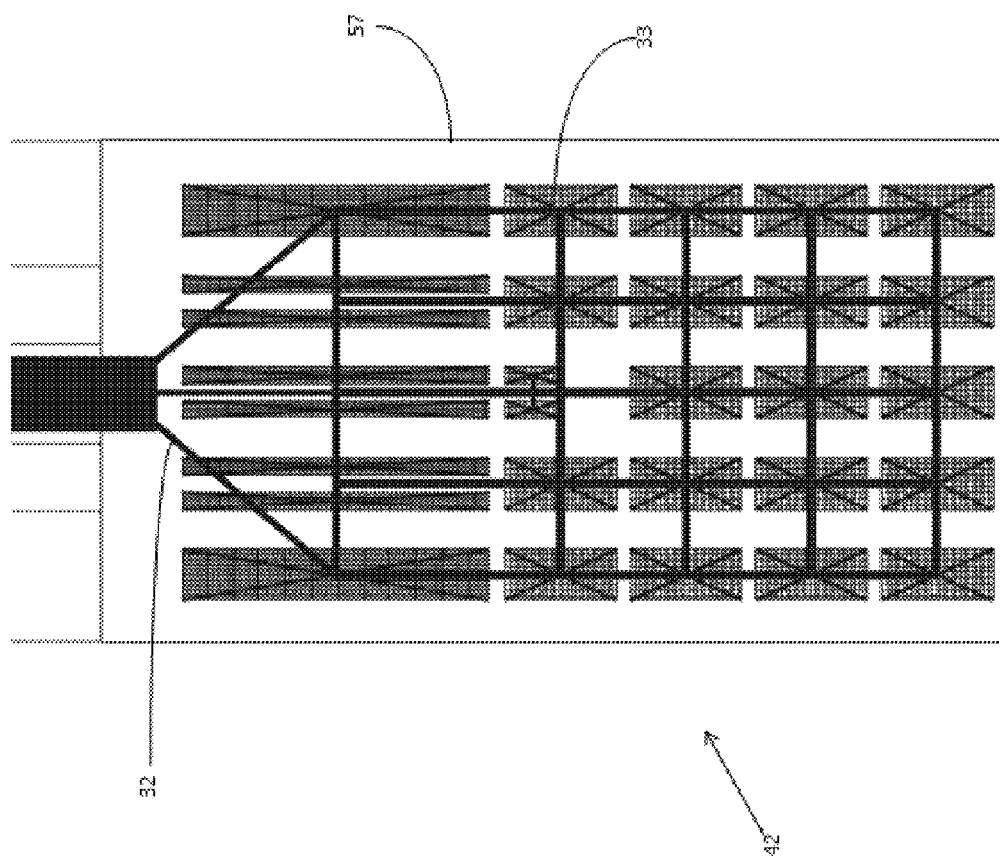

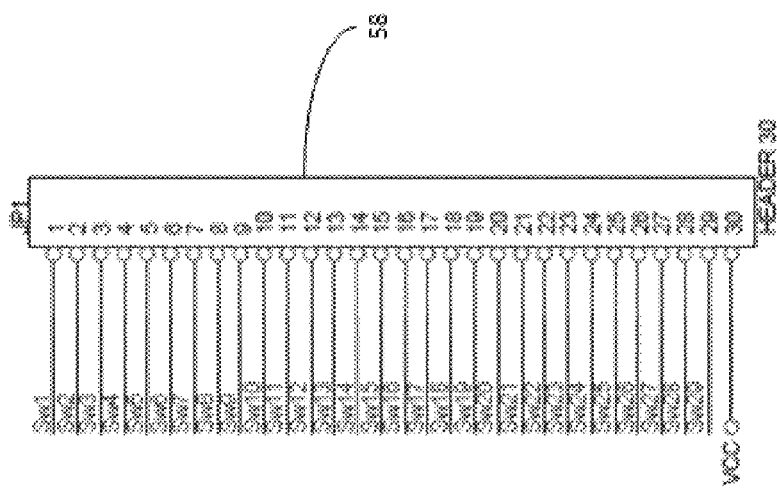
FIG. 1P

| Step Index | Step Name | Sensors-Set 1 Range | Sensors-Set 2 Range | Sensors-Set 3 Range | Sensors-Set 4 Range | Sensors-Set 5 Range |
|---|---|---|---|---|---|---|
| 1 | Jelbos | 75-150 | 120-600 | 200-300 | 450-760 | 200-320 |
| 2 | Qayam | 75-150 | 450-760 | 500-600 | 450-760 | 560-980 |
| 3 | Koaod | 120-600 | 120-600 | 120-600 | 500-600 | 300-400 |
| 4 | Error Correction | 500-600 | 500-600 | 500-600 | 560-980 | 500-600 |
| 5 | Error Correction | 0-100 | 120-600 | 0-100 | 75-150 | 75-150 |

701

| Ritual Index | Ritual Name | Date | Time | Importance | Required Steps | Required Steps Including Error Correction Steps |
|---|---|---|---|---|---|---|
| 1 | Noon Prayer | 1/1/08 | 13:00-15:00 | Mandatory | 1,2,3,5,8,9,10 | 1,2,3,5,8,9,10,12 |
| 2 | Exercise | 1/1/08 | 15:00-15:30 | Optional | 3,4,5,1,9 | 3,4,5,1,9,12 |

| Error Index | Error Description | Sensors-Set 1 Range | Sensors-Set 2 Range | Sensors-Set 3 Range | Sensors-Set 4 Range |
|---|---|---|---|---|---|
| 1 | Putting hands close to head in kneeling | 200-300 | 450-760 | 150-250 | 75-190 |
| 2 | Putting knees first before hand in kneeling | 75-190 | 340-450 | 120-450 | 500-600 |
| 3 | Collapsing back during kneeling | 200-320 | 450-760 | 75-150 | 120-600 |
| 4 | Arms touching ground | 560-980 | 450-760 | 75-150 | 450-780 |
| 5 | Excessive movement during prayer | 120-600 | 120-600 | 120-600 | 120-600 |

| Activity Index | Step Index | Chapter Index | Chapter Name | Verse Index | Verse Text | Verse Translation | Verse Transliteration | Image | Audio-Content | Video-Content |
|---|---|---|---|---|---|---|---|---|---|---|
| 1 | 1 | 1 | xyz | 1 | | | | | | |
| 1 | 1 | 1 | xyz | 2 | | | | | | |
| 1 | 2 | 2 | yyy | 1 | | | | | | |

| Location Name | Geographic Location Index | 3D model |
|---|---|---|
| Mecca | | |
| Jerusalem | | |

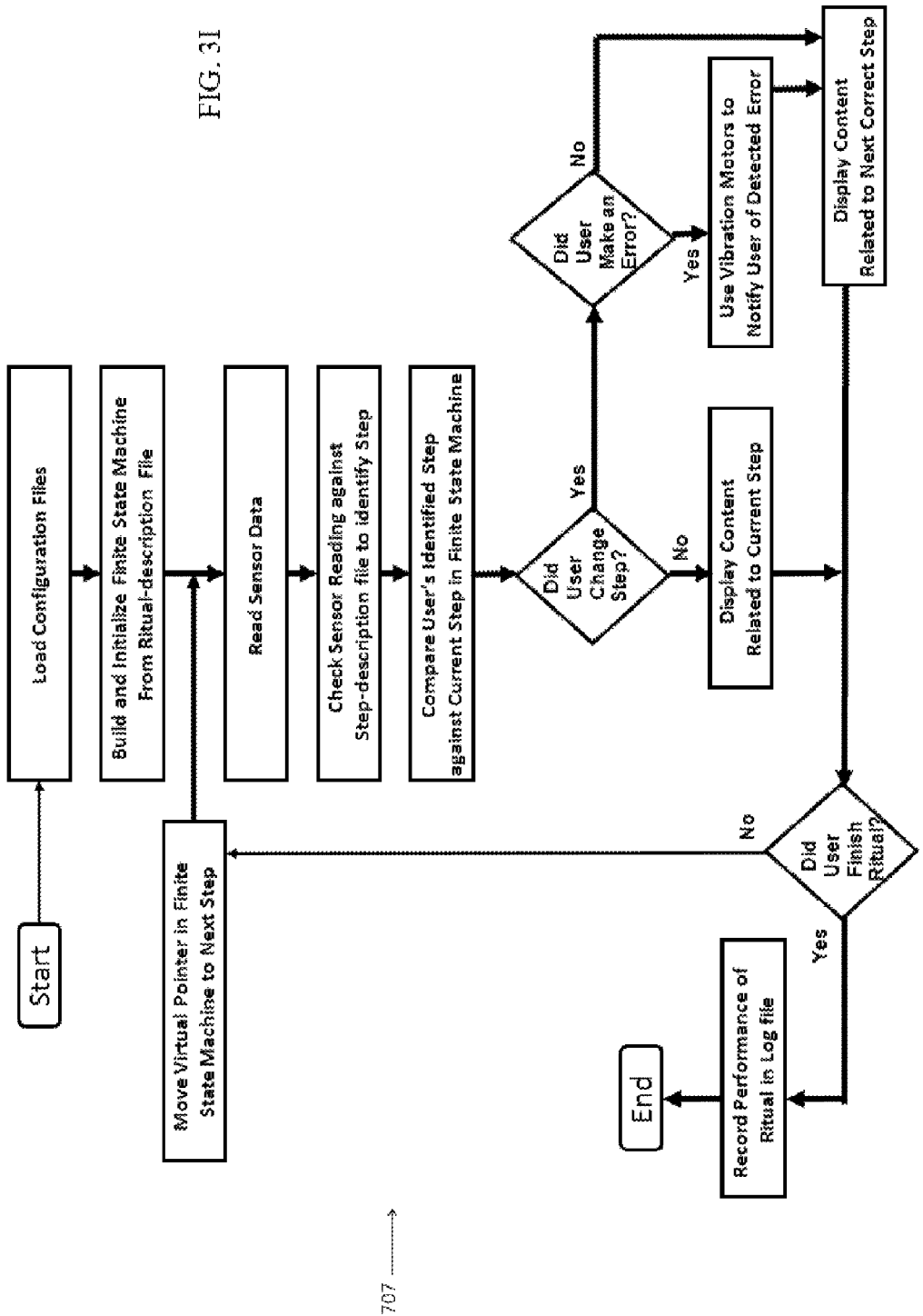

FIG. 4H

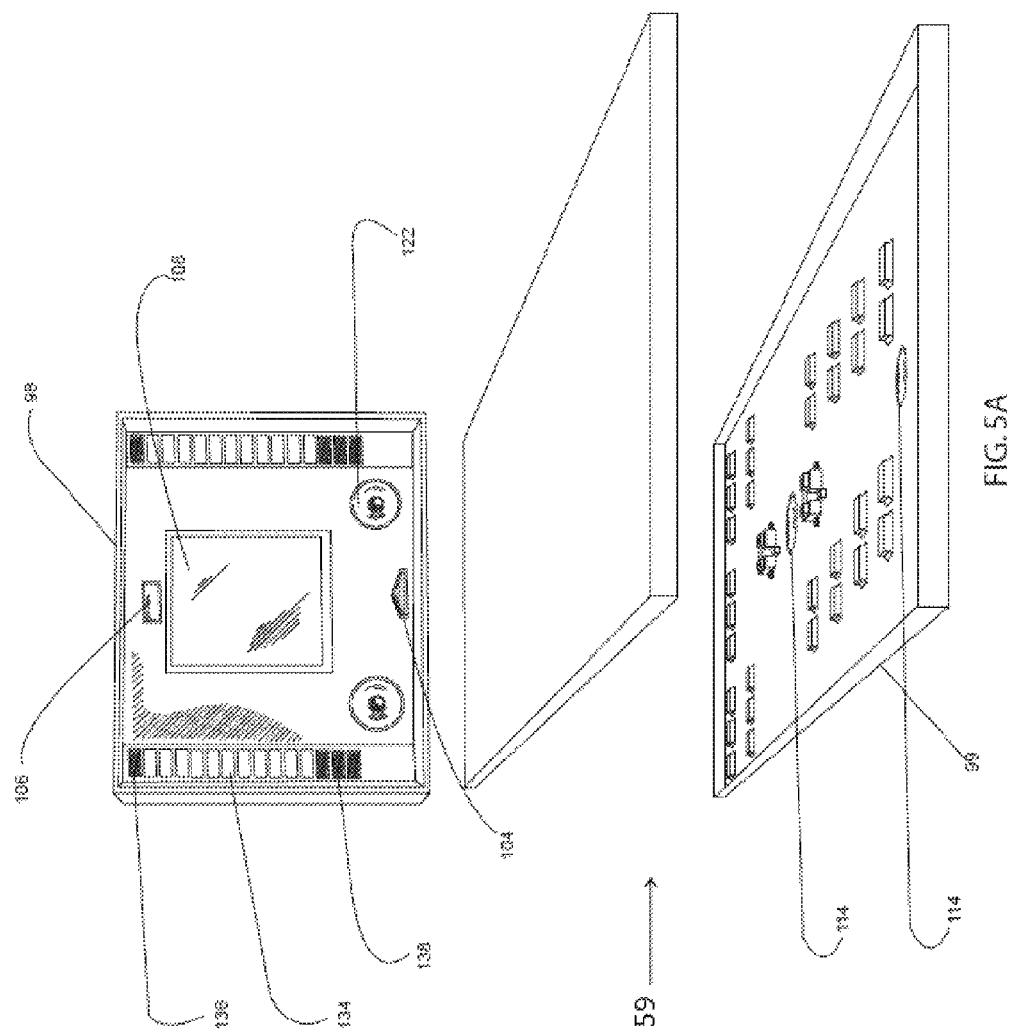

| Step Index | Step Name | Joint 1 3D info | Joint 2 3D info | Joint 3 3D info | Joint 4 3D info |
|---|---|---|---|---|---|
| 1 | Jeloos | | | | |
| 2 | Qayam | | | | |
| 3 | Koood | | | | |
| 4 | Error Correction | | | | |

| Error Index | Error Description | Joint 1 3D info | Joint 2 3D info | Joint 3 3D info | Joint 4 3D info |
|---|---|---|---|---|---|
| 1 | Putting hands close to head in kneeling | | | | |
| 2 | Putting knees first before hand in kneeling | | | | |
| 3 | Collapsing back during kneeling | | | | |
| 4 | Arms touching ground | | | | |
| 5 | Excessive movement during prayer | | | | |

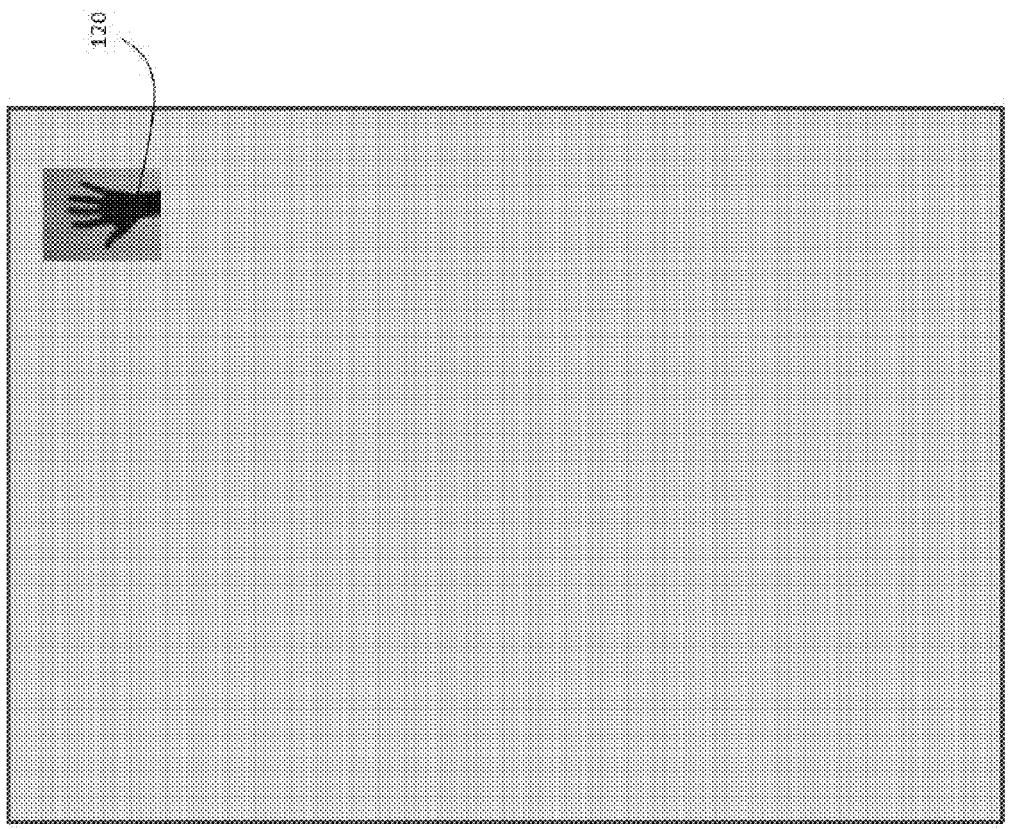

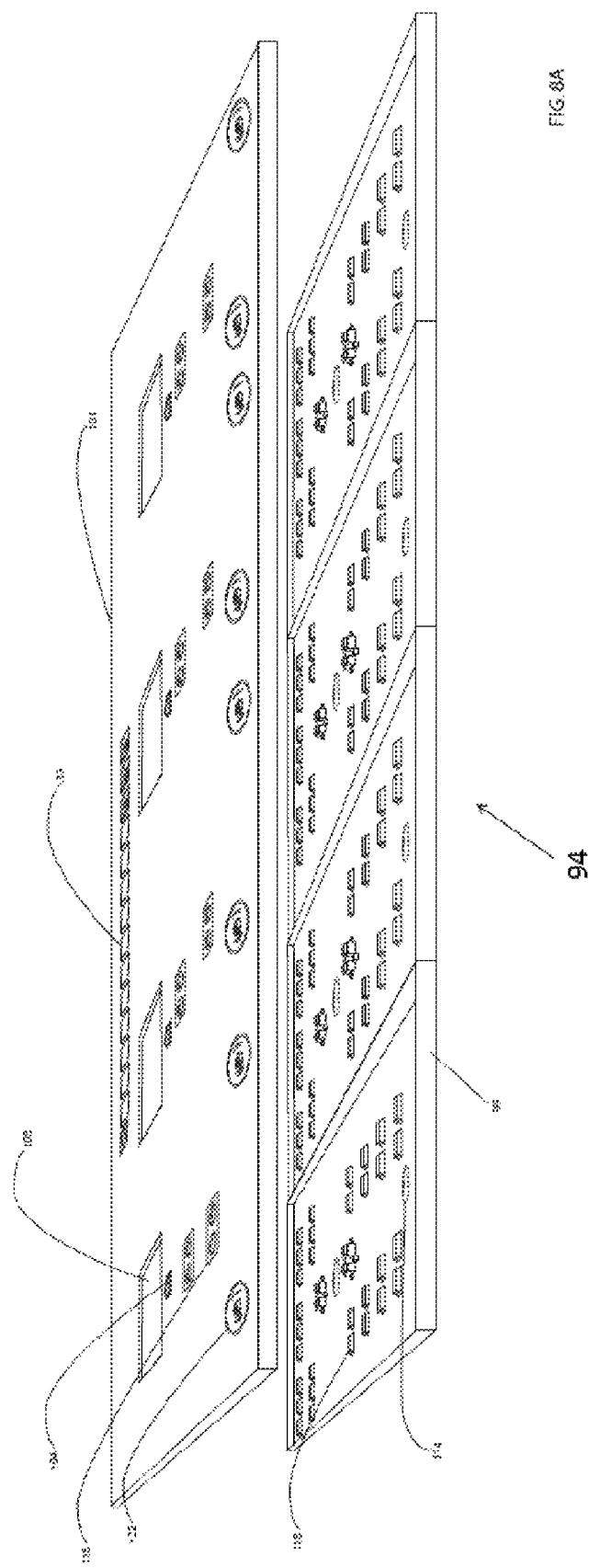

SYSTEM AND METHOD FOR ENHANCING PRAYER AND HEALING RITUALS

CROSS-REFERENCE TO RELATED APPLICATIONS

This application is a continuation of U.S. patent application Ser. No. 12/493,232, filed Jun. 28, 2009, which claims priority to, and incorporates by reference, U.S. provisional patent application Ser. No. 61/076,643, filed on Jun. 28, 2008.

FIELD OF THE INVENTION

The field of the present invention relates to devices for performing religious rituals and meditative practices, and to methods of assisting users in performing religious rituals and meditative practices. In addition, the field of the invention relates to educational devices which teach users how to perform different body postures and to assistive devices for users with cognitive impairments, particularly for use in the performance of religious rituals and/or meditative practices.

BACKGROUND OF THE INVENTION

Devices for practicing religious and healing rituals are still in early development. The AltarNation is an example of such developments, which presents an altar-like interface which enables remote individuals to participate in group meditation. By lighting candles, users enter a shared virtual community. The interface is suitable for Christian rituals since only a simple kneeling gesture is recommended by the religion—although it does not provide the user with scripture reading facility.

Another currently-available interface is the Sajjadah1426 prayer rug, which employs the use of electroluminescent technology. The entire rug glows more brightly as it is turned towards Mecca. However, turning the whole prayer rug into a display could affect the concentration of the user, and the heat generated by the luminescent components could render the system unusable until it is cooled down. Furthermore, the adopted fading visualization component of the Sajjadah1426 prayer rug does not map well to a direction finding task.

The present invention provides various improvements to the devices and methods that are currently available for practicing such religious and healing rituals, which are discussed further below.

SUMMARY OF THE INVENTION

According to certain aspects of the present invention, interactive prayer systems are provided, which include a pad that is adapted to be repeatedly stepped upon by a user. In addition, the systems include a first detection means for detecting when the user steps on the pad, and for creating touch event data based upon when the user steps on such pad. According to such embodiments, the systems further include a second detection means for detecting, and for creating proximity event data based upon, when the user is standing in proximity of specific areas within the pad. Still further, the systems of the present invention include a communications means for communicating the touch event data and proximity event data to a computer, as well as a computer program executing on the computer, which provides an ability to access previously stored data files that include religious scriptures and one or more specifications of valid steps and a valid sequence of steps correlated with one or more prayer rituals. The invention provides that the computer program directs the presentation of such scriptures on a display means connected to the computer, such that the user can read the scripture during prayer. The computer will further include a notification means embedded in the pad for notifying the user when, and if, an error in the user's performance of the one or more prayer rituals is detected by the computer program.

According to further aspects of the invention, additional interactive prayer systems are provided, which include (1) an enclosure placed in front of a user while performing a prayer ritual, (2) a computer which stores data comprising valid postures and a valid sequence of postures required to perform the prayer ritual, parameters for identifying each valid posture, and scripture, (3) a display means placed inside the enclosure for displaying parts of the data, (4) a vision detection means placed within the enclosure for capturing images of the user during a performance of the prayer ritual (and the vision detection means may exist within the display means or exist separately within the enclosure), (5) a computer program executing on the computer, whereby the computer program retrieves images from the vision detection means, and compares and contrasts user postures against the appropriate parameters for identifying correct postures for the applicable prayer ritual (and the computer program also displays the applicable scripture to the user within the display means), and (6) a notification means embedded within the enclosure for notifying the user when, and if, an error in a performance of the prayer ritual is detected by the computer program.

According to yet further aspects of the invention, methods of enhancing prayer ritual are provided. Such methods generally include the steps of (a) detecting touch event data based upon when a user steps on a pad, (b) detecting proximity event data based upon user proximity to specific areas within the pad, (c) communicating the touch event data and proximity event data to a computer, (d) retrieving certain previously stored data files, whereby the data files include religious scriptures and one or more specifications of valid steps and a valid sequence of steps correlated to one or more prayer rituals, (e) processing the touch event data and proximity event data, (f) displaying the scripture to the user based upon a set of results of such processing (such that the user is able to read scripture during prayer), and (g) alerting the user to any errors in his/her performance of the prayer ritual, as detected by the above-mentioned processing step.

The above-mentioned and additional features of the present invention are further illustrated in the Detailed Description contained herein.

BRIEF DESCRIPTIONS OF DRAWINGS

For a further understanding of the objects, features and advantages of the present invention, reference should be made to the following description of the preferred embodiments, considered in conjunction with the accompanying drawings, in which like parts are given like reference numerals and wherein:

FIG. 1E is a perspective exploded view of a second alternative embodiment of the invention;

FIG. 1F is a perspective view of a third alternative embodiment of the invention;

FIG. 1G is a perspective exploded view of a non-limiting example of the layers of the ritual panel of the invention;

FIG. 1H shows a cross-sectional view of the ritual panel described herein;

FIG. 1I shows a cross-sectional view of an alternative design of the ritual panel;

FIG. 1L shows a top view of the conductive traces of the top layer of membrane circuit;

FIG. 1M shows a top view of the super-conductive traces of the top layer of membrane circuit;

FIG. 1N shows a top view of the grounded traces of the bottom layer of membrane circuit;

FIG. 1O shows a top view of the insulating foam layer described herein;

FIG. 1P shows an edge connector for connecting to conductive traces of membrane circuit;

FIG. 2I shows a schematic for the circuit controlling the LED in the ambient display frame, as described herein;

FIG. 3D shows an exemplary ritual-description configuration file;

FIG. 3G shows an exemplary direction-description file;

FIG. 3I shows a flow chart describing the method used in the invention for assisting in performance of a ritual;

FIG. 4H shows a screen capture of the graphical user interface for the invention's feature involving the setup of the invention;

FIG. 5A is a perspective view of a fifth alternative embodiment of the invention;

FIG. 5G shows an exemplary non-limiting step-description configuration file for usage with camera input;

FIG. 5H shows an exemplary error-description configuration file;

FIG. 7C shows a top view of a set of feedback LEDs with surrounding guiding LEDs wherein the feedback LEDs take the shape of body part(s);

FIG. 8A is a perspective exploded view of an eighth alternative embodiment of the invention;

DETAILED DESCRIPTION OF THE INVENTION

Figure 1A:
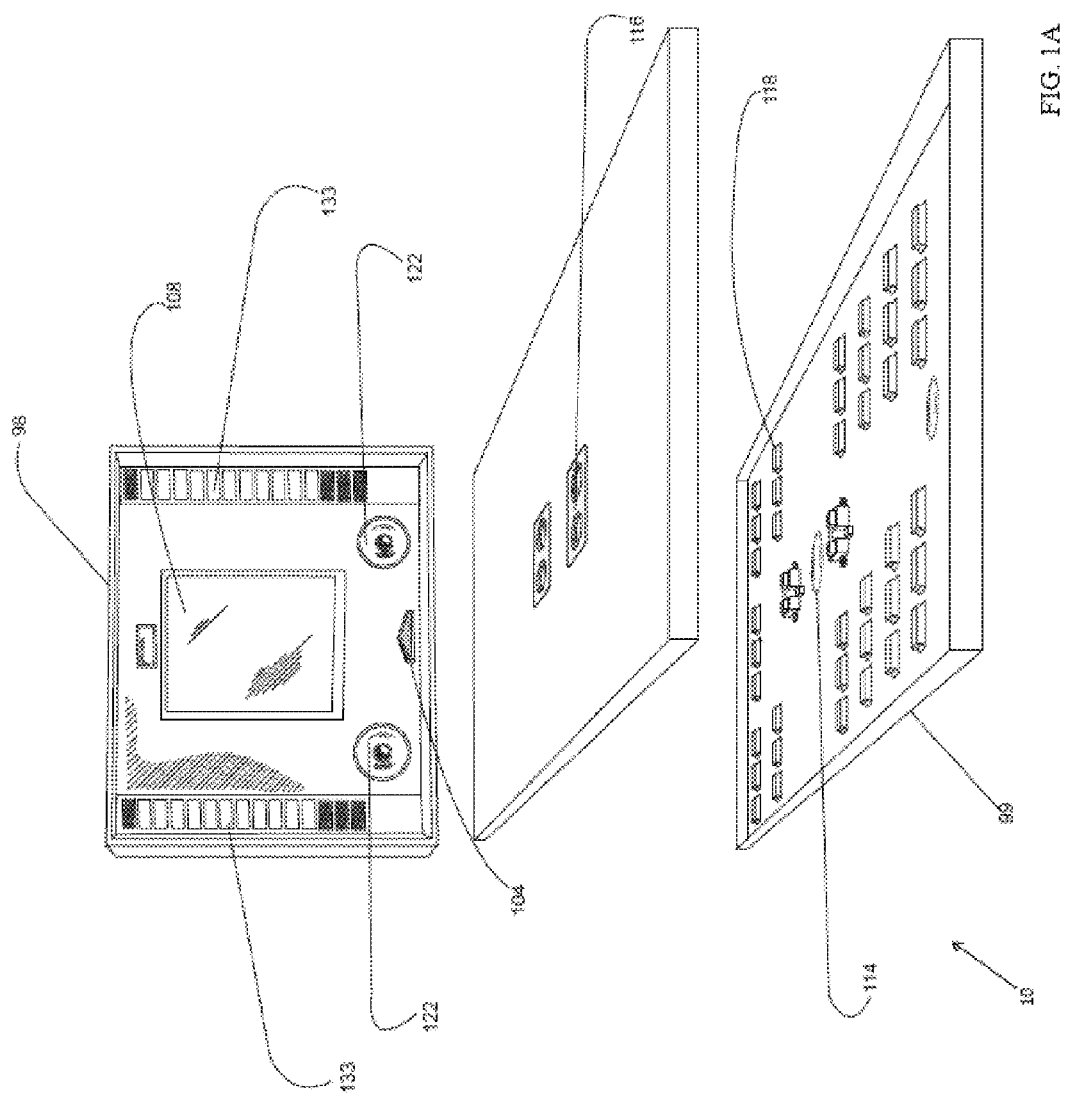
FIG. 1A is a perspective exploded view of an embodiment of the invention.

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Billions of people worldwide are adherents of some form of religion or meditative philosophy. It is no exaggeration, therefore, to assert that one of the most common and frequent tasks in human societies is some form of prayer or meditative ritual, performed either daily, weekly, or on special occasions. During a ritual, the adherent performs different body postures in a sequence and, during such postures, the adherent often reads statements from a scripture, views a multimedia content, and/or follows an instructional presentation. In addition, such rituals are often performed according to a schedule, which is either prescribed by the religion or meditation philosophy—or otherwise set by the user.

Challenges facing adherents today include, but are not limited to, (1) it is becoming increasingly difficult to schedule ritual with the rapid life pace of the modern world, (2) having access to all the scriptures is difficult in view of the voluminous nature of the applicable text, (3) relating appropriate sections of scripture to ritual context requires knowledge which laity often do not posses, (4) adherents like to enhance and customize their ritual experience with minimum time spent in educating themselves, and (5) as adherents gets older, a general degradation in skills creates a need for assistive tools to aid in performing rituals.

Adherents generally perform rituals in a clean environment. For those rituals in which the prayer involves body gestures, during which parts of the body touch the ground—e.g., Buddhism, Islam, and some Christian denominations—it is recommended to perform the ritual on a well maintained piece of fabric—often called a prayer rug or ritual mat. Similarly, meditative practices such as yoga often utilize a mat during the performance of the activity.

To address the above challenges, and to avoid introducing an unfamiliar object into the ritual, a traditional prayer rug is employed in certain preferred embodiments of the present invention. More particularly, certain preferred embodiments of the invention comprise a prayer rug augmented with, for example, an embedded digital processor, screen, speakers, microphone, sensors, vibration motors, as well as an ambient display frame.

Preferred Aspects of the Invention

There are various preferred aspects and attributes of the present invention, which seek to address various restrictions that apply to a computer-generated user interface for a religious ritual, which are explained below.

Keep the Ritual Unchanged

Designing a new interface often involves inventing a vocabulary of interaction techniques: hand and body gestures, audio commands, key or pen strokes, new widgets, etc. However, in the case of religious and meditative rituals—this is not possible as it is often perceived as a violation of the relevant rulings. Accordingly, the present invention employs the applicable constituent steps of the ritual being performed, as the interface vocabulary.

Avoid Disturbing the Ritual Flow

"Flow" is the term commonly used to describe a mental state in which a person is fully immersed in what he or she is doing, and which is characterized by a feeling of energized focus and full involvement. Csikszentmihalyi, the psychologist who pioneered this concept, referred to it as "being completely involved in an activity for its own sake. The ego falls away. Time flies. Every action, movement, and thought follows inevitably from the previous one. Your whole being is involved." To avoid breaking the flow, the present invention avoids any form of explicit interaction during ritual between the systems of the invention and the user—and, rather, employs indirect mechanisms instead. Notification from the invention is carried out within a short interval of time to avoid interrupting the user's concentration. Furthermore, the user is allowed to customize the interruption interval.

Enable Better Access to Religious Scripture

There are three requirements associated with religious and meditative scripture/content, namely, (1) provide better access to scripture/content during ritual, (2) consider the ritual as well as the adherent contexts in recommending a scripture/content for ritual, and (3) give the user the freedom to select parts of scripture/content for a ritual. As described below, the present invention satisfies the above requirements.

Assist in Preventing Errors

Religious and meditative rituals are highly repetitive. Consequently, the most common source of error is to forget the number of steps or type of gestures already performed—leading to omission or commission errors. Omission errors are made when the user wrongly assumes that a step was performed; whereas, commission errors occur when the user wrongly assumes that a step was not performed, and the user performs it again. From a religious point of view, these kinds of errors could invalidate the prayer. As an example, in Islam, the posture, count, and sequence of steps are specified by the religion. A Muslim prayer is invalidated if an adherent changes the order intentionally. If a Muslim unintentionally misses or changes some of the body gestures, an apologetic gesture is performed at the end of prayer.

Let the User Drive

The invention avoids having the devices described herein control the prayer instead of the adherent. The invention aims for the user to still make the effort of trying to perform the ritual correctly. Otherwise, the ritual will be deemed unchallenging by the user. Hence, the invention neither recommends to the user the next step to perform, nor does it force the user to perform a step before moving to the next one.

Notify the User with Onset of Ritual Time/Date

Users often find it difficult to fulfill their required rituals because: (1) rapid life pace (in which secular activities compete for resources with non-secular activities), (2) religions often follow their own calendar which does not map easily to the Gregorian calendar, and (3) some religious calendars follow lunar movements, hence ritual times change almost daily—and adherents desire a notification mechanism to inform them of the next prayer time.

Referring now to FIG. 1A, a perspective exploded view of an embodiment of the present invention is shown 10. The invention 10 comprises two parts, namely, a slanted display panel 98 and a horizontal ritual panel 99. The display panel 98 comprises a computer screen 108, microphone 104, speakers 122, and two vertical progressive display frames 133. Inside the display panel, there exists an embedded circuitry (not shown), which includes a digital processor for running the software program described herein, permanent memory for storing the software and ritual related content, and a power unit for connecting to an external power source. For detecting a user's posture, in certain embodiments, the invention employs the use of proximity sensors 116, which capture a continuous distance reading and return a corresponding analog value proportional to the proximity of the user—and uses force sensors 118 to detect the location and magnitude of the user's pressing force upon the pad. The sensors are, preferably, strategically located in the ritual panel to detect different body postures performed during a ritual. The ritual panel 99 also comprises a vibrating disc motor 114 for alerting the user that he/she committed an error while performing the ritual. The invention provides that the components of the display panel could be organized in alternative ways. For example, the progressive display frame could be placed horizontally, instead of vertically. Similarly, the speakers and microphone could be placed in different locations. In addition, the number and location of sensors could be different from what is illustrated in FIG. 1A.

Figure 1B:
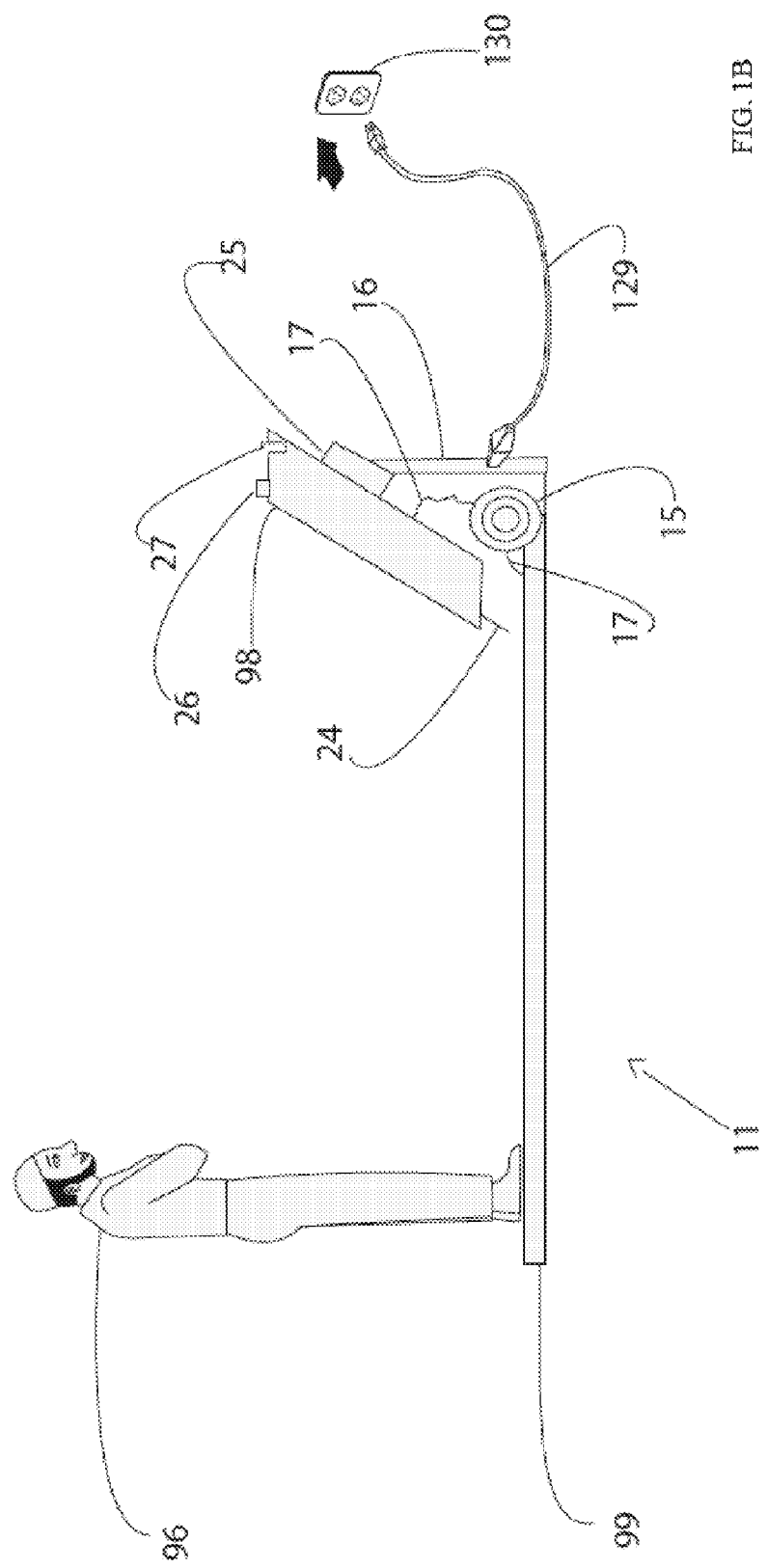
FIG. 1B is a side view of an embodiment of the invention.

FIG. 1B is a side view 11 of an embodiment of the invention. According to such embodiments, the invention comprises two parts, namely, a slanted display panel 98 and a horizontal ritual panel 99. As shown, the user 96 stands or sits on the ritual panel 99—looking towards the display panel 98. The display panel 98 is tilted upward towards the user 96 and is connected to an adjustable arm 16 by a titling head 25. The adjustable arm 16 is used to provide support for the display panel 98 and is also used to raise/lower the display panel 16 to accommodate users of different heights. The tilting head 25 is used to tilt the display panel 98 forward/or backward. The ritual panel 99 is preferably constructed of flexile material that is fixed from one side to the rotatable wheel 15 and free to move from the other side. The ritual panel 99 is preferably connected to the display panel 98 using the connection wires 17. While not in use, the ritual panel 99 is rolled around the rotatable cylinder 15. To use the prayer panel, the user pulls the rolled prayer panel 99 from around the rotatable wheel 15 and uses the fixating hook 24 to fix it in the desired position. A power cable 129 connects the device of the present invention to an external power source 130. The display panel further comprises an inlet for inserting a memory card 27 and a button 26 for switching on/off the invention.

Figure 1C:
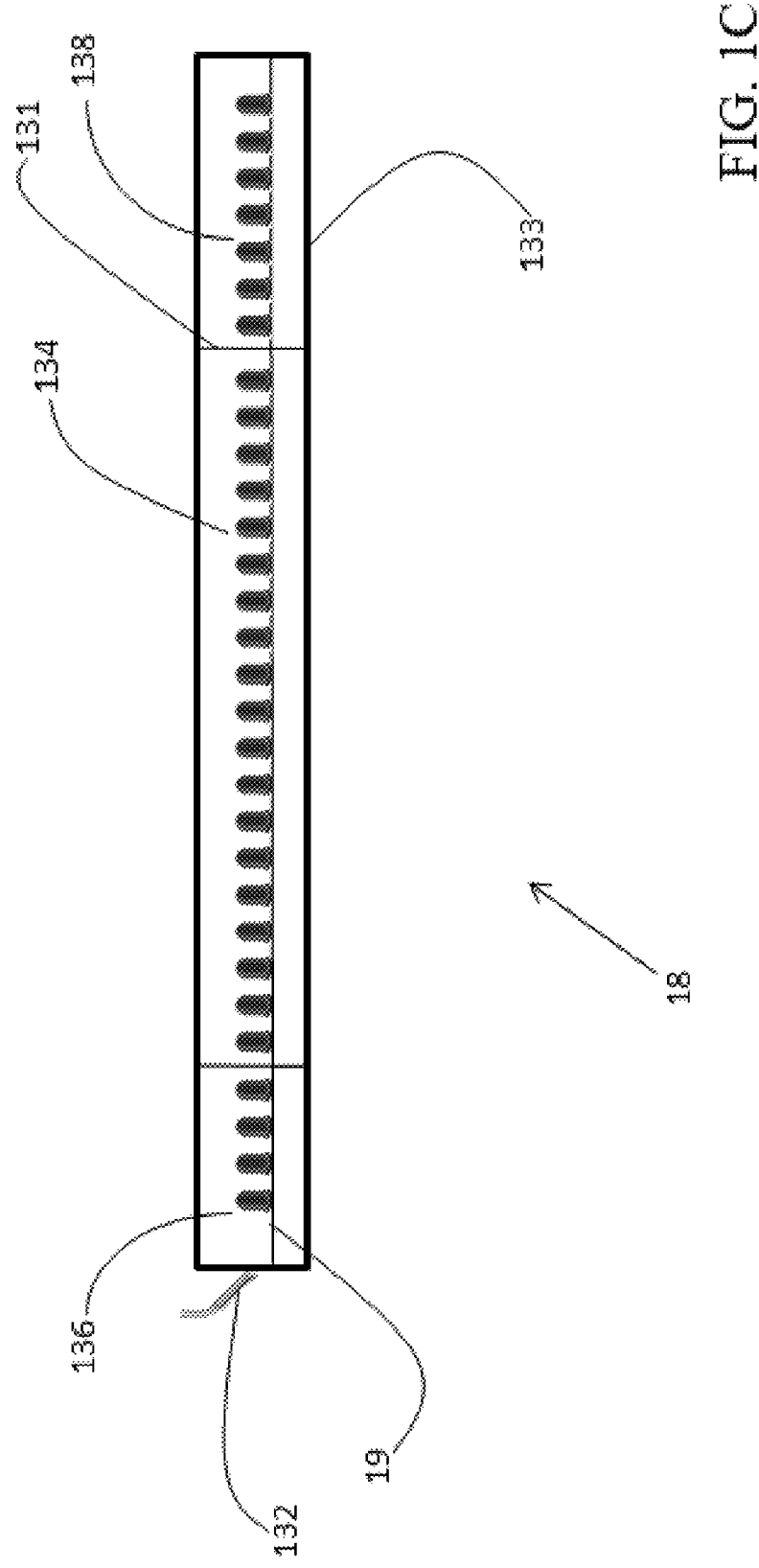
FIG. 1C is a side view of the progressive display frame described herein.

FIG. 1C is a non-limiting example of a side view 18 of the progressive display frame. Each progressive display frame 133 comprises light emitted diodes (LEDs) 146 of several colors mounted on a printed circuit board (PCB) 19 and is connected to the main controller board (not shown) of the invention by connection wires 132. More particularly, for example, blue LEDs 136 are used to indicate to the user that the day is a special day, whereas the white LEDs 134 informs the user about the amount of time remaining for the current ritual time to expire. The red LEDs 138 informs the user that the current ritual time has almost expired. Of course, those of ordinary skill in the art will appreciate that any other set of colors could be used in such capacity. The invention provides that the progressive display frame PCB 19 switches the LEDs 146 on and off, based on instructions from the main circuit of the device.

Figure 1D:
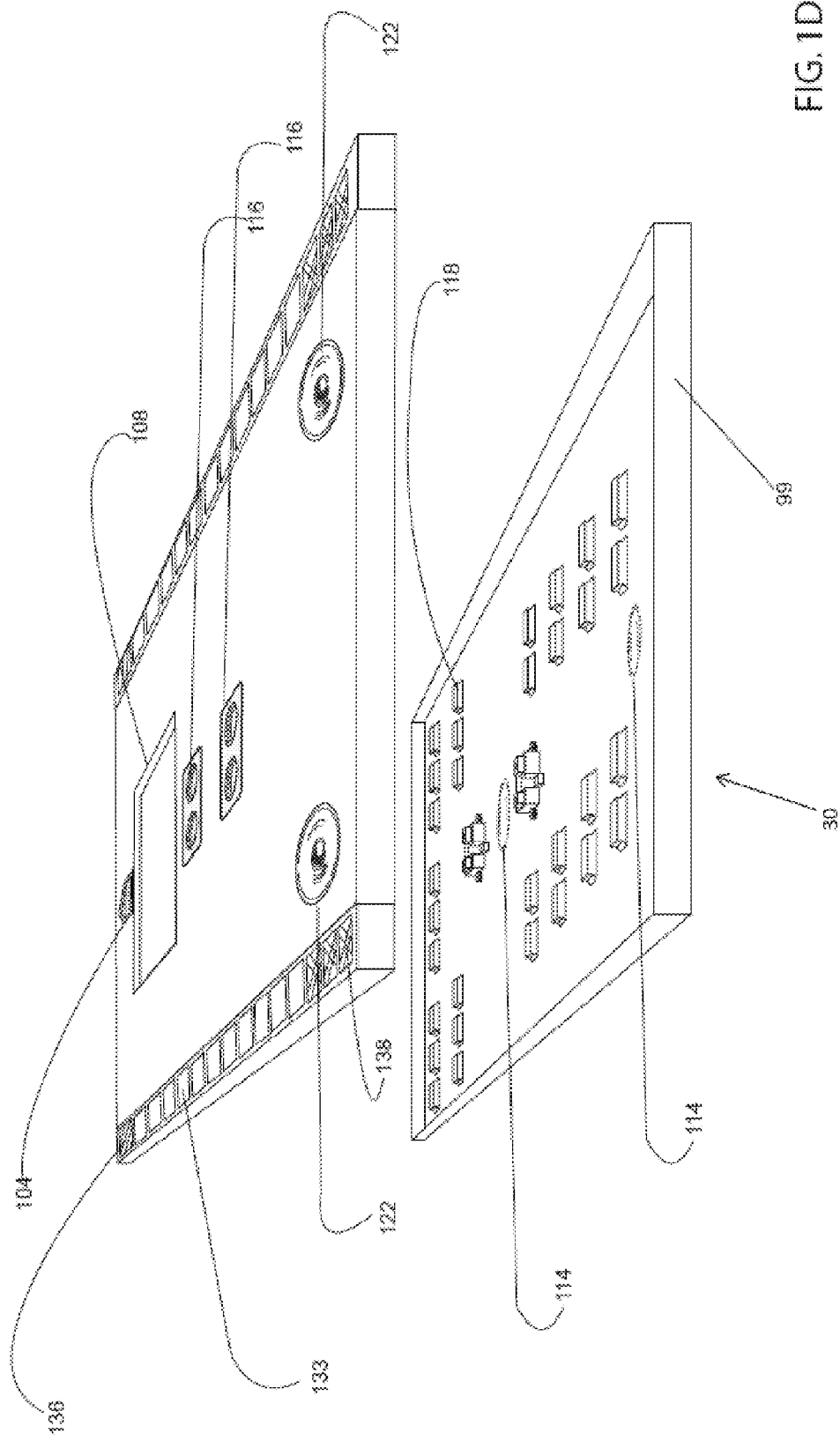
FIG. 1D is a perspective exploded view of an alternative embodiment of the invention.

FIG. 1D is a non-limiting example of a perspective exploded view of an alternative embodiment of the invention 30. In this embodiment, the invention comprises a ritual panel 99 (and does not include a display panel). Instead, the screen 108, microphone 104, speakers 122, and progressive display frame 133 are embedded in the ritual panel 99. The ritual panel 99 also comprises force sensors 118, a vibrating disc motor 114 and proximity sensors 116, as described earlier. The interior portion of the ritual panel also comprises certain embedded circuitry (not shown), which includes a digital processor for running the software described herein, permanent memory for storing the software and ritual-related content, and a power unit for connecting to an external power source.

FIG. 1E is a perspective exploded view of a second alternative embodiment of the invention 35. In this embodiment, the invention comprises a ritual panel 99—but no display panel. The ritual panel 99 comprises force sensors 118, a vibrating disc motor 114 and proximity sensors 116, as described earlier. The interior portion of the ritual panel 99 also comprises embedded circuitry (not shown), which includes a digital processor for running the software described herein, permanent memory for storing the software, and a power unit for connecting to an external power source. According to such embodiments, the device does not include a screen, microphone or speakers. Instead, the functionality of the software running on the device is limited to detecting errors in ritual performance and employs a vibrating motor to alert the user to any detected errors. In addition, a set of toggle buttons 36 placed on the left side of the invention enables the user to specify which ritual he/she will perform.

FIG. 1F is a perspective exploded view of a third alternative embodiment of the invention 40. In this alternative embodiment, the LEDs are switched on to show the error name. In this embodiment, the invention comprises a ritual panel 99 (and no display panel). The ritual panel 99 comprises force sensors 118 and proximity sensors 116, as described earlier. Inside the ritual panel 99 also exists certain embedded circuitry (not shown), which includes a digital processor for running the software described herein, permanent memory for storing the software, and a power unit for connecting to an external power source. There is no screen, microphone or speakers in this second alternative embodiment. Instead, the functionality of the software is limited to detecting errors in ritual performance and displaying an error name using a set of error-notification light emitting diodes LEDs 28 placed at the edge of the ritual panel 99. In addition, a set of toggle buttons 36 placed on the left side of the invention enables the user to specify which ritual he/she will perform.

FIG. 1G is a perspective exploded view of a non-limiting example of the layers of the ritual panel of the invention 92. The ritual panel 99 has two layers: a top layer 124 in which there are internal engravings on the bottom side—for placing the embedded sensors closer to the top surface. The lower layer 126 preferably comprises corresponding matching engravings. The wires passing through the engravings will preferably connect the sensors to the main controller board (not shown) in the invention.

FIG. 1H shows a cross-sectional view of a non-limiting example of the ritual panel described herein 71. According to such embodiments, the user presses from the top against the top layer 124, which in turn presses upon the force sensor 118. The force sensors are connected to a circuit (not shown). Proximity sensors 116 are embedded inside the ritual panel and point toward the top layer 124. An outlet 115 is further provided for enabling the rays from the proximity sensor 116 to travel outside the ritual panel 99. The circuit (not shown) employs the proximity sensor 116 to detect if a user body part is on top of the location of the proximity sensor. The number, type and location of force sensors 118, and of proximity sensors 116, could vary from those described and illustrated herein.

FIG. 1I shows a cross-sectional view of an alternative design of the ritual panel 72. A rubber object 127 is preferably attached to the inside of the top layer 124. The user presses from the outside against the rubber object 127, which in turn touches the force sensor 118. This design provides the advantage that it magnifies the pressure of the user body parts—and it simultaneously protects the force sensor from damage.

Figure 1J:
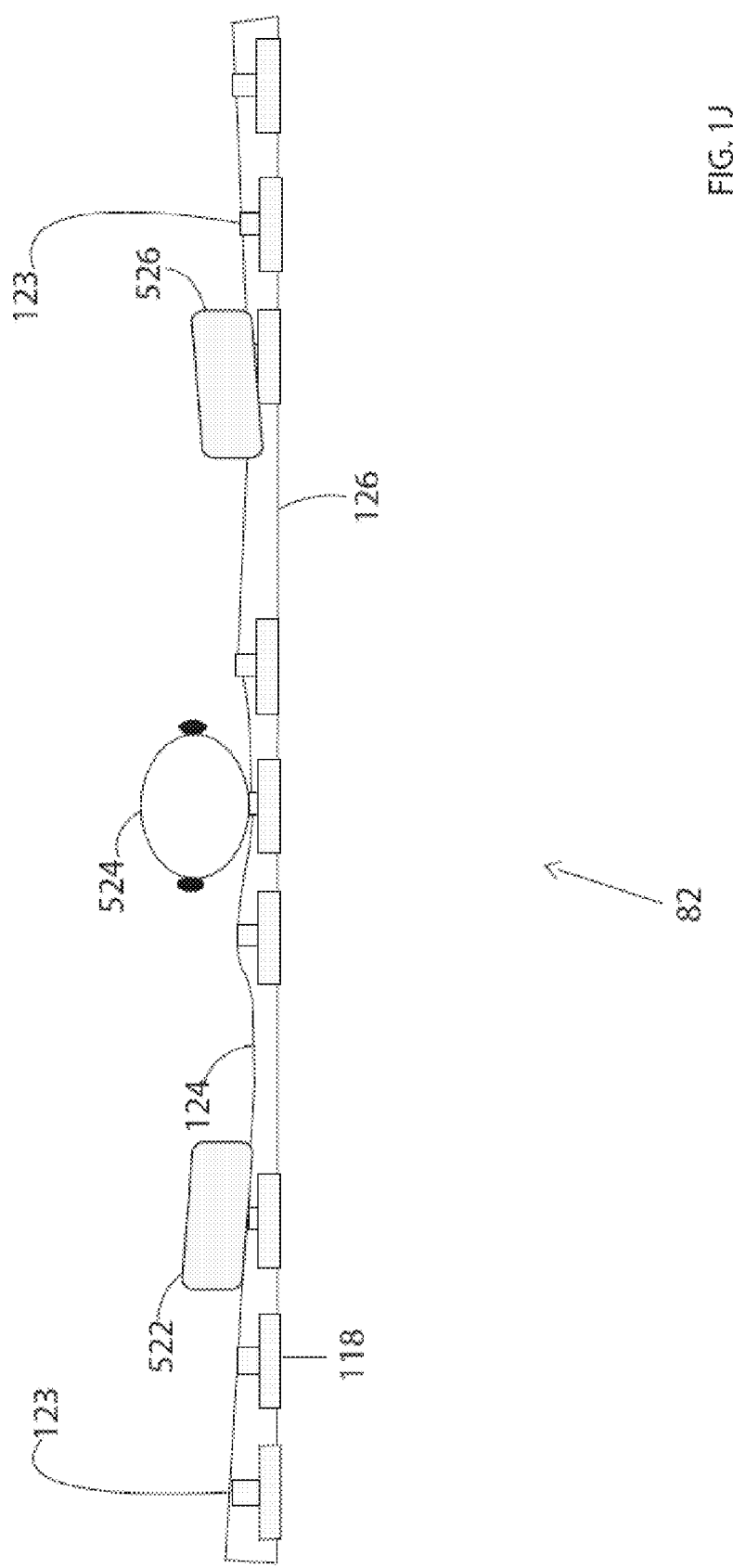
FIG. 1J shows a front cross-sectional view of a user kneeling on the ritual panel.

FIG. 1J shows a front, cross-sectional view of a user kneeling on the ritual panel 82. The force sensor 118 will be pressed upon in proportion to the amount of force exerted from the user's right hand 522, left hand 526 and head 524. Similarly, other body parts touching the ritual panel will exert a force that will be recorded by force sensors. The software running on the embedded processor (not shown) preferably calculates the position of body parts based on the amount of pressure exerted on the force sensors, knowledge of human body configuration, and ritual details.

Figure 1K:
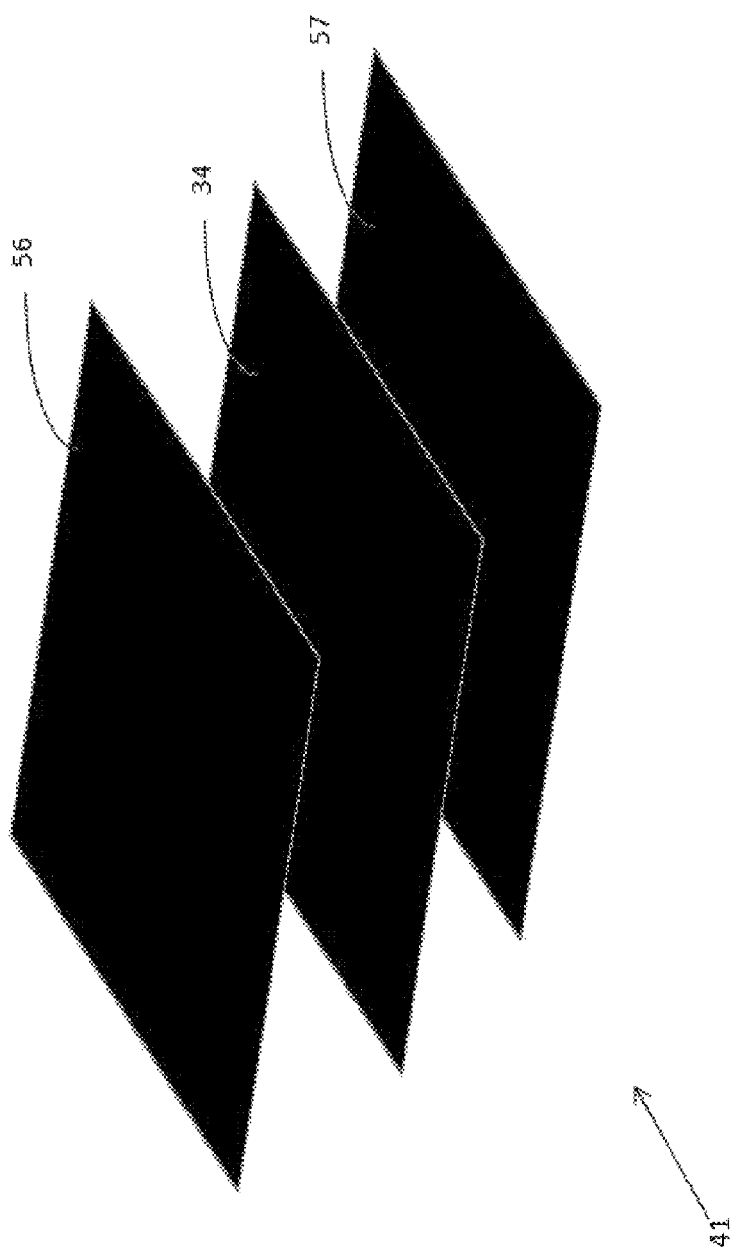
FIG. 1K shows a perspective exploded view of a fourth alternative embodiment of the invention.
Figure 10:
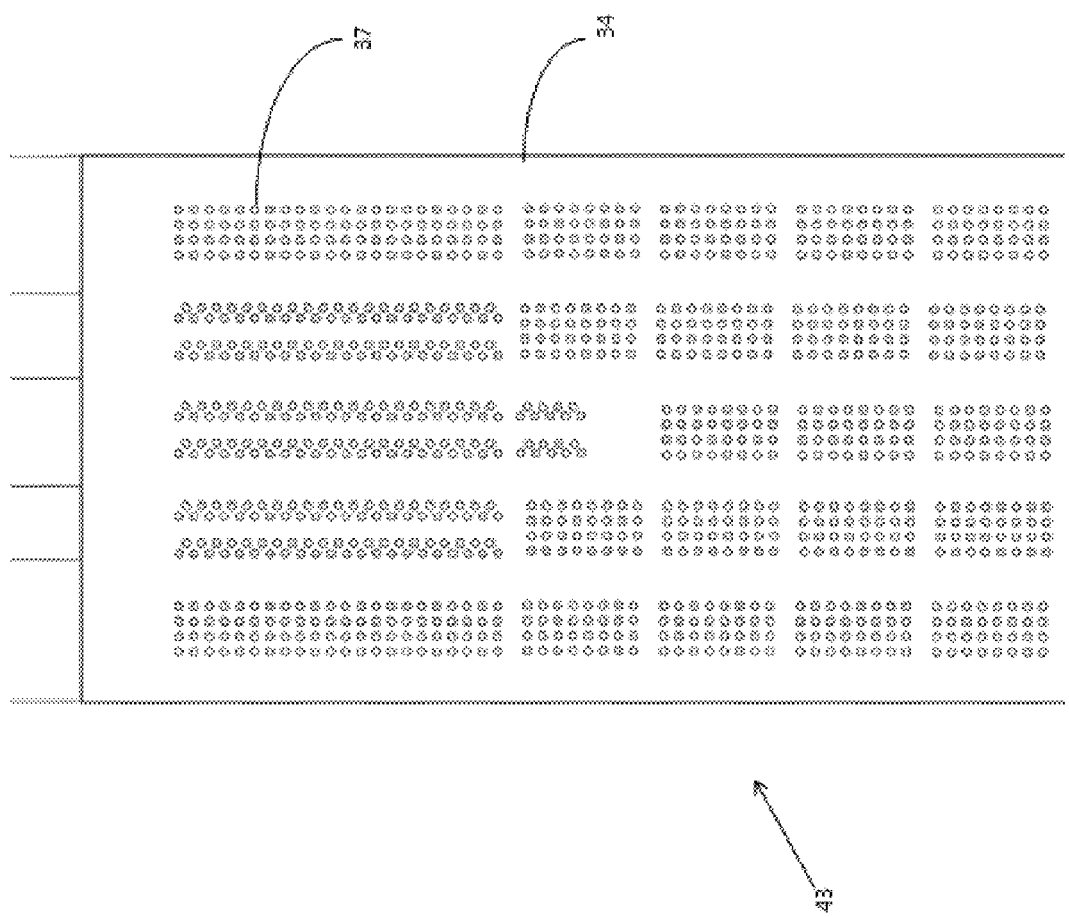

FIG. 1K shows a perspective exploded view of a fourth alternative embodiment of the invention 41. In this embodiment, the ritual panel consists of three flexible layers, a top layer 56 (with a circuit printed using super-conductive and conductive materials), an insulating layer 34 with holes, and a bottom ground layer 57 with a circuit printed in conductive material. The user presses upon the top layer 56, thereby causing segments of it to touch bottom ground layer 57 through holes in the insulating layer 34.

FIG. 1L shows a top view of the conductive traces of the top layer of membrane circuit 55. The top layer consists of conductive traces 49,31 printed on top of super-conductive traces (not shown). The circuit layout defines buttons which the user can press. Although twenty-nine buttons are shown in FIG. 1L, those of ordinary skill in the art will appreciate that the circuit can have any number of buttons. In the middle of the ritual panel, a space 69 is left for the proximity sensor, such as an infrared sensor or an ultrasonic sensor. The button layout is preferably designed to suit the different body postures the user will make. Each button 48 is comprised of a trace pattern of conductive material 49, such as carbon. Each button 48 has a conductive communication line 31, connecting it directly to an edge connector (not shown).

FIG. 1M shows a top view of the super-conductive traces of the top layer of membrane circuit 44. The top layer consists of conductive traces (not shown) printed on top of super-conductive traces 38,39. The circuit layout defines buttons which the user can press. Each button 38 is made of a trace pattern 38 of super-conductive material 38, for example silver. Each button 38 has a conductive communication line 39 connecting it directly to an edge connector (not shown).

FIG. 1N shows a top view of the grounded traces of the bottom layer of membrane circuit 42. The bottom layer consists of conductive traces 32,33 printed in correspondence with the top layer layout. All buttons are 33 connected together with the ground line 32. Those familiar in the art will immediately recognize that only a single grounded line is needed to close the circuit.

FIG. 1O shows a top view of the insulating foam layer 43. The foam layer 34 is placed between the top membrane layer (not shown) and bottom membrane layer (not shown). The foam layer comprises a plurality of holes 37, located in correspondence with the buttons in the top and bottom layer, thereby allowing the top and bottom layers to make contact upon being pressed by the user.

FIG. 1P shows an edge connector schematic for connecting to conductive traces of membrane circuit 45. The edge connector 58 connects from one side to the conductive and super-conductive traces leading to the edge of the ritual panel and from the other side to the controller board (not shown).

Figure 1Q:
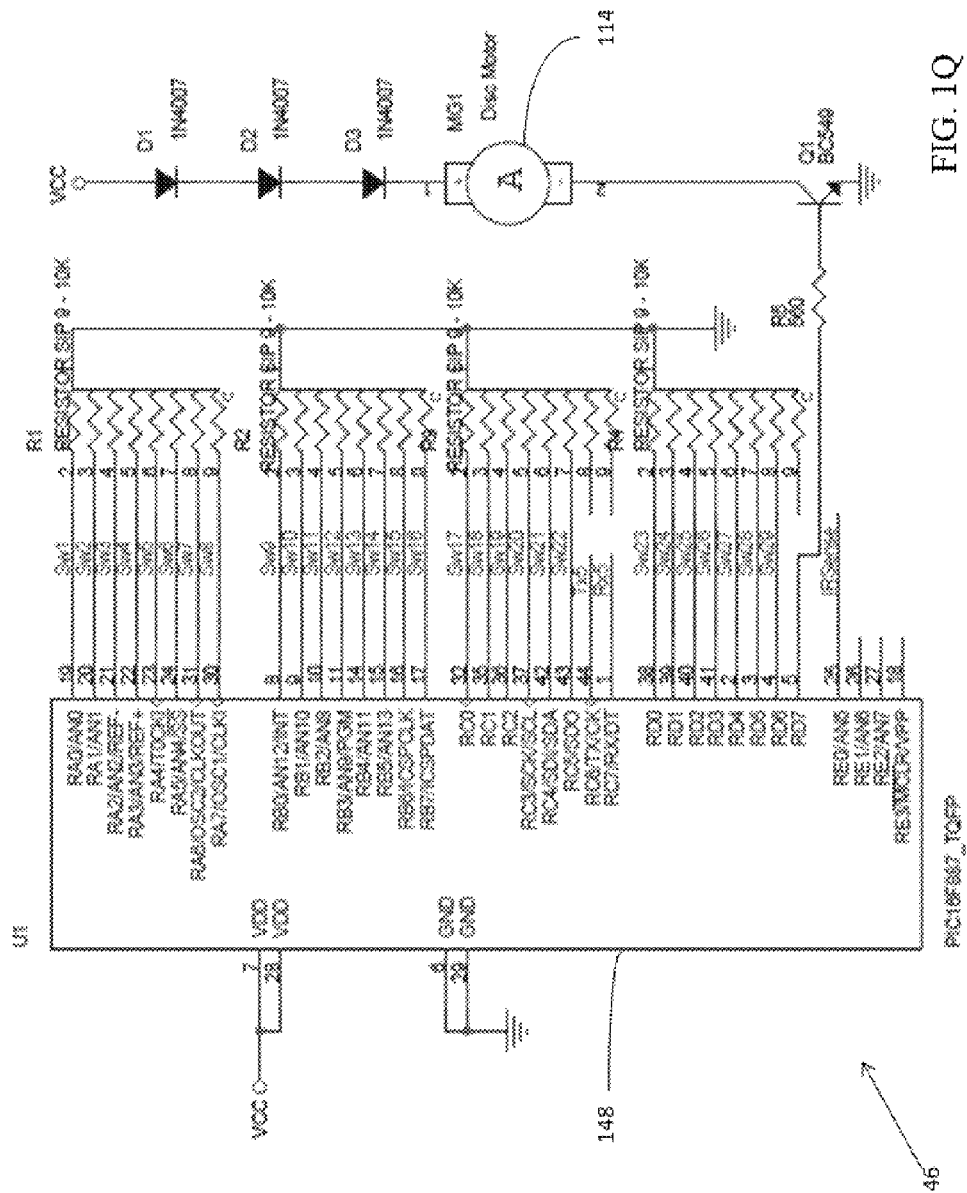
FIG. 1Q shows a microcontroller and connected vibrating motor and connected conductive traces.

FIG. 1Q shows a microcontroller and connected vibrating motor and connected conductive traces 46. The microcontroller 148 continuously samples the lines leading out from the edge connector (not shown) to detect which buttons are being pressed upon by the user—and transmits sampled data to a second controller (not shown) for further processing. The micro-controller 148 also controls the vibrating disc motor 114. The microcontroller 148 also samples the infrared proximity sensor (not shown) and communicates the sampled data to the second controller for further processing. Those familiar in the art will immediately recognize the usage of resistors in the schematic, for pull-up and pull-down purposes.

Figure 1R:
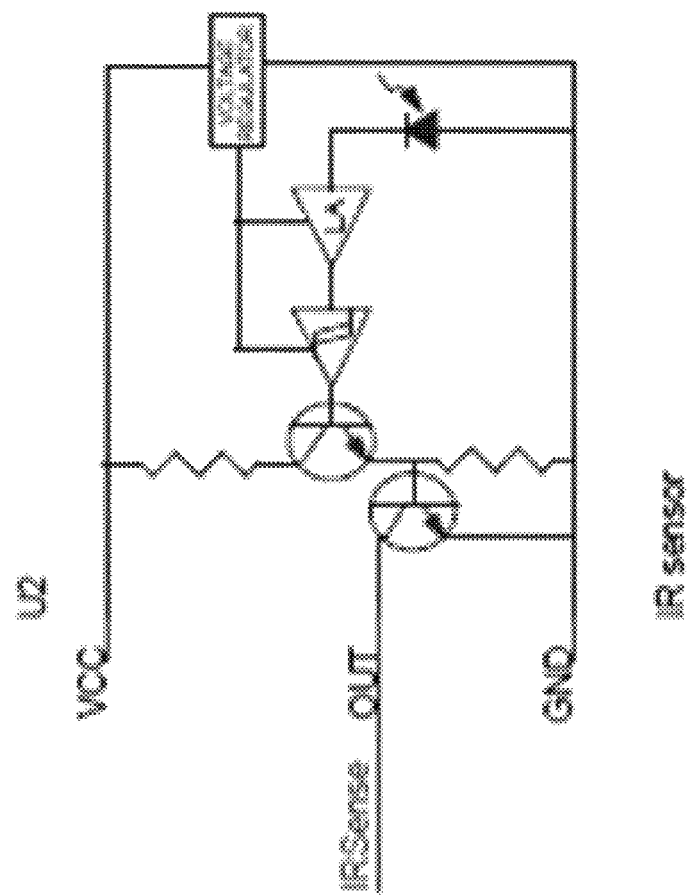
FIG. 1R shows a circuit for connecting to a proximity sensor.

FIG. 1R shows a circuit for connecting to a proximity sensor 47. The infrared proximity sensor 116 may be connected to the microcontroller 148 (not shown) using the circuit shown.

Figure 1S:
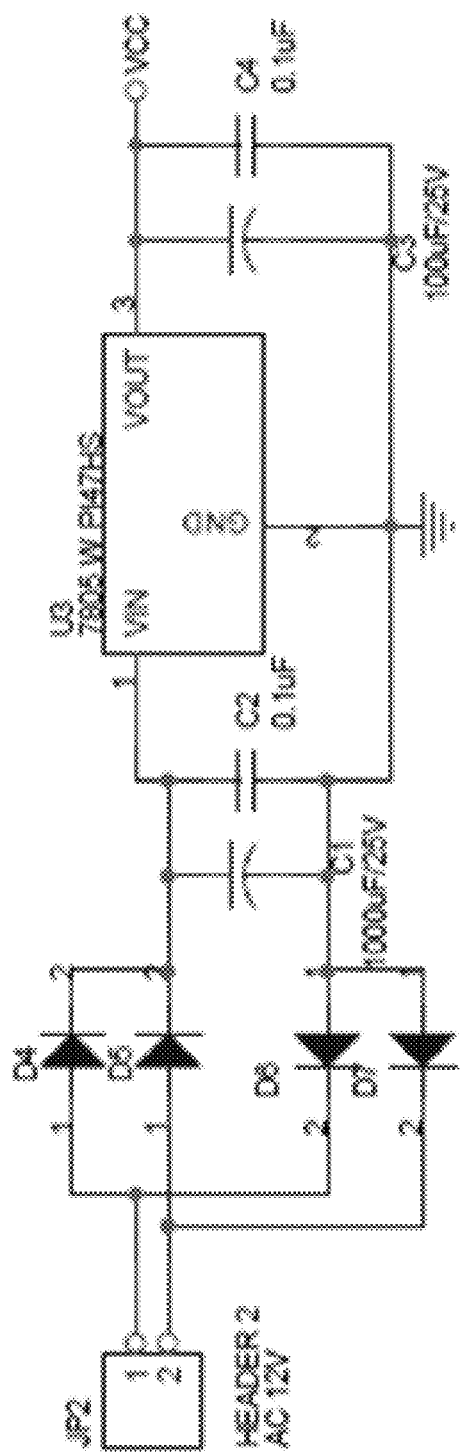
FIG. 1S shows a circuit for controlling input power to the invention.

FIG. 1S shows a circuit for controlling input power to device 54. Those familiar in the art will immediately recognize the components of this circuit, which carry the functionality of bringing down the current/voltage to lower levels for use in a low-voltage digital circuit.

Figure 2A:
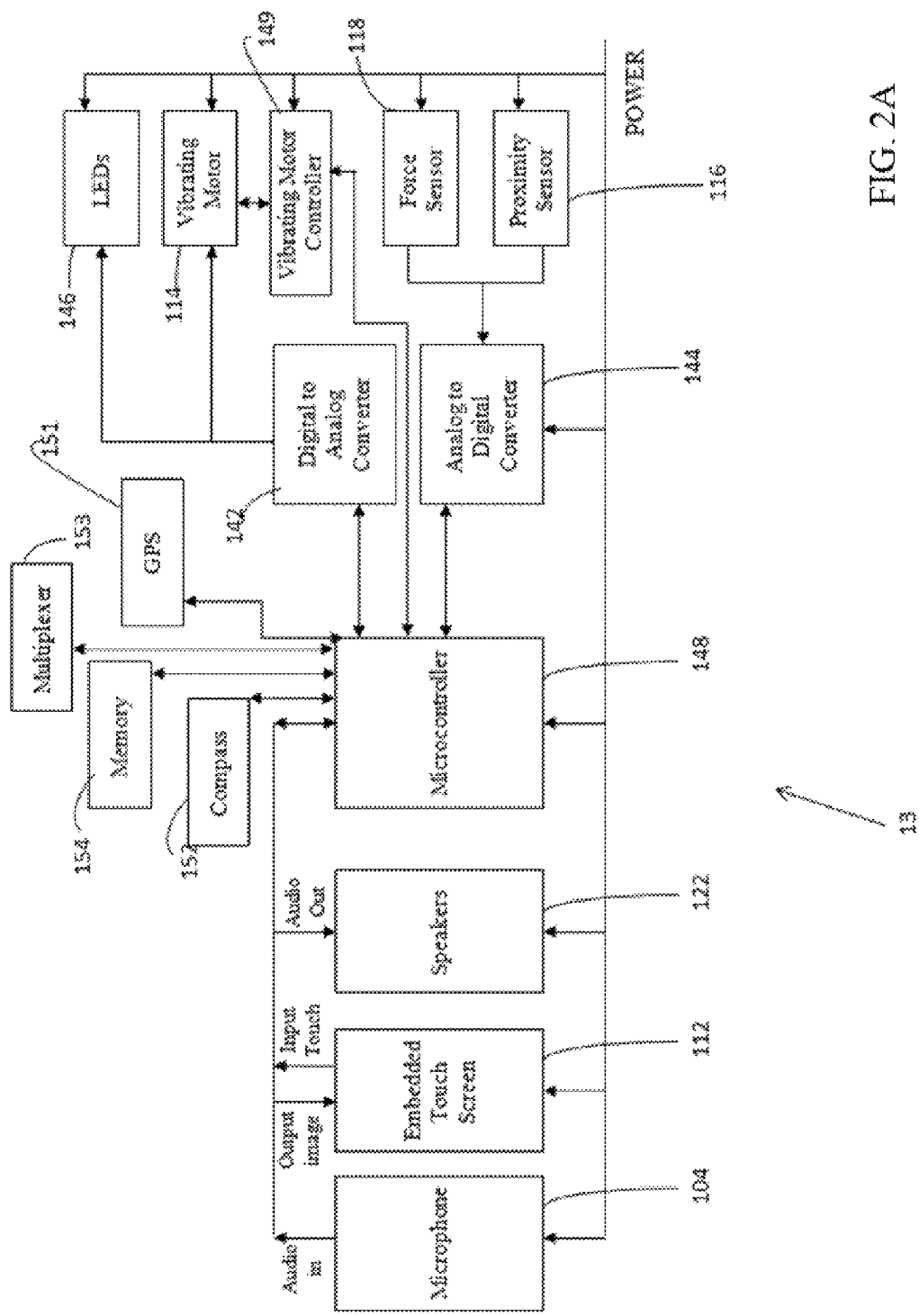
FIG. 2A is a block diagram illustrating certain hardware components of the invention.

FIG. 2A is a block diagram illustrating the major hardware components of the invention 13. Although only one force sensor 118 and one proximity sensor 116 are shown, the invention provides that a plurality of such sensors could be employed. A microcontroller 148 is connected to memory 154, analog to digital converter 144, digital to analog converter 142 and multiplexer 153. In addition, a sensor signal conditioning and conversion unit (not shown) is used to interact with the sensors. The digital to analog converter 142 is used to control the LEDs 146 in the frame (not shown) and the vibrating disc motor 114. The analog to digital converter 144 is used to convert the analog output values of the force sensor 118 and proximity sensor 116 to digital values. The software executing on the microcontroller 148 preferably uses the multiplexer 153 to continuously sample the analog sensors 118,116 using the analog to digital converter 144. Alternatively, digital sensors could be used and, in such a case, there is no need for the analog to digital converter. The software executing on the microcontroller 148 also uses the multiplexer 153 to switch the LEDs 146 on/off. A vibrating motor controller 149 is used to control the vibrating motors 114. The microcontroller 148 is also connected to an embedded microphone 104, screen 112, speakers 122 and electronic compass 152. The microcontroller 148 has embedded hardware modules with appropriate interfaces for communicating with such peripheral devices. A GPS chip 151, for example, may be connected to the microcontroller 148 to retrieve the current geographic location.

Figure 2B:
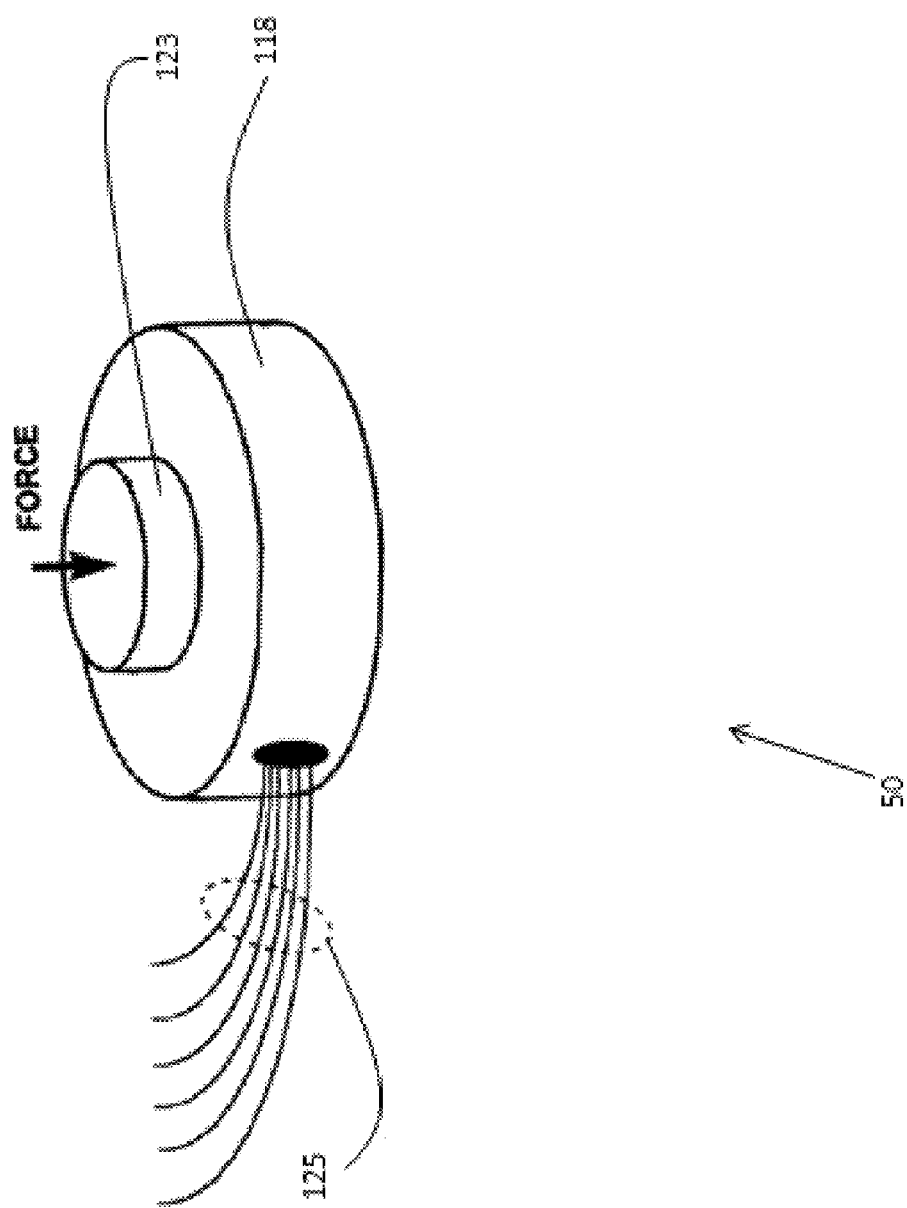
FIG. 2B shows an illustration of a force sensor used in the invention.

FIG. 2B shows an illustration 50 of a force sensor used in the present invention. The force sensor 118 comprises a moving head 123 that moves downward when pressed. The force sensor 118 produces a signal through the force sensor wires 125 corresponding to the displacement of the moving head 123. When the external force applied to the sensor 118 is removed, the sensor head 123 returns back to its original position. By way of example, and not limitation, the invention may employ a CUI Inc IESP-12 force sensor. Alternatively, any other force sensor could be used instead, whether capacitive-based or resistor-based or voltage/current operated. Those familiar in the art will immediately recognize how to connect a different force sensor, such as a Schaevitz FC23 load cell or Honeywell FSS1500NST, to the primary circuit of the invention described herein. In addition, it should be understood that the force sensors and detection means described herein further include nano touch sensors, whether currently-available or discovered hereafter.

Figure 2C:
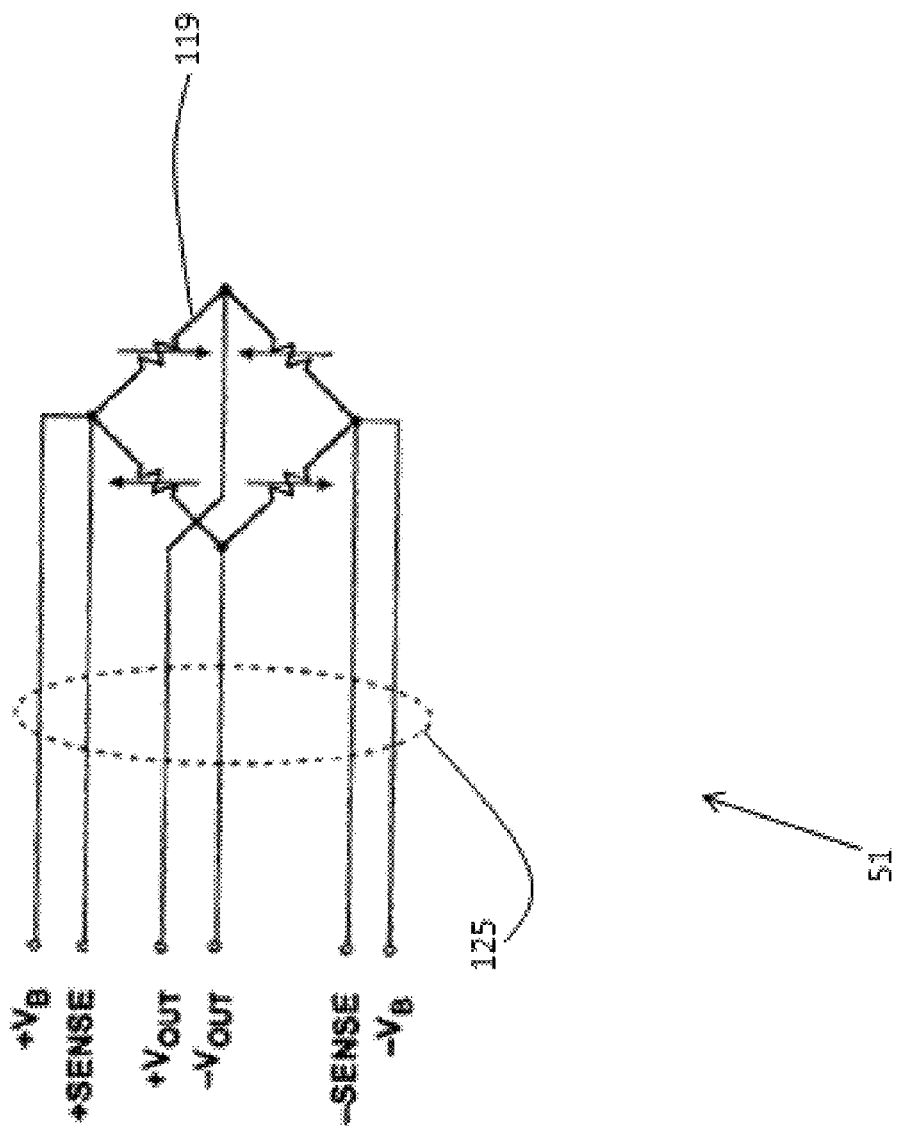
FIG. 2C shows an illustration of an exemplary internal circuit within the force sensor with connections.

FIG. 2C shows an illustration 51 of an exemplary internal circuit, and an interior force sensor and corresponding connections. The force sensor 118 produces a signal through the force sensor wires 125 corresponding to the displacement of the moving head 123. The internal circuit shown is an exemplary circuit and, therefore, other circuit designs could be used. Only the electrical component of the sensor is showed in the diagram.

Figure 2D:
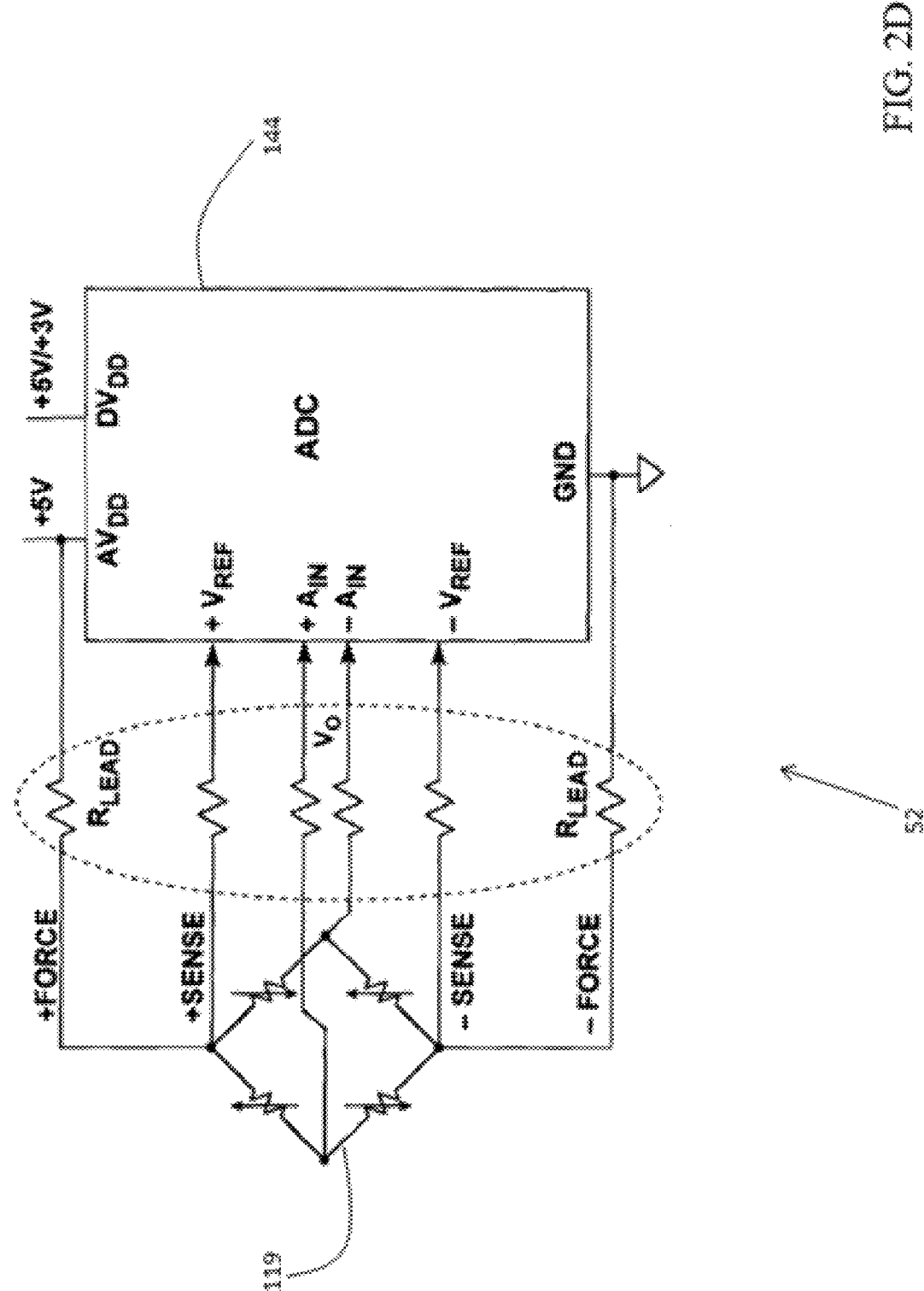
FIG. 2D shows an illustration for an exemplary force sensor connected to an analog digital converter.

FIG. 2D shows an illustration for an exemplary force sensor connected to an analog digital converter 52. The analog to digital converter 144 converts the analog output of the force sensor circuit 119 to a digital value for processing by the embedded processor (not shown).

Figure 2E:
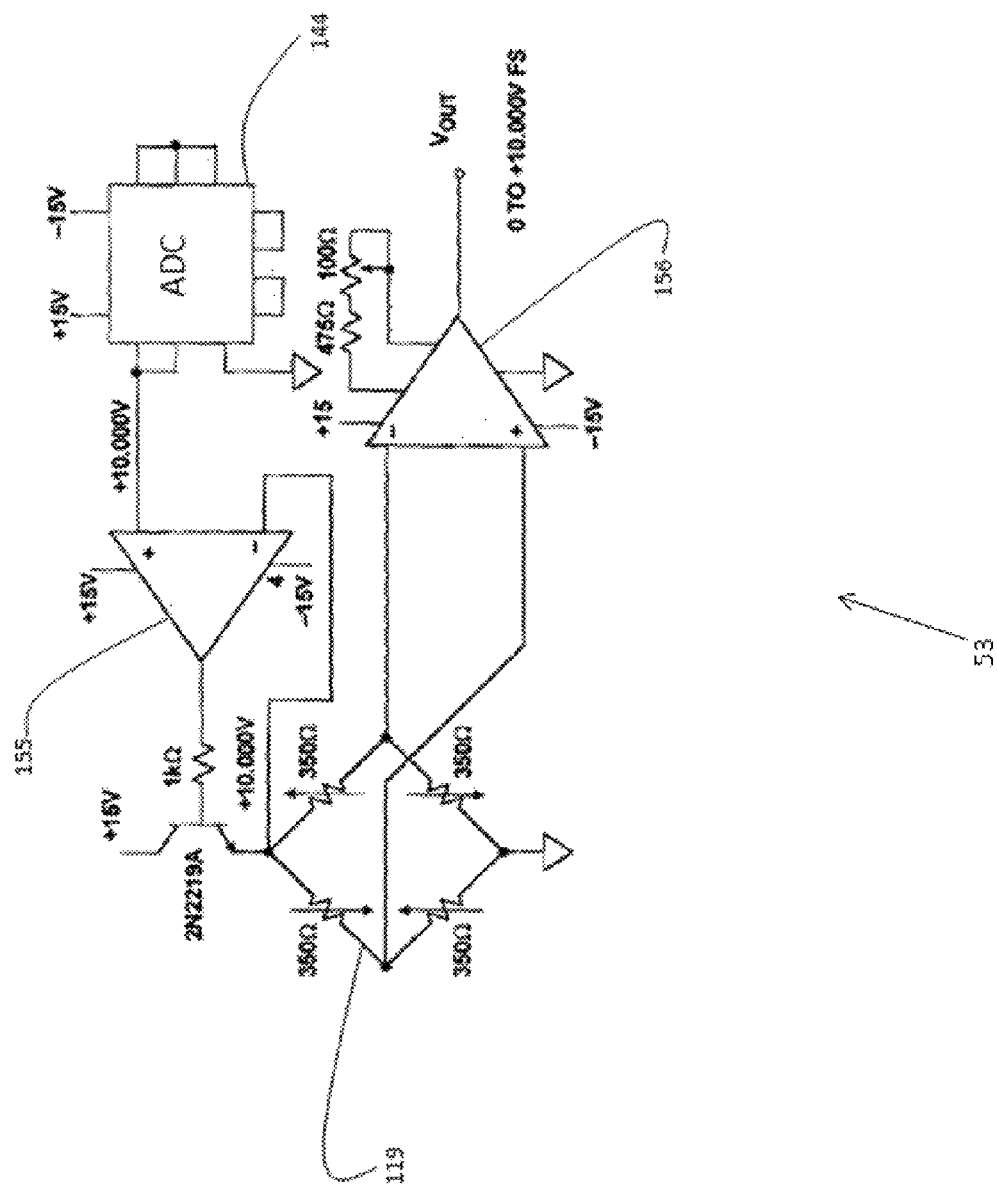
FIG. 2E shows an illustration for a force sensor connected to an amplifier connected to an analog digital converter.

FIG. 2E shows an illustration for a force sensor connected to an amplifier, which is connected to an analog digital converter 53. The analog to digital converter 144 converts the analog output of the force sensor circuit 119 to a digital value for processing by the embedded processor (not shown). An intermediary instrumentation amplifier 155 and operational amplifier 156 are used to amplify the analog signal from the force sensor circuit 119. The invention preferably uses the Analog Devices Inc. AD620 chip as an instrumentation amplifier, the Analog Devices Inc. OP177 chip as an operational amplifier and the Microchip Technology Inc. MCP3002 chip as an Analog to digital converter. The invention provides, however, that other operational amplifiers, ADCs and instrumentation amplifiers could be used.

Figure 2F:
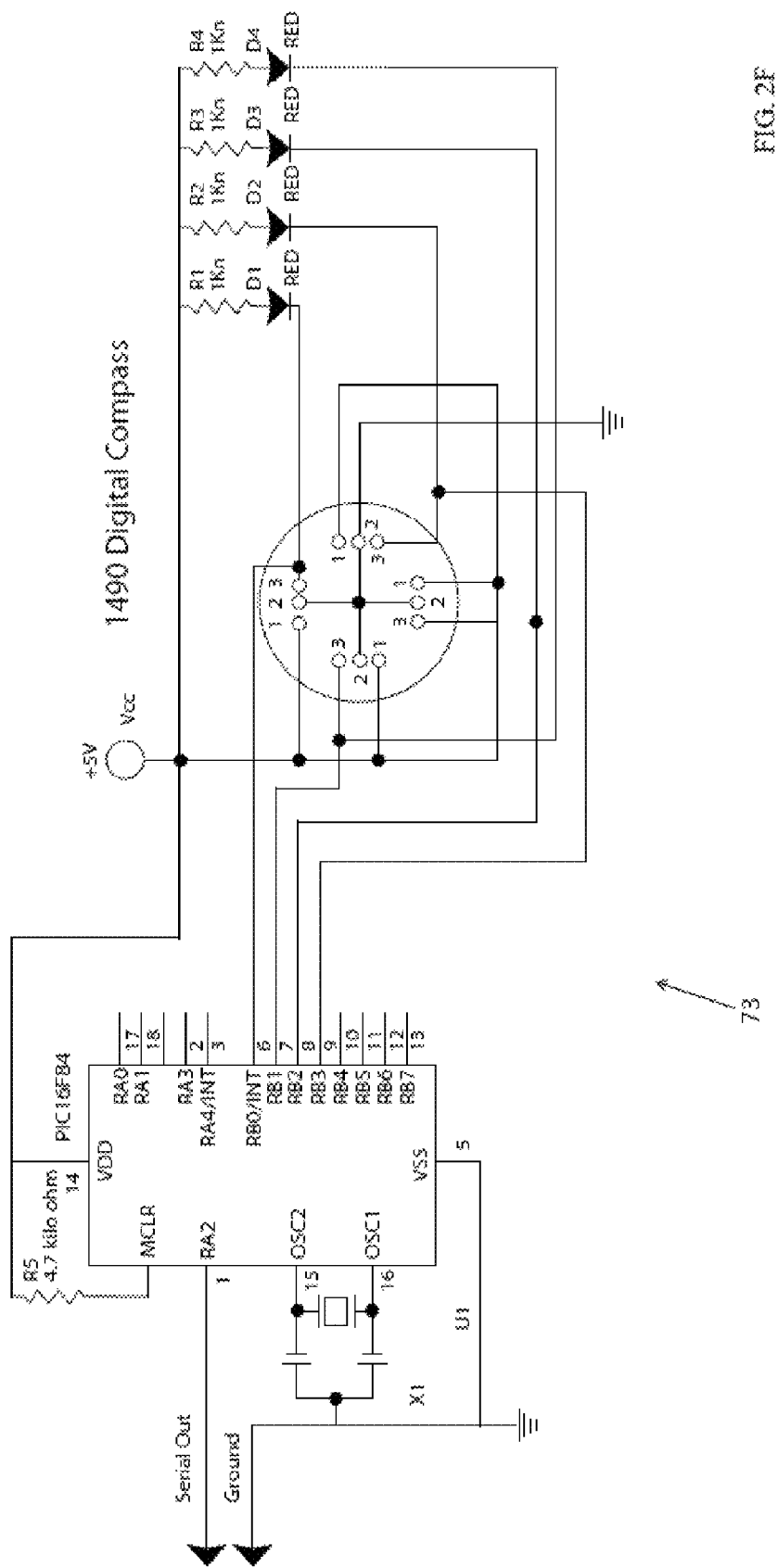
FIG. 2F shows a schematic for connecting an electronic compass to the invention's circuit.

FIG. 2F shows a schematic for connecting an electronic compass to the circuit of the device described herein 73. A Dinsmore 1490 digital compass 152 may be used. This sensor provides eight directions of heading information by measuring the magnetic field of the Earth using hall-effect technology. The 1490 sensor is internally designed to respond to directional change, similar to a liquid filled compass. It will return to the indicated direction from a 90-degree displacement in approximately 2.5 seconds, with no overswing. The 1490 can operate tilted up to 12-degrees with acceptable error. It is easily interfaced to digital circuitry and the microcontroller 148 described herein using only pull-up resistors as shown in the schematic.

Figure 2G:
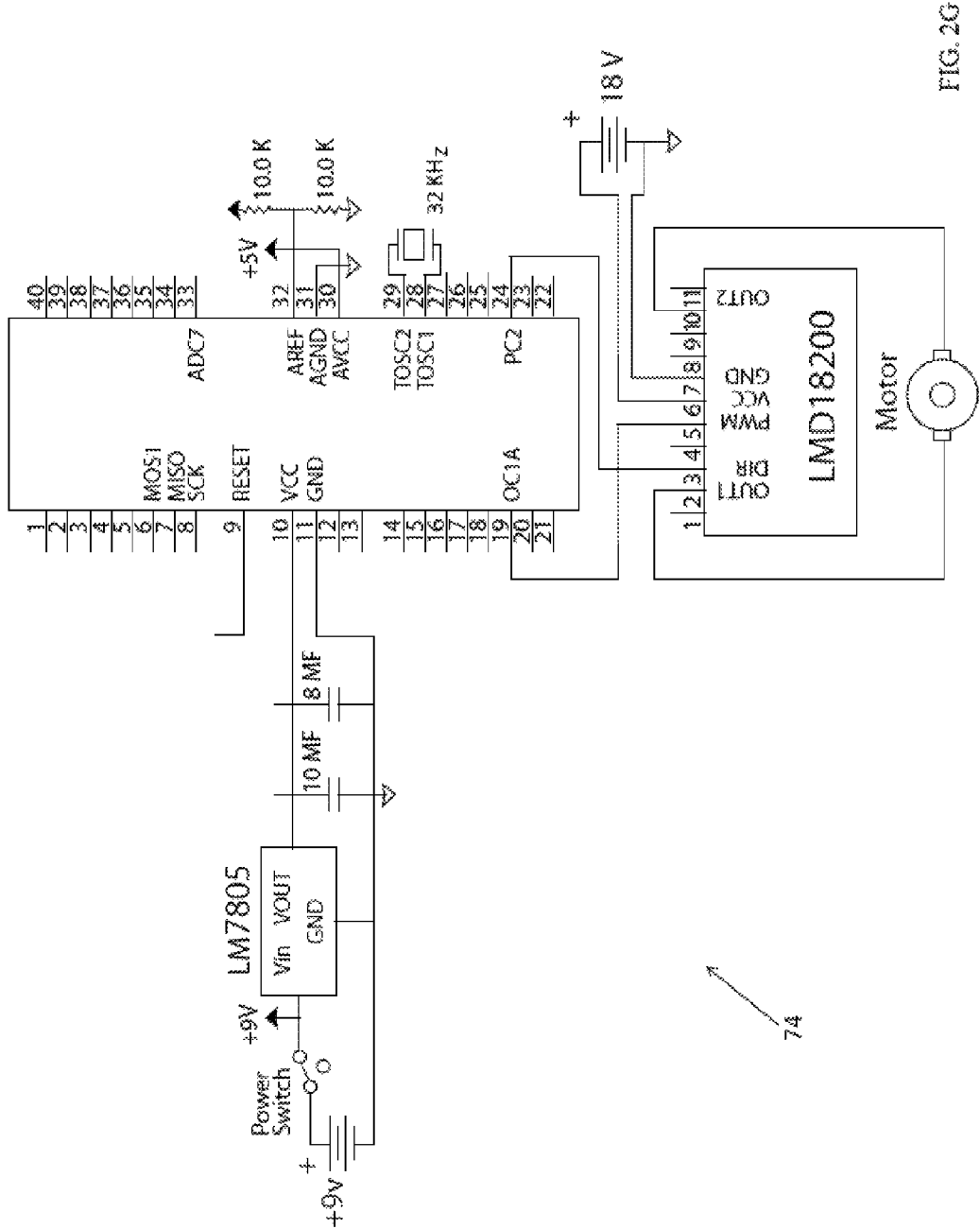
FIG. 2G shows a schematic for connecting a disc motor to the invention's circuit.

FIG. 2G shows a schematic for connecting a disc motor to the circuit 74. A motor is preferably controlled via an LMD18200 h-bridge chip, which is in turn connected to the microcontroller 148. Those familiar in the art will immediately recognize how to connect the terminals of the components shown in the schematics. Alternatively, a vibrating disc motor controller could be used to control the vibrating motor and the microcontroller will communicate with the vibrating disc motor controller using techniques well-known in the art.

Figure 2H:
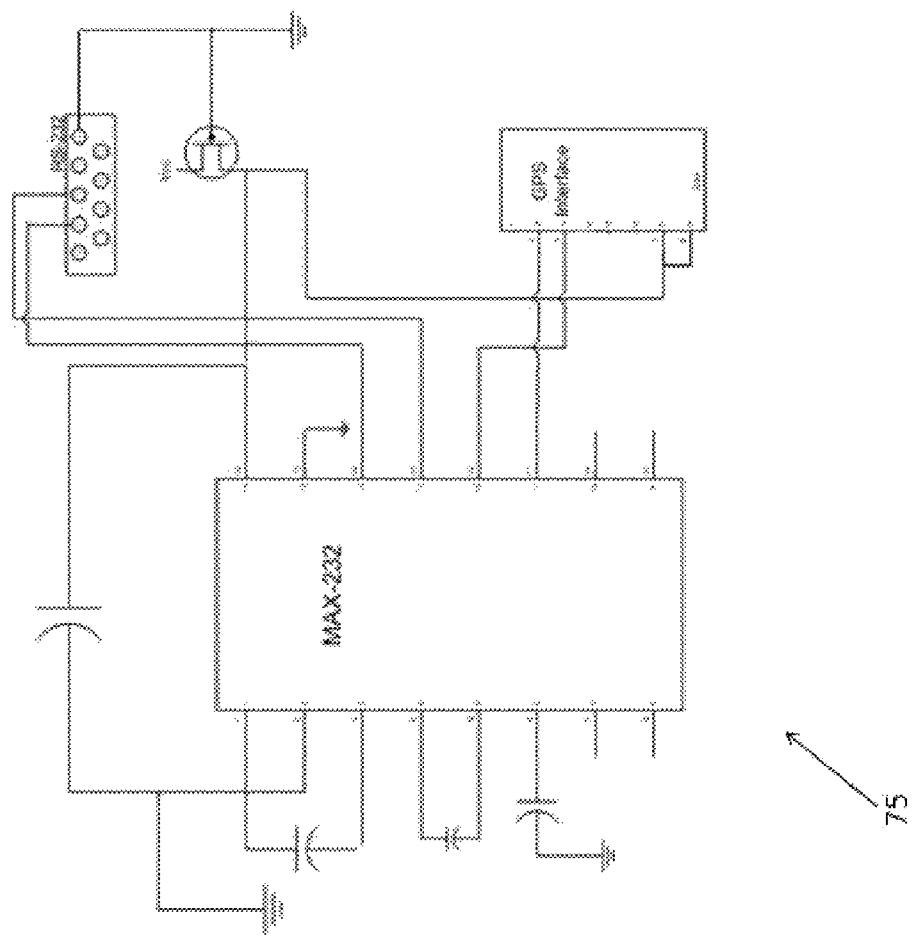
FIG. 2H shows a schematic for connecting a GPS chip to the invention's circuit.
Figure 21:
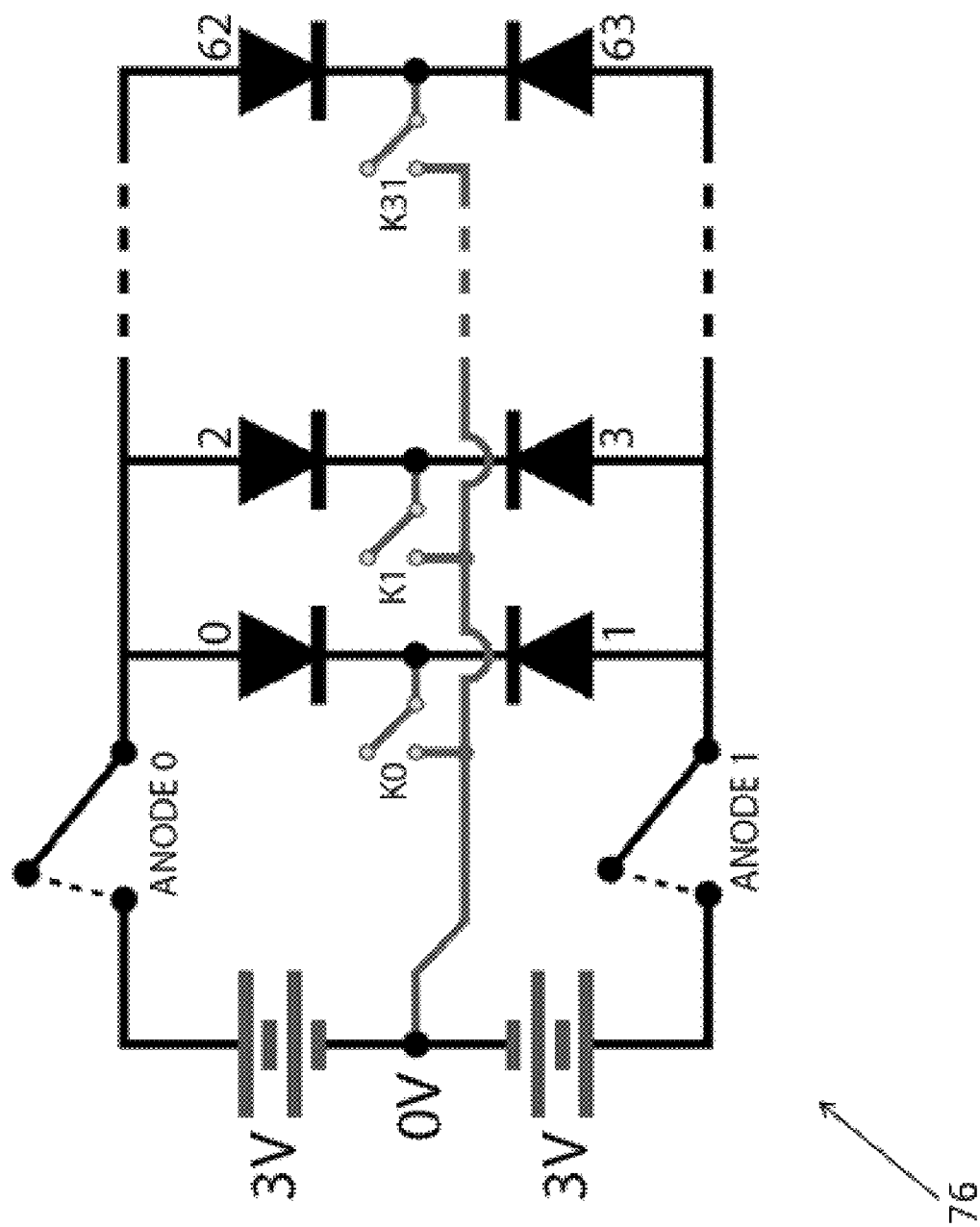

FIG. 2H shows a schematic for connecting a GPS chip to the circuit 75. Thales Navigation being provided by the GPS A12 OEM module. For the software to interpret and send commands to the module, a circuit is placed as illustrated. A max232 chip may be used to convert the 5V TTL output to a +/−10 Volts serial signal—and also to convert back from the +/−10 Volt serial into TTL. Five capacitors may be used to connect the data lines from the serial to the GPS. Power regulation may also be used, so that the module will not be damaged. The 12 Volts input from the power circuit may be regulated down to 5 Volts.

FIG. 2I shows a schematic for the circuit controlling the LED in the ambient display frame 76. The illustrated circuit shows connections for 64 LEDs. Most standard LEDs with colors such as red, amber, orange, yellow, and green have forward voltages below 3.0 Volts, and can be used with the Ambient display circuit by simply soldering the same to a connector-wire and inserting the wire into the circuit connector. Some green, blue, and white colored LEDs, as well as some ultra-bright LEDs, may have a forward voltage significantly higher than 3.0 Volts. Such LEDs will work with the primary circuit described herein, but may appear dimmer as less current will be flowing through the LED. The maximum current available below 3.0V is 30 mA. The ambient circuit operates as a 2.times.32 multiplexer with 2 anodes and 32 cathodes. The method in which LEDs are connected to the ambient circuit is illustrated above. The circuit operates as a constant-current controller, providing only as much voltage as is necessary for the LED to draw 30 mA. Adding a series resistor to protect LEDs from over current conditions is not necessary. LEDs with built-in series resistors will work, but will appear dimmer as power is dropped across the resistor. If the two anodes are joined together at any point, the circuit is reduced to a 32 LED controller providing 60 mA of current per LED.

Figure 2J:
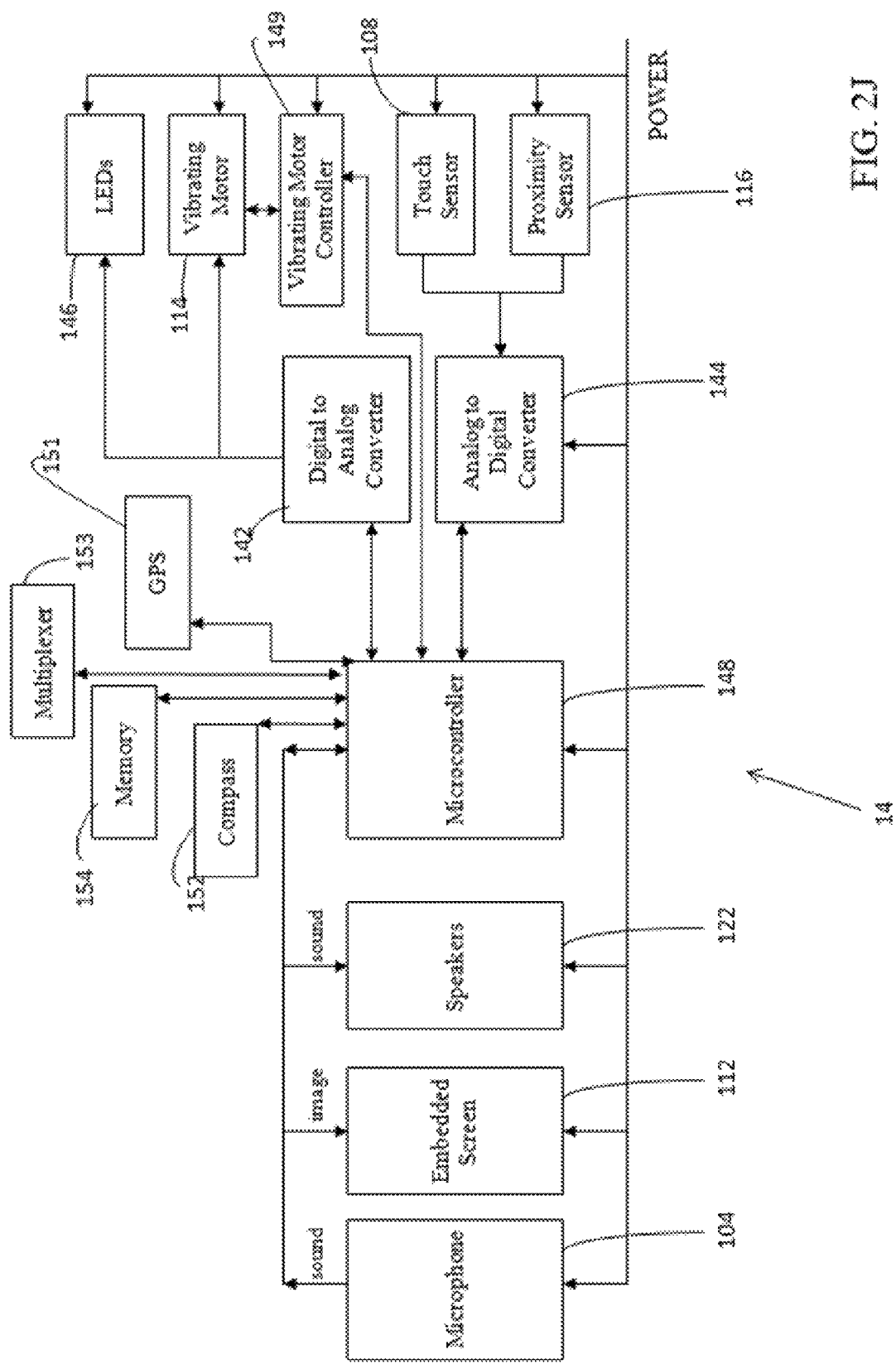
FIG. 2J is a block diagram illustrating an alternative set of hardware components of the invention.

FIG. 2J is a block diagram illustrating an alternative set of hardware components of the invention 14. In this alternative embodiment, a touch sensor 108 is employed instead of a force sensor. The software executing on the microcontroller 148 uses the multiplexer 153 to continuously sample the analog sensors 108,116 using the analog to digital converter 144. According to such embodiments, the device employs the use of a Quantum Research Group QT110 sensor. Alternatively, other touch sensors could be employed—e.g., capacitive-based, resistor-based, and/or voltage-current operated could be used. Those familiar in the art will immediately recognize how to connect such sensors to the primary circuit shown and described herein.

Instead of individual touch, proximity and force sensors, a matrix (plurality) of each of these sensors could be used. In this case, the sensors are sampled using the multiplexer 153. Alternatively, a sensor matrix board could have its own microcontroller—with the microcontroller 148 communicating with the matrix microcontroller using processor-to-processor communication protocols.

Figure 3A:
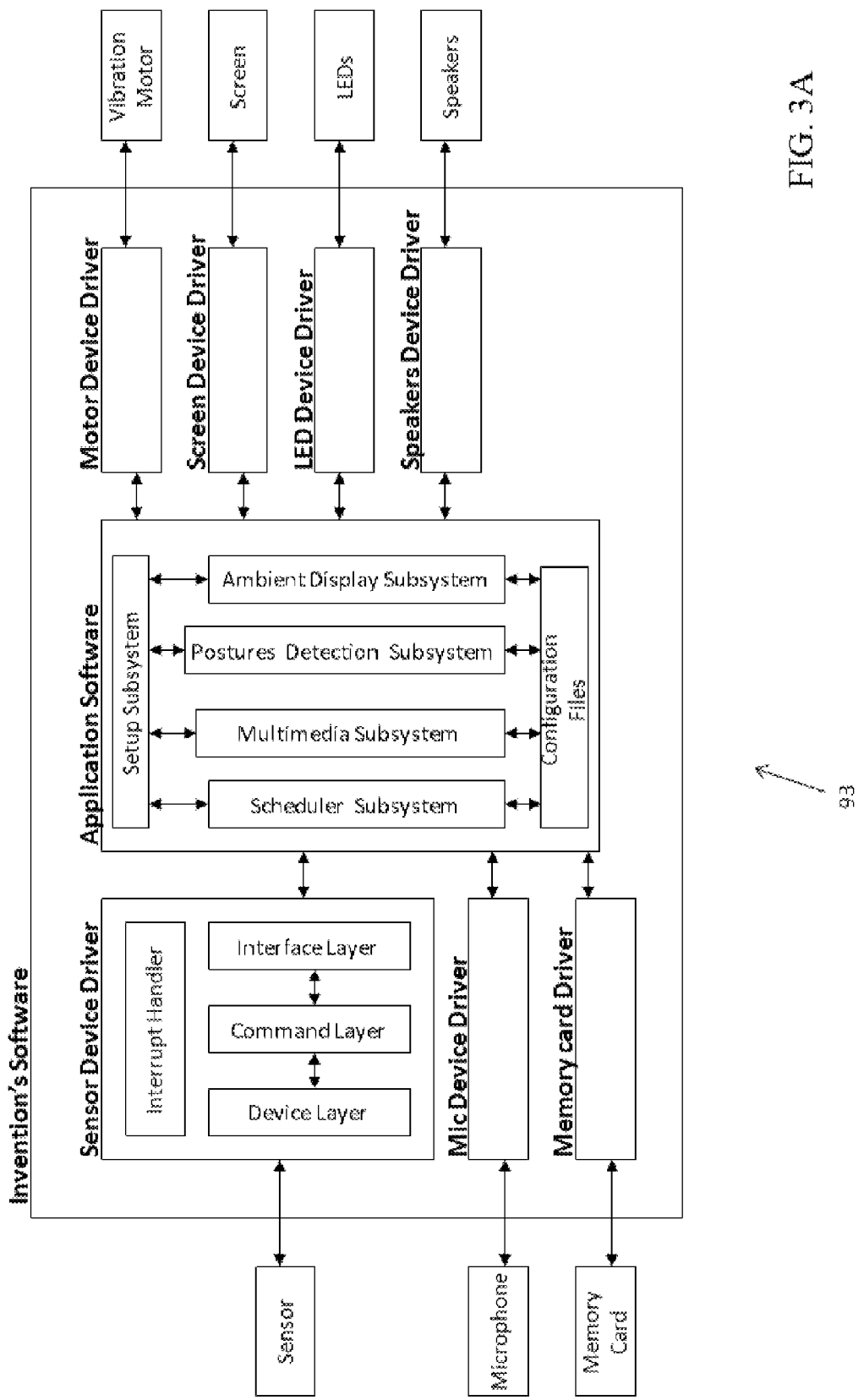
FIG. 3A is a block diagram that illustrates the main components of the invention's software.

FIG. 3A is a block diagram that illustrates the main components of the software 93, namely, the device drivers and the application software. In addition, the input and output hardware is shown. The sensor block refers to all sensors employed in the device, including GPS, compass, force, touch and proximity sensors.

The following will provide a description of the device driver subsystems.

Device Layer: the device layer is the lowest layer in the hierarchy. It provides the direct hardware access. The routines of this layer are the only routines which directly read and write the device registers. Therefore, the device layer is the only part of the driver which is substantially hardware dependent. The device layer routines map the device functionality nearly one to one. For each device feature there exists a device layer routine to use it. The routines are designed to perform just one elementary action on the device.

Command Layer: the command layer is the middle layer in the hierarchy. It contains routines to execute the functions which are invoked by the commands. The routines of this layer use the device layer routines to start the required actions and retrieve the requested status values.

Interface Layer: the interface layer forms the highest layer in the driver layer hierarchy. It provides the routines to install the driver and the devices, as well as the routines to connect to the operating system.

Interrupt Handler: the interrupt handler provides the routines to service interruptions generated by the hardware of the device.

The application software subsystems are described below.

Setup Subsystem: this subsystem is responsible for loading configuration files and initializing the application software using stored configuration.

Scheduler Subsystem: Using the information loaded from the activity-schedule file, the scheduler notifies the user with the approaches of an activity using ambient display or using syntactic or pre-recorded audio signals.

Multimedia Subsystem: displays scripture to the user and controls the speakers, and the microphone.

Activity Monitoring Subsystem: uses the services of the posture detection subsystem to detect the current posture of the system and uses the activity file loaded from the configuration subsystem to detect errors (or omissions and commissions) made by the user.

Posture Detection Subsystem: continuously samples input sensors (proximity/force, proximity/touch or camera) to determine the current body posture of the user.

Sensors subsystem: continuously samples the input sensors and provides readings to the posture detection subsystem.

Ambient Display Subsystem: switches on/off the notification LEDs based on requests from the microcontroller.

Configuration subsystem: controls access to configuration files stored in permanent memory of the device and enables the user to update the configuration files.

FIGS. 3B, 3C, 3D, 3E, 3F and 3G show exemplary content of the configuration files described herein. Each of these files consists of separate columns, wherein each column is used to store a specific configuration parameter. Alternatively, these files could be stored as XML or any other file format. The first row in each file preferably contains the title of each column. Starting from the second row is representative of a configuration entity. The user uploads those files to the device using a memory card input component 27.

The following provides a description of each of the configuration files.

Figure 3B:
FIG. 3B shows an exemplary sensors-sets configuration file.

FIG. 3B shows an exemplary sensors-sets configuration file 700. The sensors are numbered from the top left corner of the ritual panel to the bottom right corner of the ritual panel. Each sensor has a unique identifier. Sensors are grouped into sets, whereby each set has a unique identifier. A set of sensors consists of one or more sensors. This file documents the grouping of the sensors into sets.

Figure 3C:
FIG. 3C shows an exemplary step-description configuration file.

FIG. 3C shows an exemplary step-description configuration file 701. Each step is identified by a unique index which is listed in the first column. The second column provides a step name, followed by a range of values associated with each of the sensors-set. Only 5 sensors-sets are shown. For sensors sets that have more than 1 sensor, the range of values is the average of the sensor readings in that set. Hence, for the step named jeloos to be detected, the sensors-set 1 range must be within 75 to 150, and the sensors-set 2 range must be within 120 to 600, etc.

FIG. 3D shows an exemplary ritual-description configuration file 702. This file details the time and date of every ritual and whether it is mandatory or not (required for operation of the peripheral progressive display operation). The first column—ritual index is an integer that refers to the ritual described in the same row. The second column refers to the ritual name. The third and fourth column refers to the time and dates on which this ritual must be performed. The time column could be a specific time or a time range. The following column refers to whether this activity is mandatory or optional. The required steps column contains a list of indexes to steps that must be performed for the successful completion of the ritual. If the user performs an error, the required steps, including the error correction steps, are included in the last column.

Figure 3E:
FIG. 3E shows an exemplary error-description configuration file.

FIG. 3E shows an exemplary error-description configuration file 704. Each error has a unique index, a description, and what range of values for each sensors-set will cause the error to be detected. For example, to detect that the user is putting his hands close to head in kneeling, the sensors-set 1 range must be within 200 and 300, the sensors-set 2 range must be within 450 and 760, the sensors-set 3 must be within the range 150 and 250, while sensors-set 4 must be within 75 and 190.

Figure 3F:
FIG. 3F shows an exemplary content-description configuration file.

FIG. 3F shows an exemplary content-description configuration file 705. The content associated with every step in every ritual is described in each row. The content could be either a phrase from some text—5th column, a translation of some text—6th column, a transliteration of some text—7th column, audio content—8th column, an image—9th column, audio content—10th column, or video content—11th column. The exemplary content-description configuration file shown in FIG. 3F does not show the content of the translation, transliteration, image, audio-content and video-content.

FIG. 3G shows an exemplary direction-description file 706. Each location is identified by name and geographic location. Also, each location has a 3D model in (.obj) file format, stored in the last column of the file. Alternatively, other 3D file formats could be used.

Figure 3H:
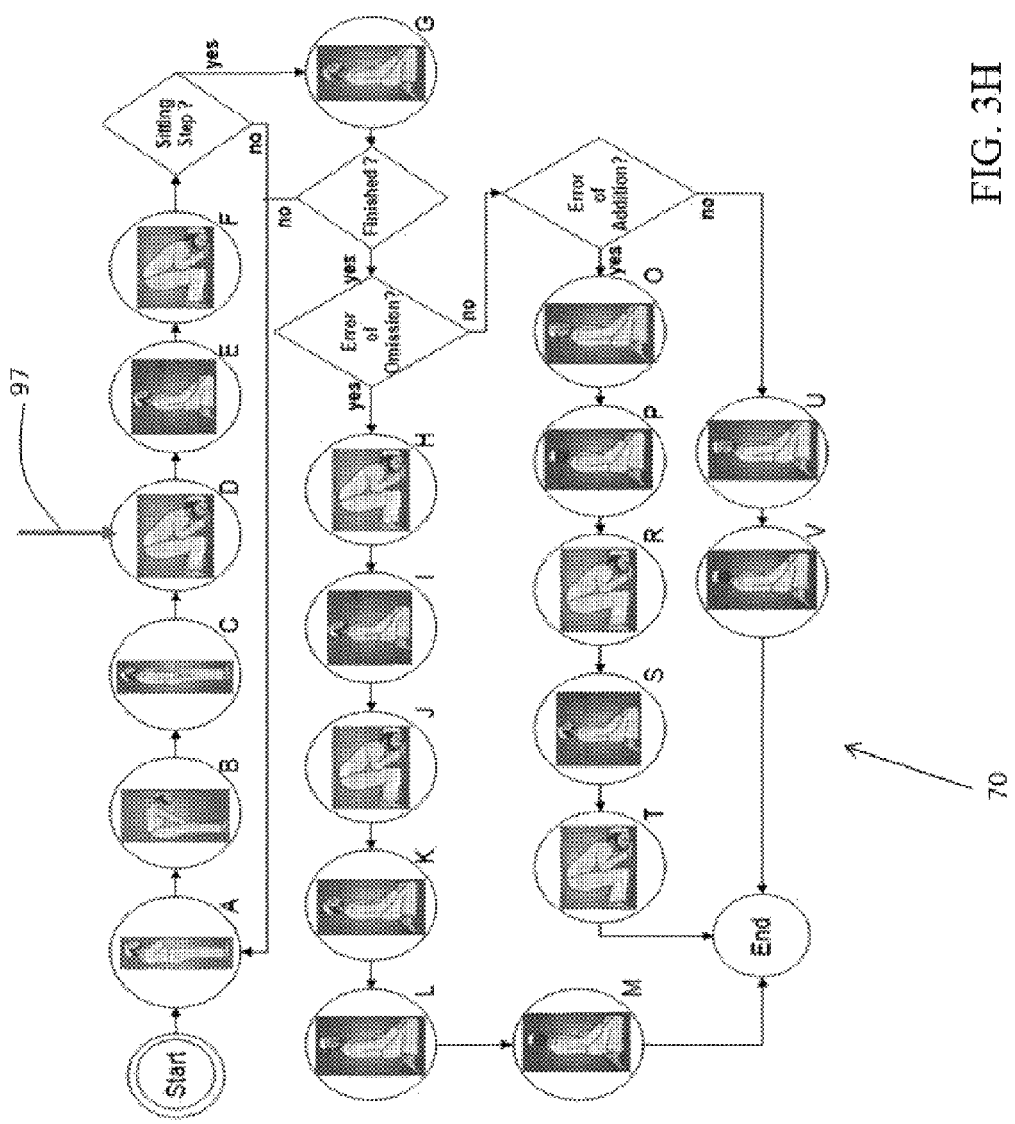
FIG. 3H shows exemplary flow state diagram of correct prayer posture and predetermined sequence.

FIG. 3H shows an exemplary flow state diagram of a correct prayer posture and predetermined sequence 70. The software maintains a virtual pointer 97, in memory, to the current state the user is performing. The software running on the embedded processor (not shown) uses this flow state diagram to determine if the user is performing the right sequence of steps, and if the user is performing each step correctly.

FIG. 3I shows a flow chart diagram describing the method used in the invention for assisting in performance of ritual 707. Those familiar in the art will recognize how to translate such flowchart into a program to be executed on the microcontroller described herein.

Figure 4A:
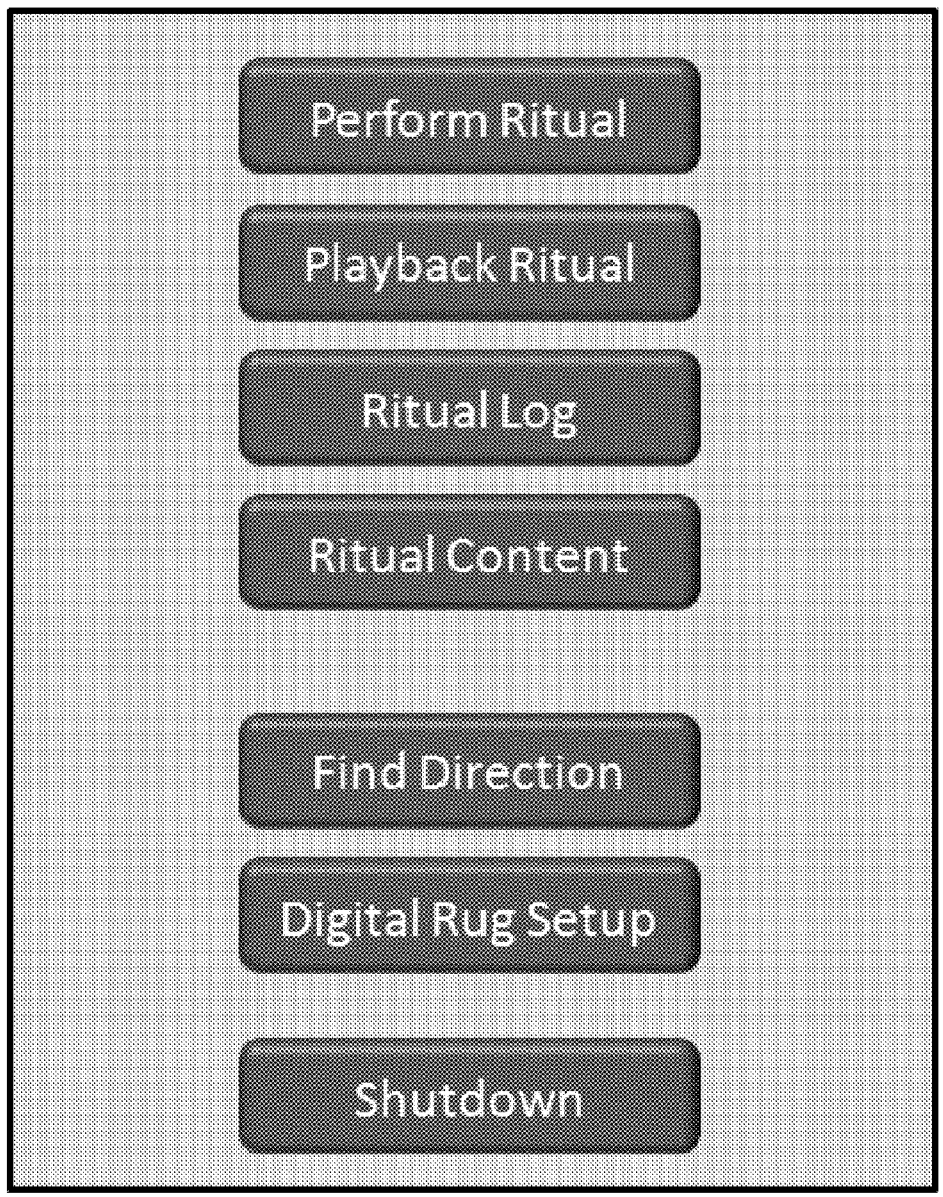
FIG. 4A shows a screen capture of the graphical user interface of the startup screen of the invention's software.

FIG. 4A shows a screen capture 60 of the graphical user interface of the startup screen of the software. The software running on the embedded processor (not shown) displays options to the user to perform a prayer, playback the recording of a prayer, view the performed prayer log, view religious issues, find the direction towards a specific location, setup the digital prayer rug, and shutdown the system.

Figure 4B:
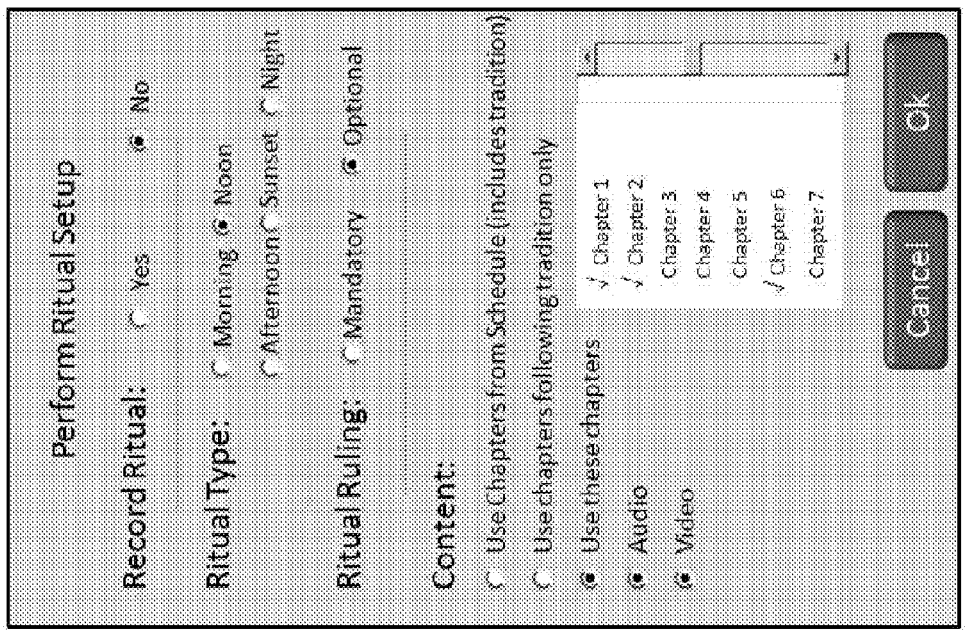
FIG. 4B shows a screen capture of the graphical user interface for the invention's feature involving the setup of the prayer performance.

FIG. 4B shows a screen capture 61 of the graphical user interface for the feature of the device that involves the setup of the prayer performance. The software running on the embedded processor (not shown) displays options to select which prayer to perform and which scripture will be displayed during the prayer.

Figure 4C:
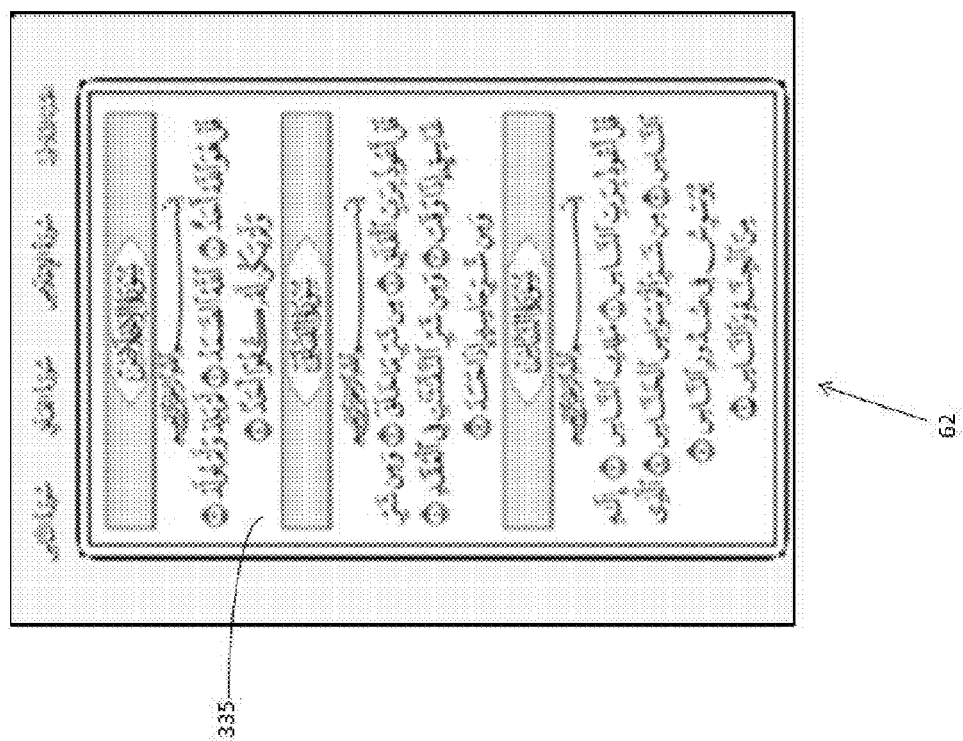
FIG. 4C shows a screen capture of the graphical user interface for the invention's feature involving the display of scripture in its original language.

FIG. 4C shows a screen capture 62 of the graphical user interface for the feature involving the display of scripture in original language. The software running on the embedded processor (not shown) displays the scripture 335 in the original language of the scripture.

Figure 4D:
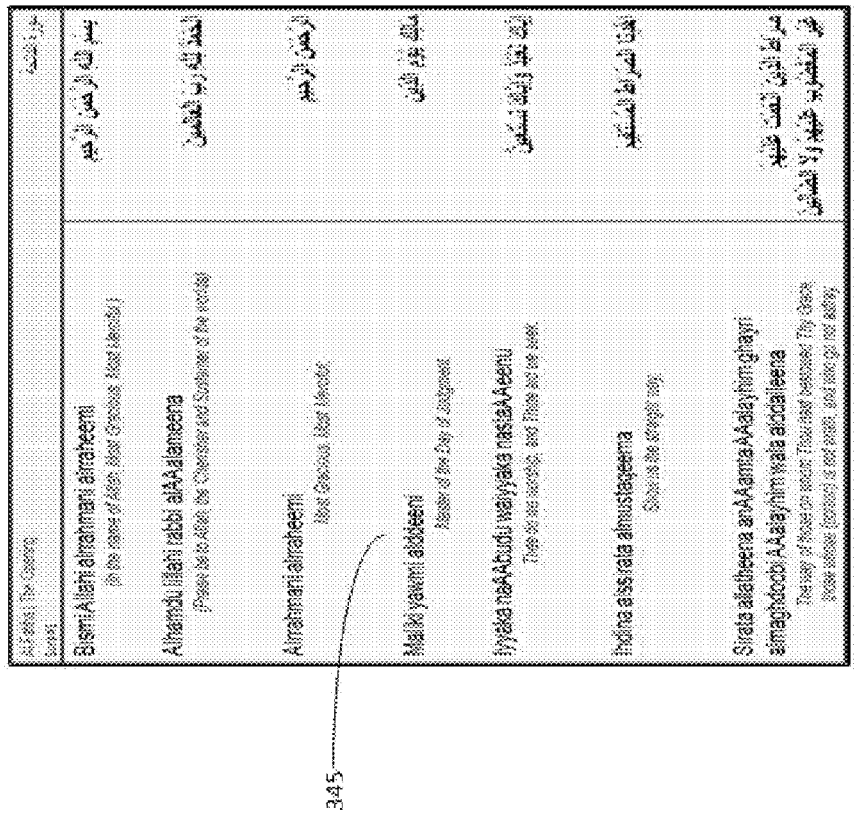
FIG. 4D shows a screen capture of the graphical user interface for the invention's feature involving the display of scripture with translation and transliteration.

FIG. 4D shows a screen capture 63 of the graphical user interface for the feature involving the display of scripture with translation and transliteration. The software running on the embedded processor (not shown) displays the scripture 335 in the original language of the scripture, which is accompanied by translation and transliteration 345 of the scripture in the language chosen by the user.

Figure 4E:
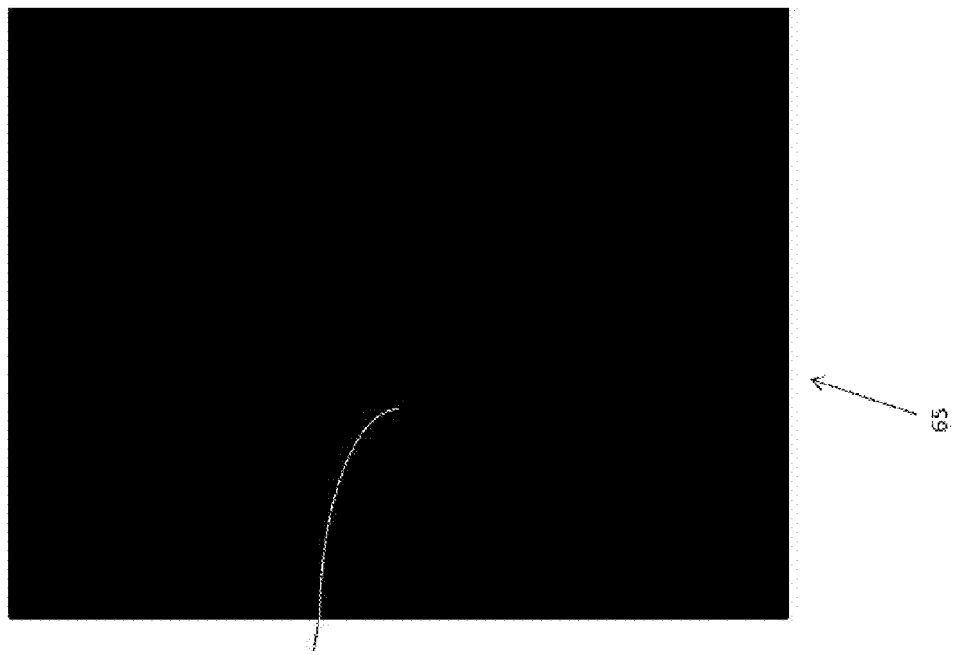
FIG. 4E shows a screen capture of the graphical user interface for the invention's feature involving the display of a blank screen during mandatory prayer.

FIG. 4E shows a screen capture 64 of the graphical user interface for the feature involving the display of a blank screen during mandatory prayer. The software running on the embedded processor (not shown) displays a blank screen 355 in the case of mandatory prayer.

Figure 4F:
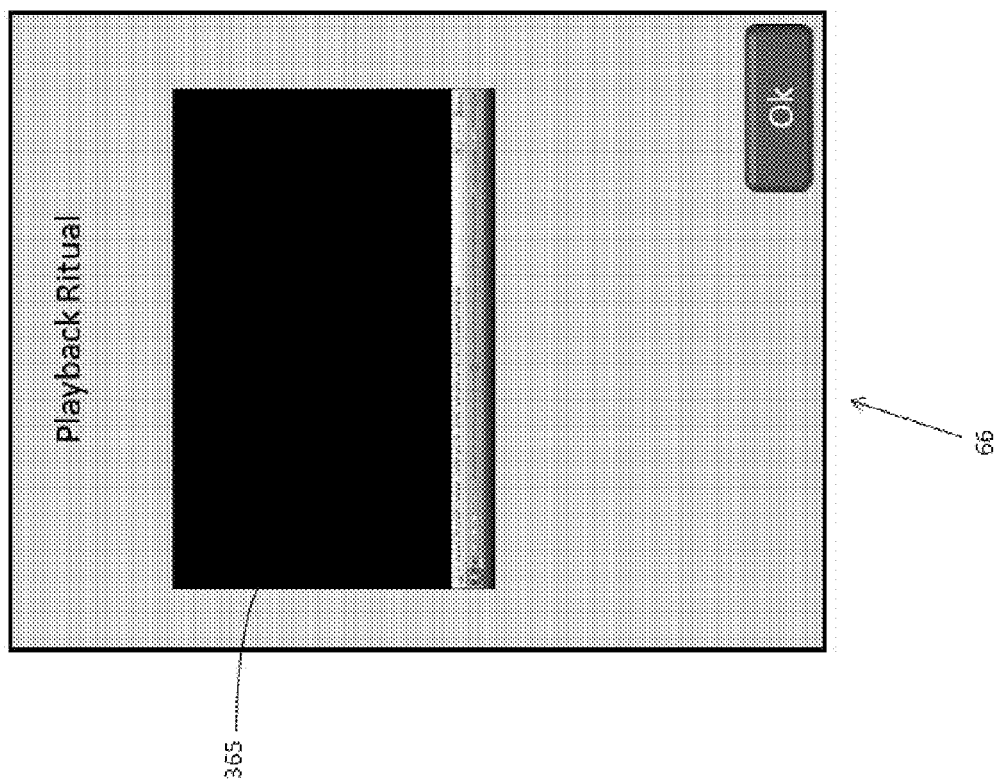
FIG. 4F shows a screen capture of the graphical user interface for the invention's feature involving the playback of recorded prayer.

FIG. 4F shows a screen capture 66 of the graphical user interface for the feature involving the playback of recorded prayer. The software running on the embedded processor (not shown) initializes and displays an embedded software component 365 to play a video showing the steps performed by the user during prayer.

Figure 4G:
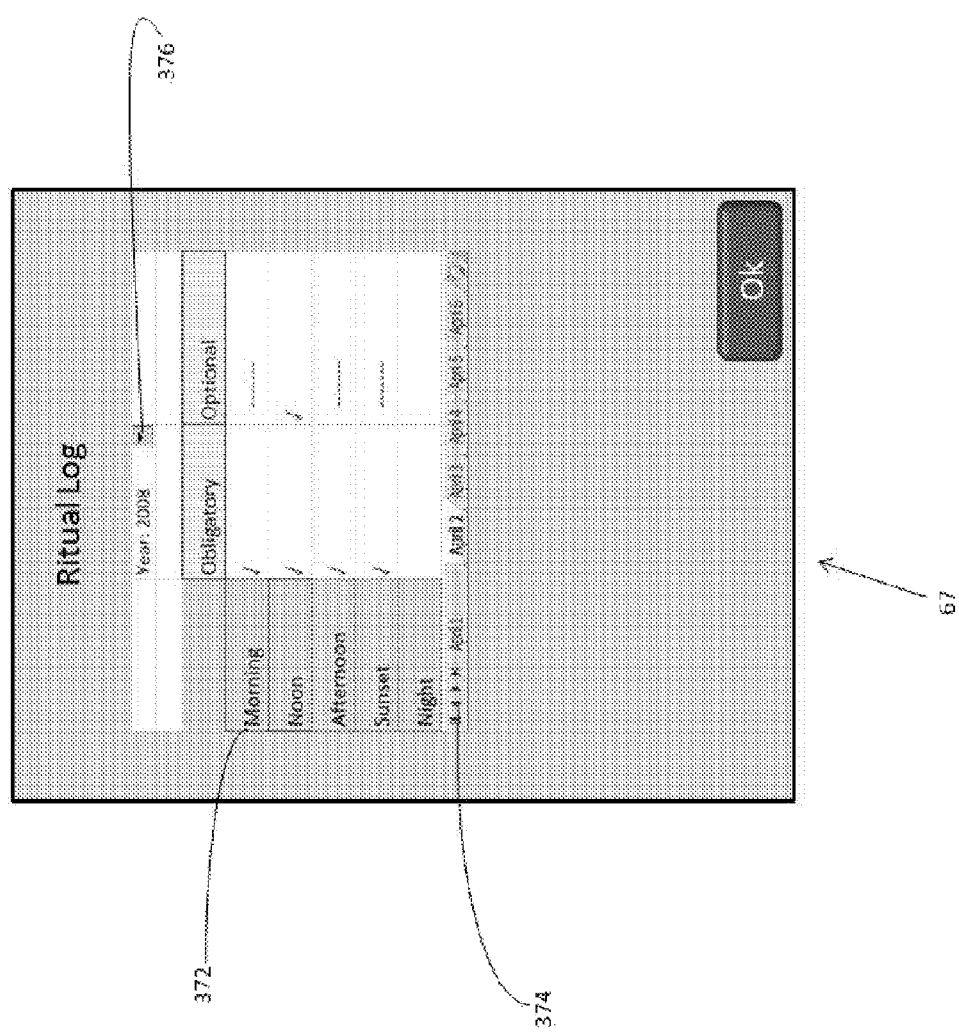
FIG. 4G shows a screen capture of the graphical user interface for the invention's feature involving the display of prayer log.

FIG. 4G shows a screen capture 67 of the graphical user interface for the feature involving the display of prayer log. The software running on the embedded processor (not shown) displays a table of performed and missed prayers 372 with a facility to choose a particular day in the past 374 to enable the user to check the performed prayers.

Figure 4H:
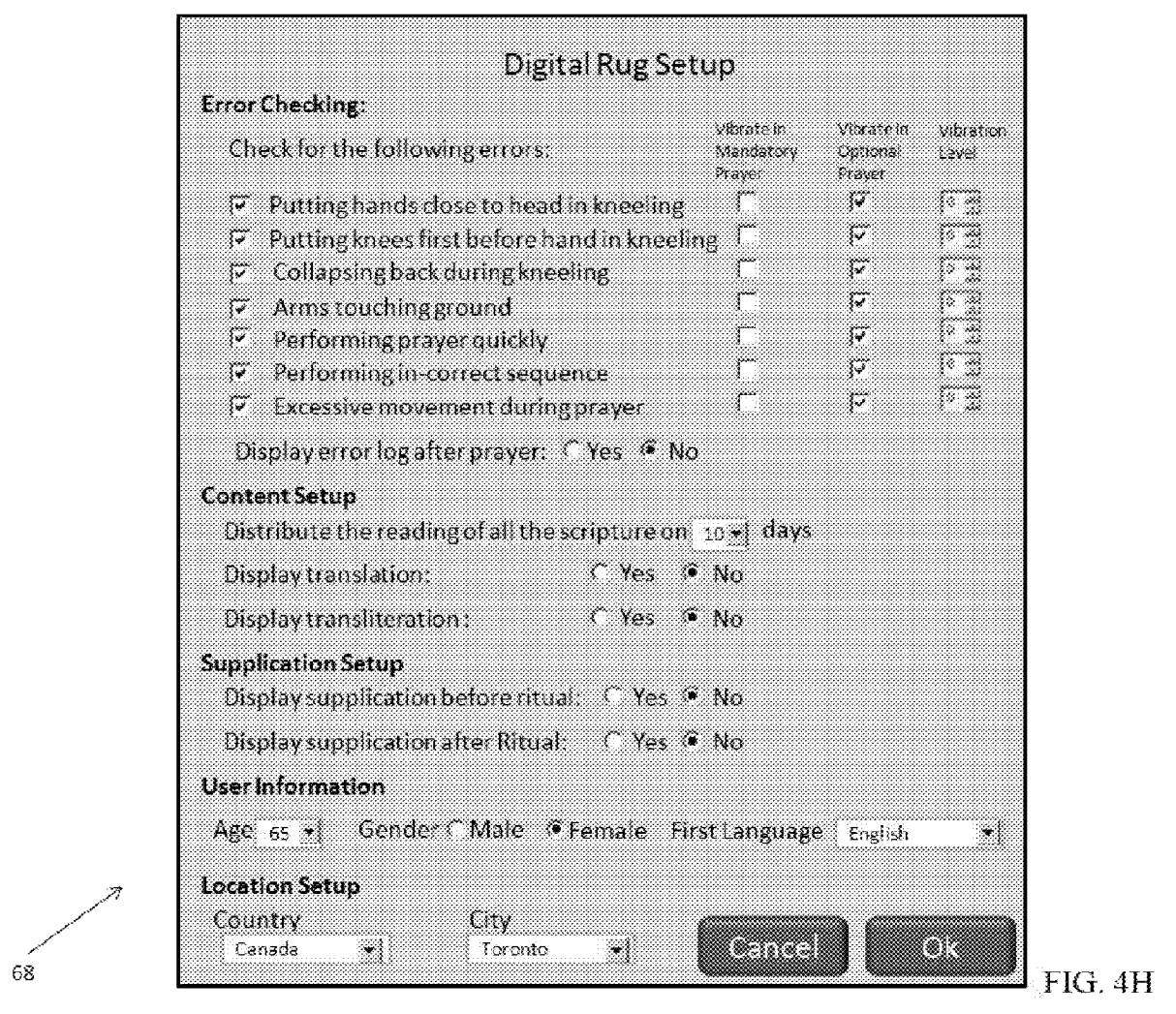

FIG. 4H shows a screen capture 68 of the graphical user interface for the feature involving the setup of the invention. The software running on the embedded processor (not shown) displays options for the user to chose the kind of errors that the invention checks, the setup of the scripture and the supplication setup. In addition, the user's profile information may be shown.

FIG. 5A is a perspective exploded view of a fifth alternative embodiment of the invention 59. In this alternative embodiment, the invention comprises two parts, namely, a display panel 98 and a ritual panel 99. The display panel 98 comprises a screen 108, microphone 104, speakers 122, and two progressive display frames 133. Each progressive display frame 133 comprises a plurality of LEDs of several different colors. For example, blue LEDs 136 may be used to indicate to the user that the day is a special religious day, and the white LEDs 134 may inform the user about the amount of time remaining for the current prayer time to expire. The red LEDs 138 may inform the user that the current prayer time has almost expired. In addition, the display panel may comprise a camera 106. According to such embodiments, the ritual panel 99 only contains a vibrating disc motor 114.

Figure 5B:
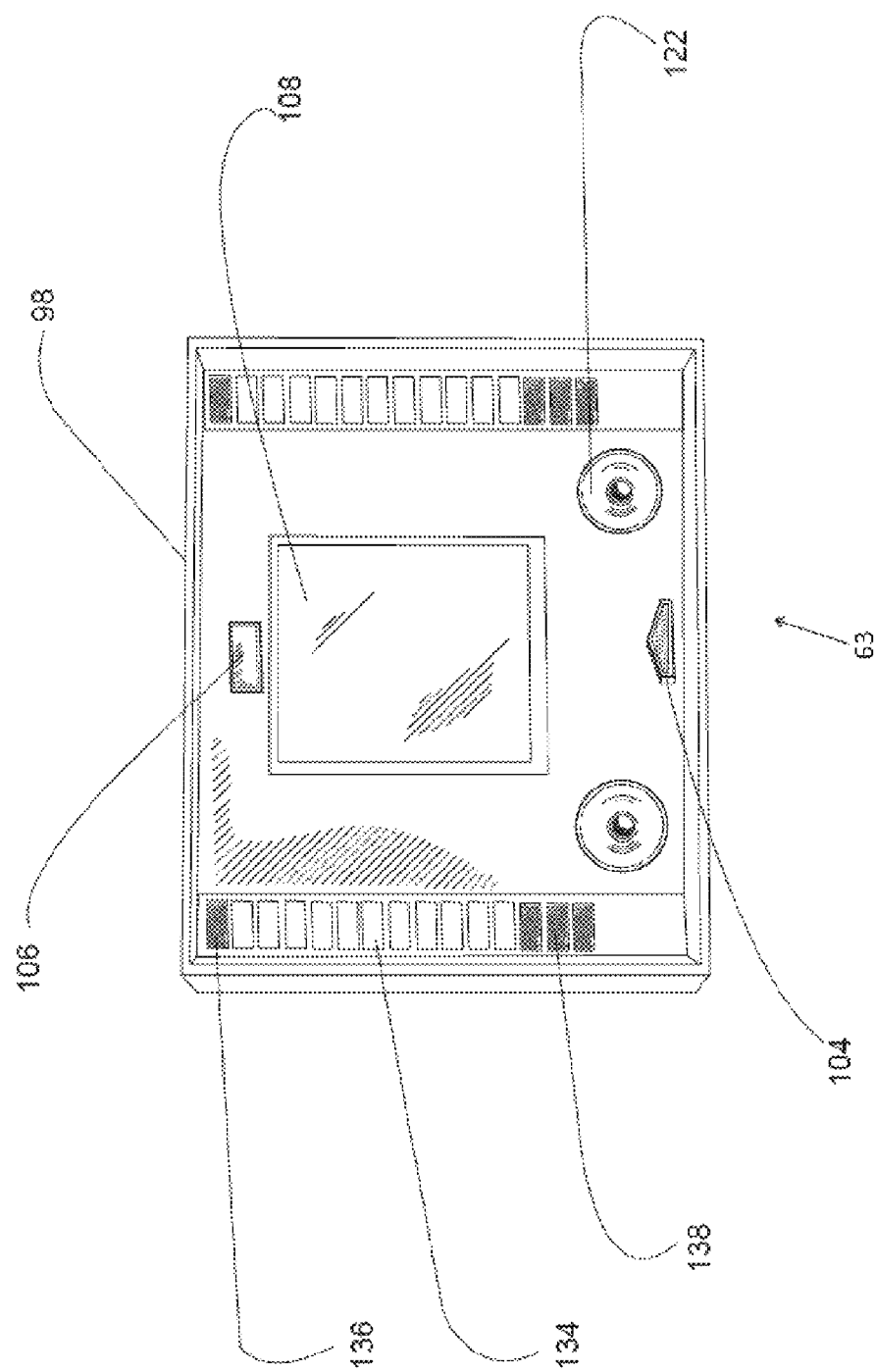
FIG. 5B is a perspective view of a sixth alternative embodiment of the invention.

FIG. 5B is a perspective view of a sixth alternative embodiment of the invention 63. In this embodiment, there is no ritual panel. Instead only a display panel is included 98. The display panel 98 comprises a screen 108, camera 106, microphone 104, speakers 122, and two progressive display frames 133. The software outputs a message on the screen 108 if an error is detected during ritual performance.

Figure 5C:
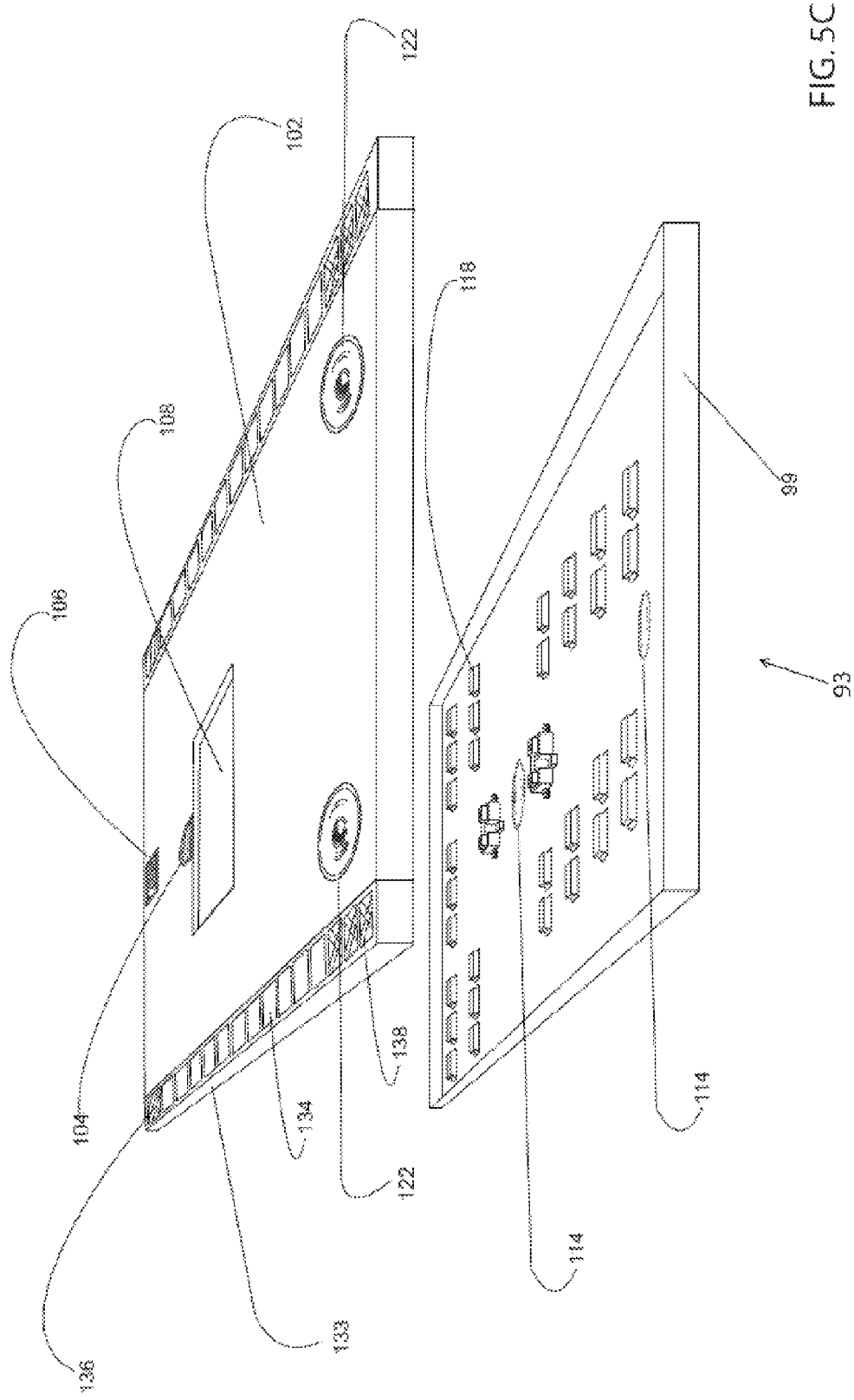
FIG. 5C is a perspective view of a seventh alternative embodiment of the invention.

FIG. 5C is a perspective view of a seventh alternative embodiment of the invention 93. In this alternative embodiment, the prayer panel 99 comprises a screen 108, speakers 122, and two progressive display frames 133. Each progressive display frame 133 comprises LEDs 146 of several different colors. For example, blue LEDs 136 may be used to indicate to the user that the day is a special religious day, the white LEDs 134 inform the user about the amount of time remaining for the current prayer time to expire. The red LEDs 138 may inform the user that the current prayer time has almost expired. In addition, the display panel preferably comprises a camera 106, and the prayer panel 99 preferably comprises a vibrating disc motor 114.

Figure 5D:
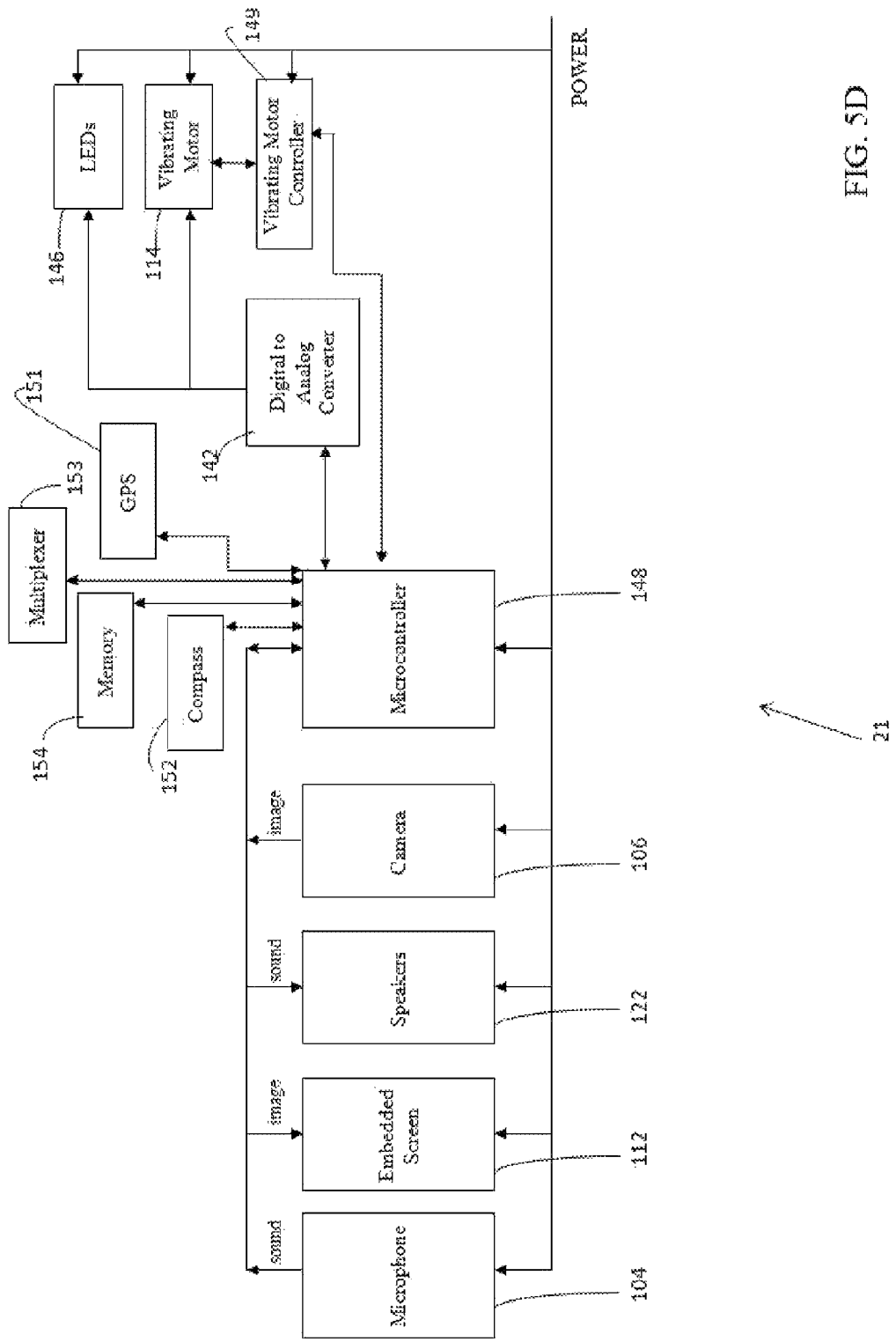
FIG. 5D is a block diagram illustrating a second alternative set of hardware components of the invention.

FIG. 5D is a block diagram illustrating a second alternative set of hardware components of the invention 21. In this second alternative embodiment, the microcontroller is connected to the camera 106. The camera 106 is used to detect user location and posture. As such, in these embodiments of the invention, there is no force, touch or proximity sensors involved.

Figure 5E:
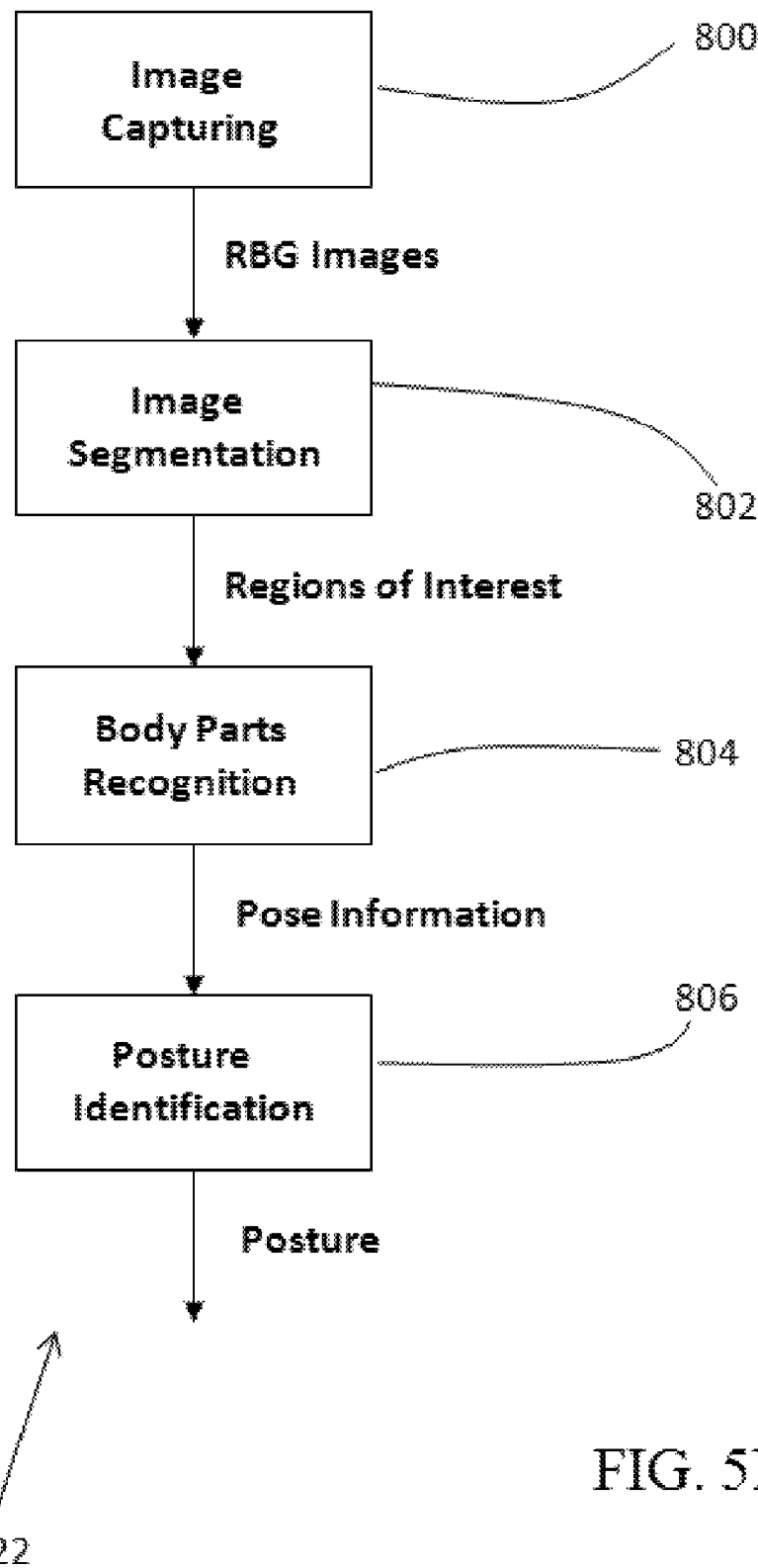
FIG. 5E is a flow chart for the steps performed to extract posture from one or more images.

FIG. 5E is a flow chart for the steps performed to extract postures from images 22. The camera continuously captures the user's posture (step 800). Next, the user's body is extracted from the image using image segmentation techniques (step 802). Next, an algorithm—described below—is used to detect the different parts of the user body (step 804). Finally, the current user posture is determined (step 806).

Figure 5F:
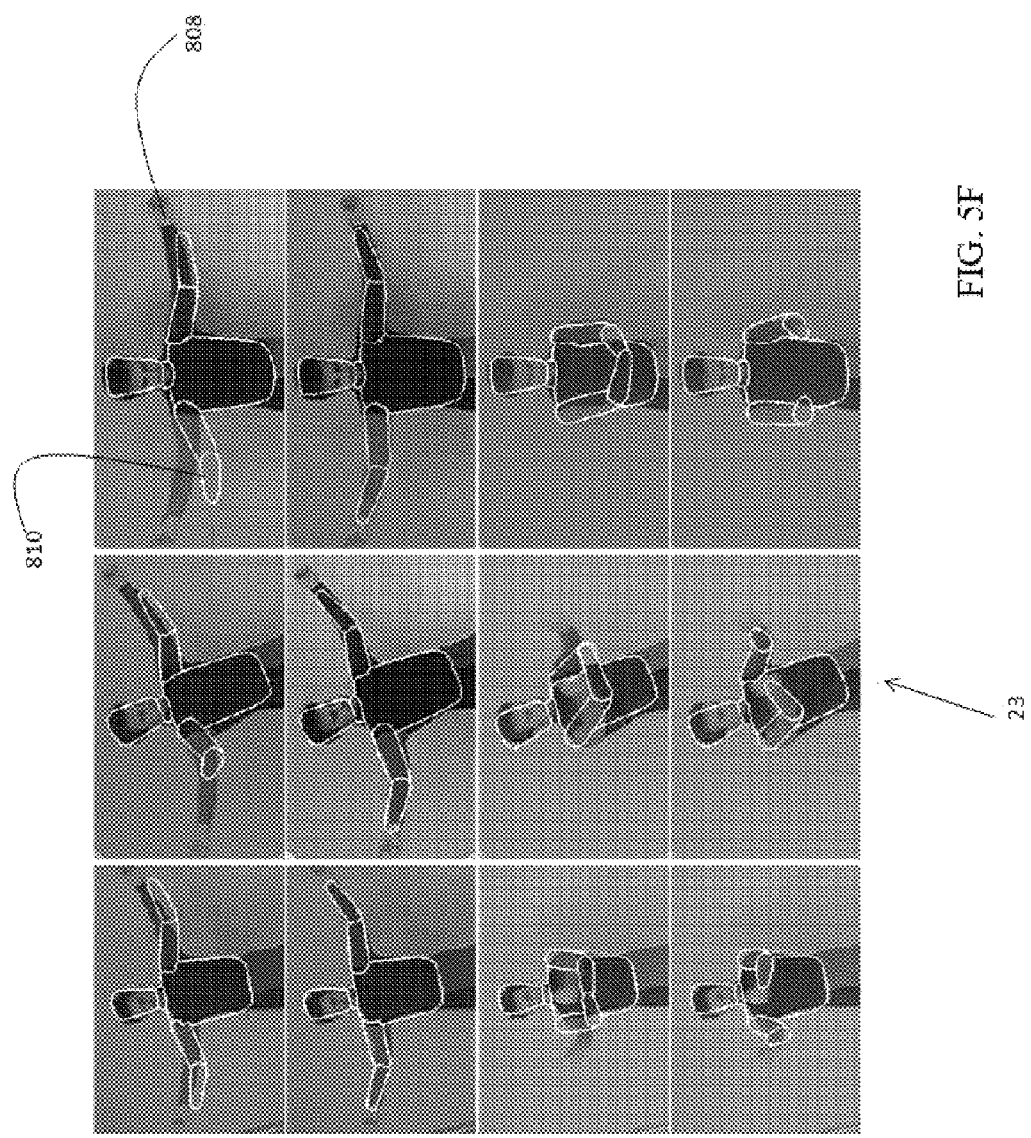
FIG. 5F is a screen shot of a user and detected poses using computer vision techniques.

FIG. 5F is a screen shot of user and detected poses using computer vision techniques 23. In this approach, pose recognition is considered as a classification problem and uses a dynamic time warping method to match a test sequence with several reference sequences representing prototypical activities. The posture detection software employed in the present invention projects a kinematic model associated with superquadrics on the image planes and performs a best-fit search using contours as a similarity measure. The features used for matching are various 3-D joint angles of the human body. Hence, the pose recovery is formulated as a search problem and a hierarchical decomposition approach is employed to cope with the high dimensionality of the search space. This approach has the potential to deal with limited occlusions, and thus to handle a greater range of body motions. Next, a kinematic model of the human body is employed. The kinematic skeleton is augmented with a skin composed of tapered superquadrics. The chains of tapered superquadrics are a good approximation to the external silhouette of the body. Tracking commences from a known initial configuration. Edge energy is used as the common feature space, and it is extracted from the image by a filter and rendered from the model. This posture detection technique is an example of an approach that attempts to build a 3-D model of the object being tracked—and executes the pose recognition using such model.

FIG. 5G shows an exemplary non-limiting step-description configuration file for usage with camera input 708. Each step is identified by a unique index which is listed in the first column. The second column provides a step name, followed by a column for every joint, describing the shape of the joint.

FIG. 5H shows an exemplary error-description configuration file 709. Each error has a unique index, a description, followed by a column for every joint, describing the shape of the joint.

Figure 6:
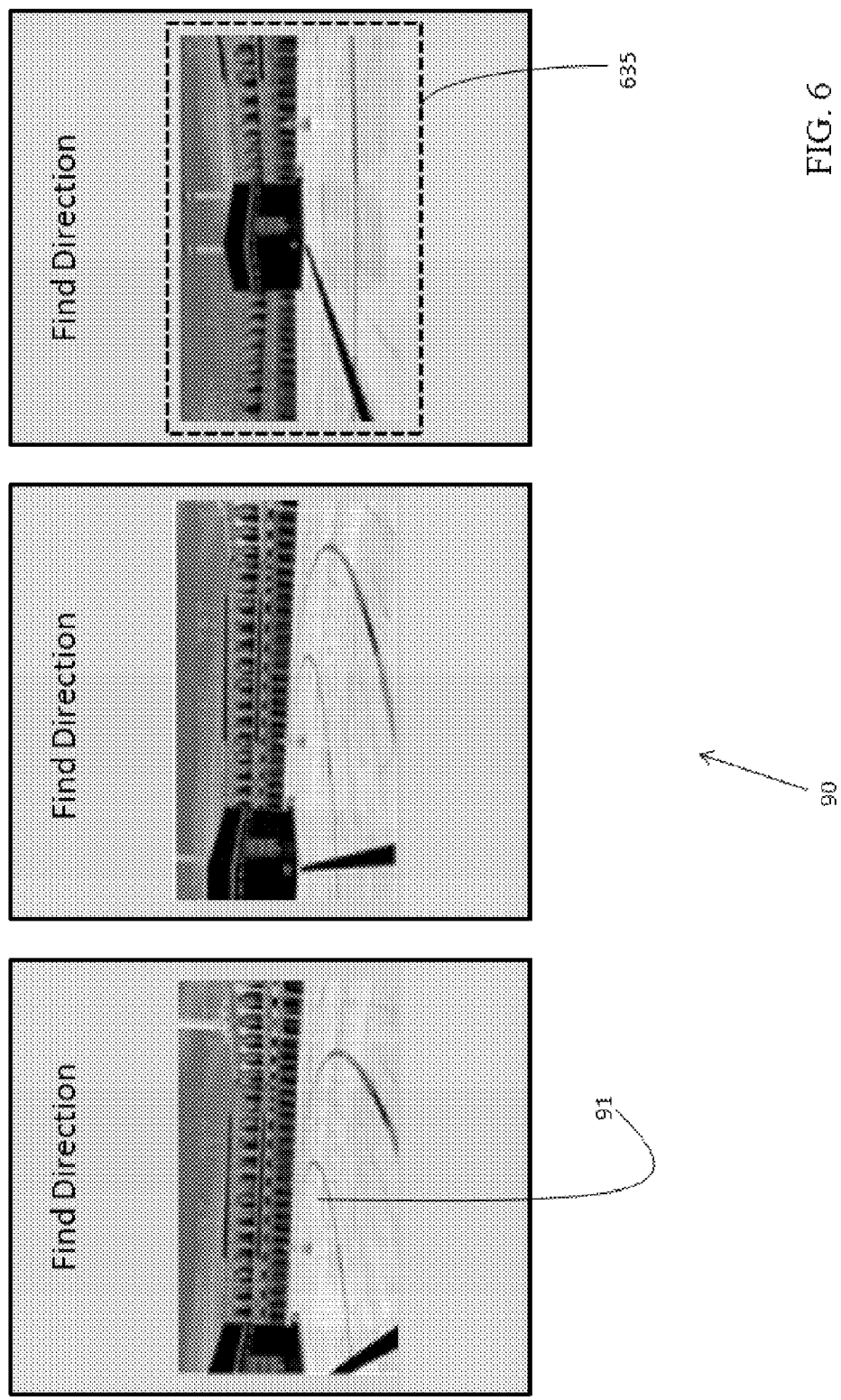
FIG. 6 shows a series of screen captures during direction finding task with a 3D image of target location.

FIG. 6 shows a series of screen captures 90 during direction finding task with a 3D image of target location. The user rotates the device and the image changes accordingly to indicate if the invention is pointing in the right direction or not. FIG. 6 shows a sequence of views of a 3D model being changed due to user rotation. Once the invention is pointing in the right direction, an additional rectangle 635 is displayed on the screen.

Figure 7A:
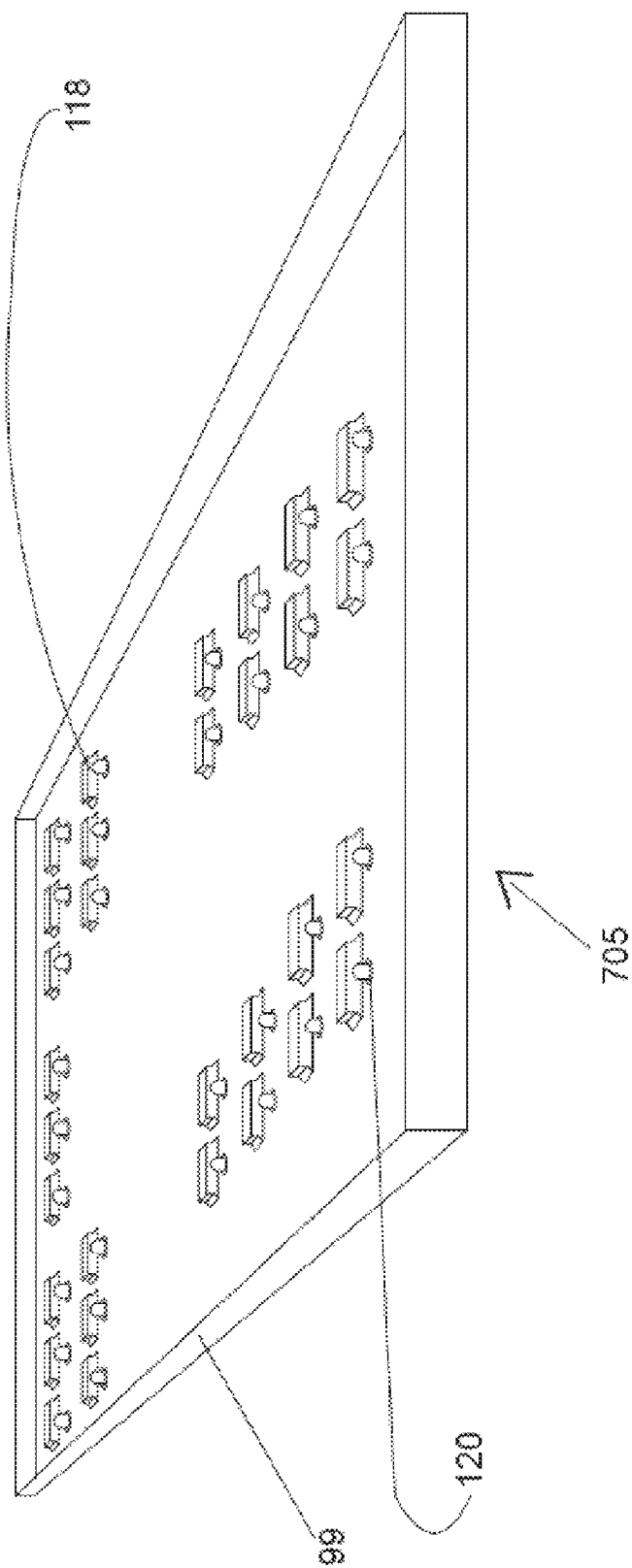
FIG. 7A shows a perspective view of a ritual panel with feedback LEDs.

FIG. 7A shows a perspective view of a ritual panel that comprises feedback LEDs 705. For the purpose of illustration, only one LED is shown in FIG. 7A to be associated with each force sensor. The feedback LEDs 120 are preferably used to provide immediate feedback to the user regarding the amount of force applied and the location of contact. The LEDs 120 change colors as the user presses to indicate to the user if he/she is pressing in the wrong location or with the wrong force. As the user presses harder (i.e., exerts more force on the sensor), the light intensity increases signaling to the user the amount of force required. A set of colors are selected to indicate a wrong press location, correct press location, adequate force, less force and more force. A linear function is used to map the value read from the force sensor to the intensity of the light. LEDs emit increasingly more light as the amount of current that is provided to the LEDs also increases.

Figure 7B:
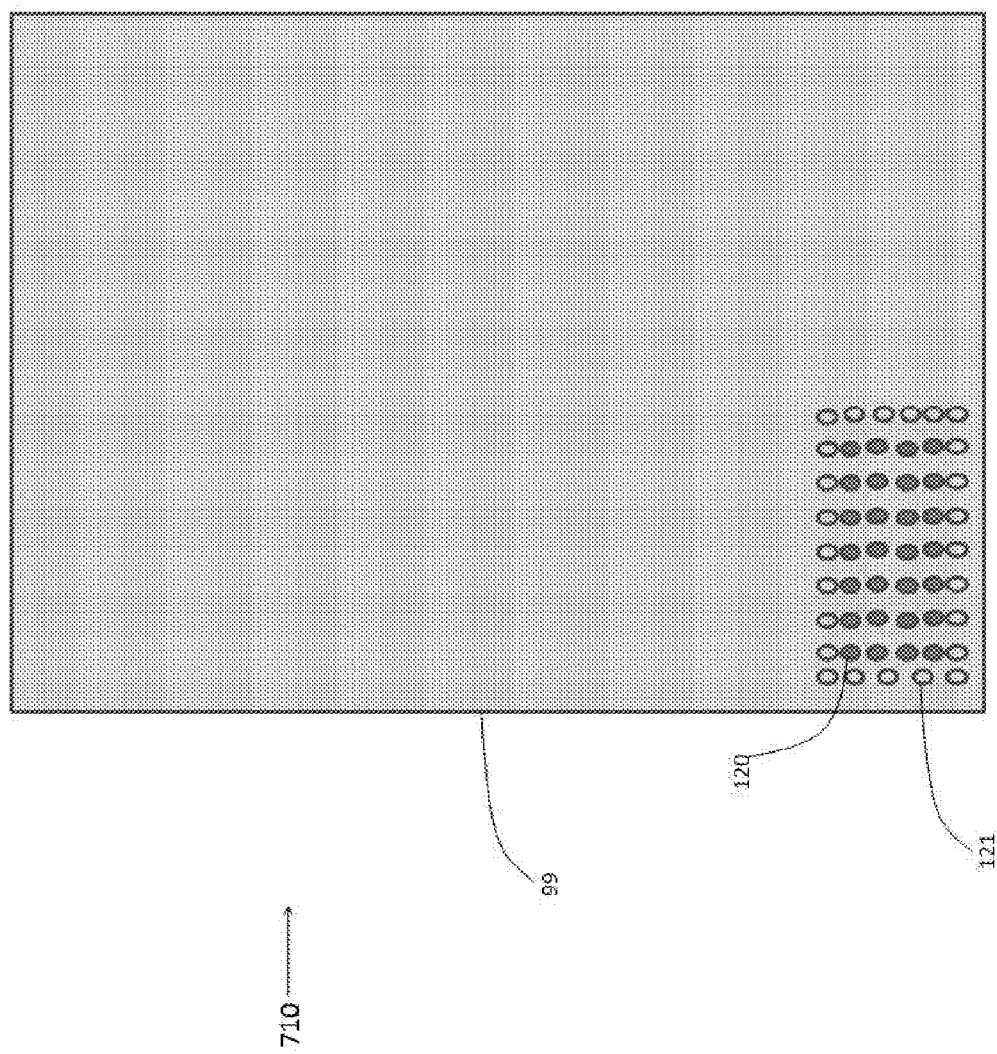
FIG. 7B shows a top view of a set of feedback LEDs with surrounding guiding LEDs.

FIG. 7B shows a top view of a set of feedback LEDs with surrounding guiding LEDs 710. The Guiding LEDs 121 emits a color to indicate to the user where he should place his/her body part. The feedback LEDs 120 are enclosed by the guiding LEDs 121. As the user presses with his body part, the intensity of the feedback LEDs 120 gradually changes with the intensity with the press. When the amount of press is adequate, the color of the guiding LEDs and feedback LEDS will be the same—signaling to the user that the correct amount of press has been achieved.

FIG. 7C shows a top view of a set of feedback LEDs with surrounding guiding LEDs 711, wherein the feedback LEDs take the shape of a body part.

Figure 7D:
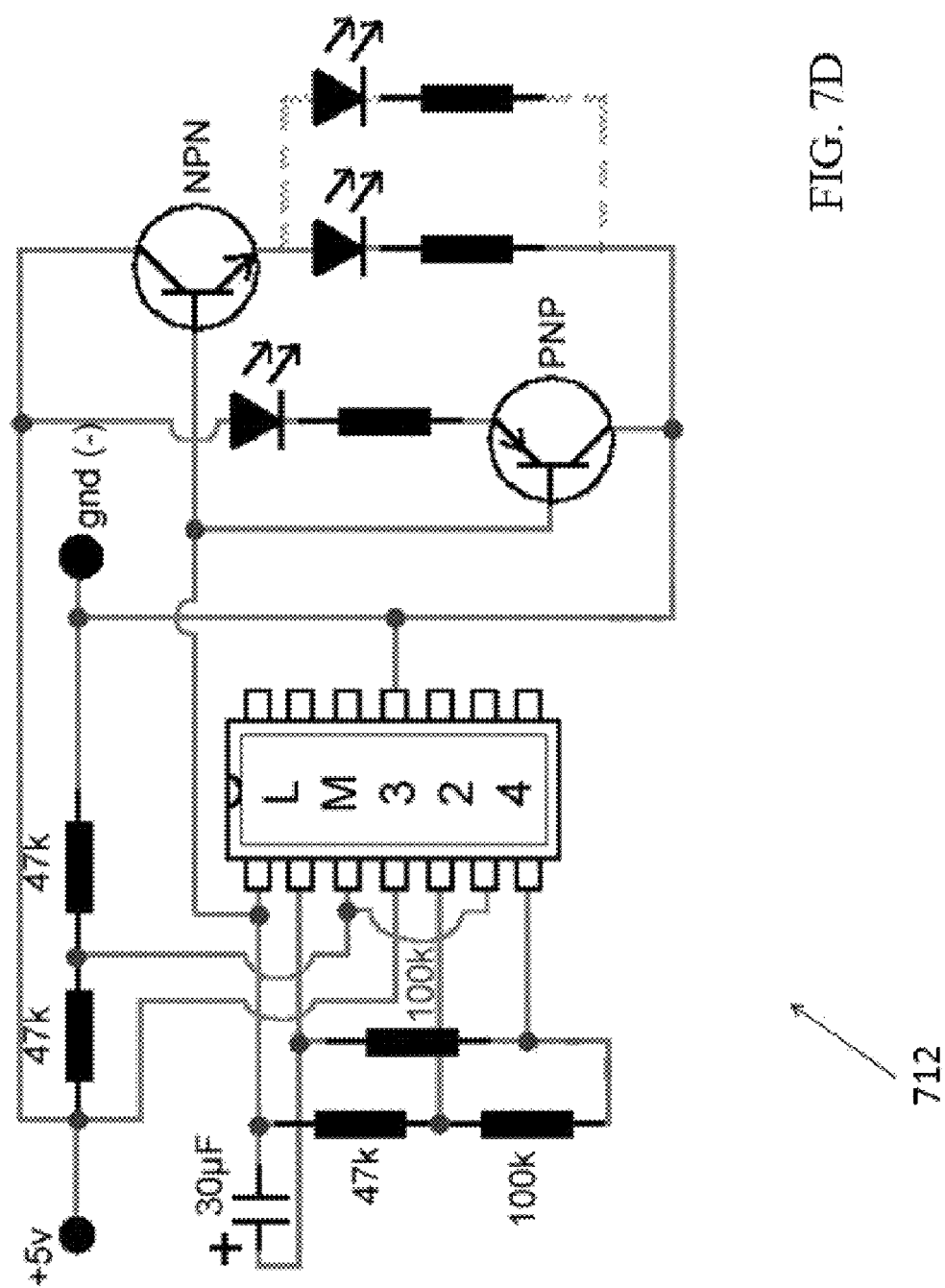
FIG. 7D shows a schematic for a circuit that controls the intensity of the LEDs.

FIG. 7D shows a schematic for a circuit that controls the intensity of the LEDs 712. In LM324, there are 4 operation amplifiers. Only two amplifiers may, optionally, be used, in order to preserve the option to build another similar circuit around the IC. This way, a second potentiometer may be employed to control the other circuit and its fading speed. In this schematic, the circuit comprising only one transistor and one LED is visible. Transistor is BC547 and the LED is ultra bright red with 220 Ohm resistor in series.

FIG. 8A is a perspective exploded view of an eighth alternative embodiment of the invention 94. In this embodiment, several users could use the device of the present invention at the same time, each using a dedicated unit. A display panel supporting multiple users 101 is used, which consists of multiple units, with each unit comprising a screen 108, microphone 104, and speakers 122. In addition, the display panel comprises an internal processor (not shown) that communicates with each of the units using standard communication protocols.

Figure 8B:
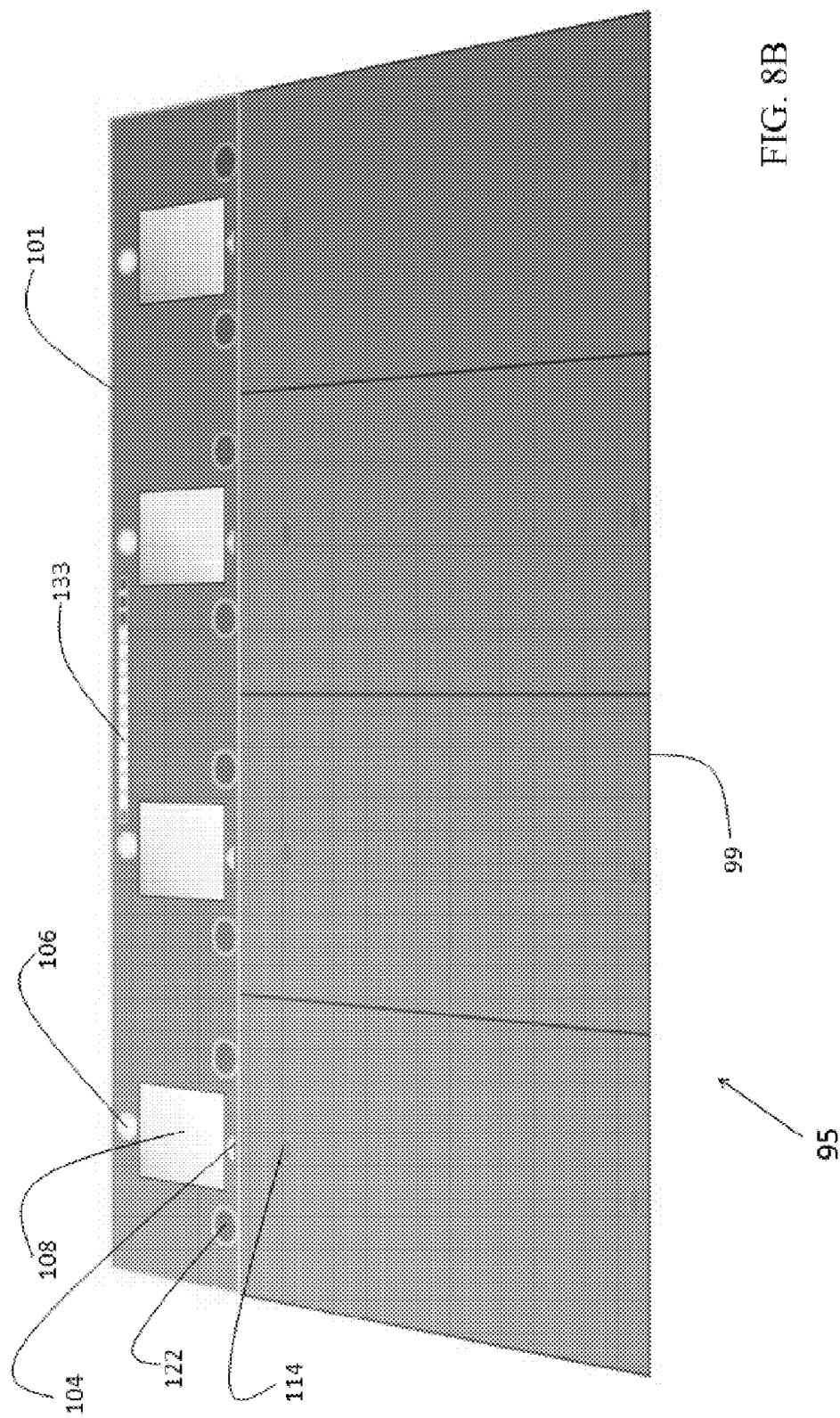
FIG. 8B is a perspective view of a ninth alternative embodiment of the invention.

FIG. 8B is a perspective view of a ninth alternative embodiment of the invention 95. In this alternative embodiment, each unit in the display panel comprises a camera to detect a user's posture—and the ritual panel only includes a vibrating disc motor.

Figure 8C:
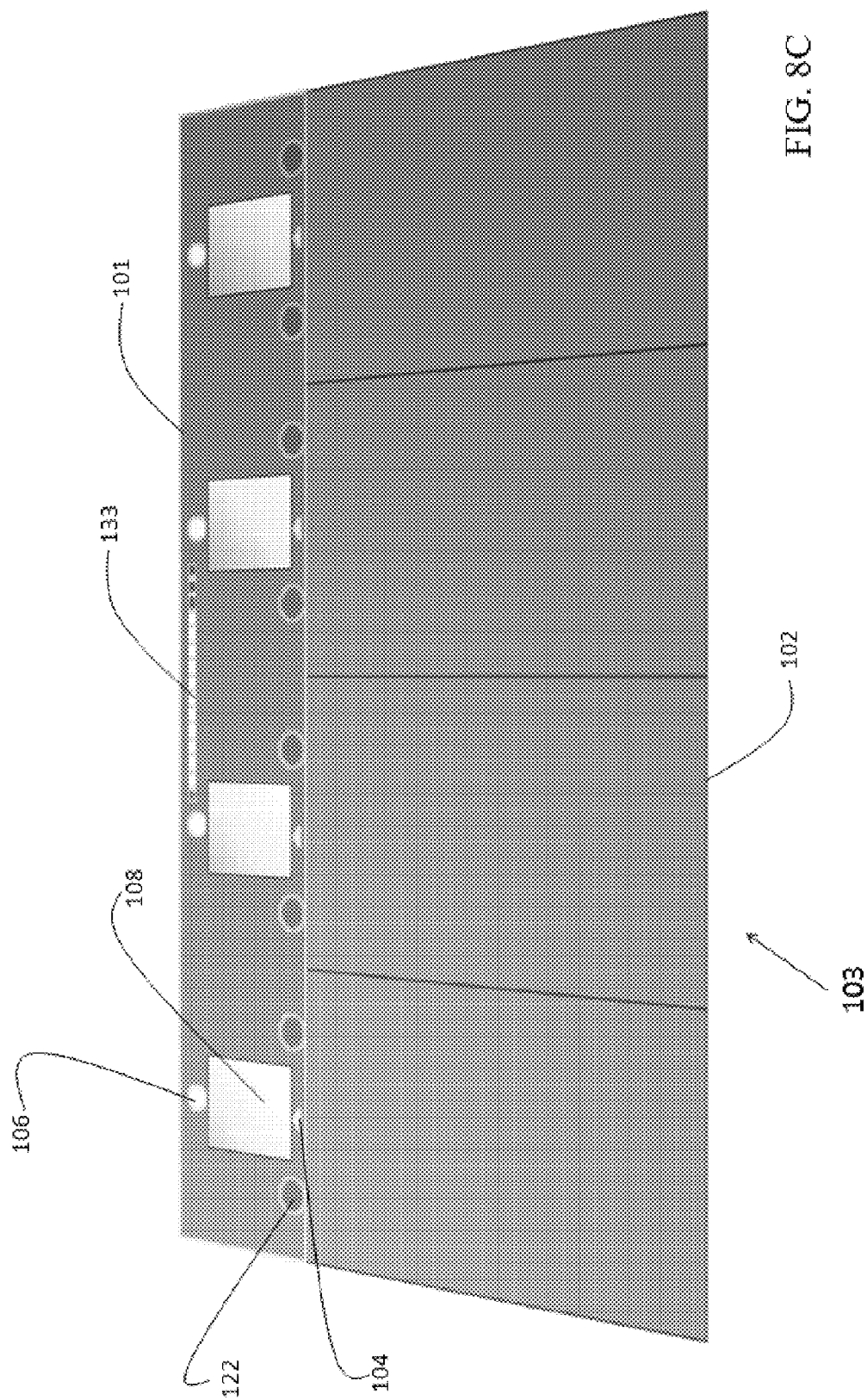
FIG. 8C is a perspective view of a tenth alternative embodiment of the invention.

FIG. 8C is a perspective view of a tenth alternative embodiment of the invention 103. In this alternative embodiment, there is no ritual panel. Instead, only a display panel is included 98. The display panel 98 comprises a screen 108, camera 106, microphone 104, speakers 122, and two progressive display frames 133. The software described herein is provided, which outputs a message on the screen 108 when, and if, an error is detected during a ritual performance. Each of the users would use a traditional prayer rug and stand in front of the device to perform a ritual.

Figure 8D:
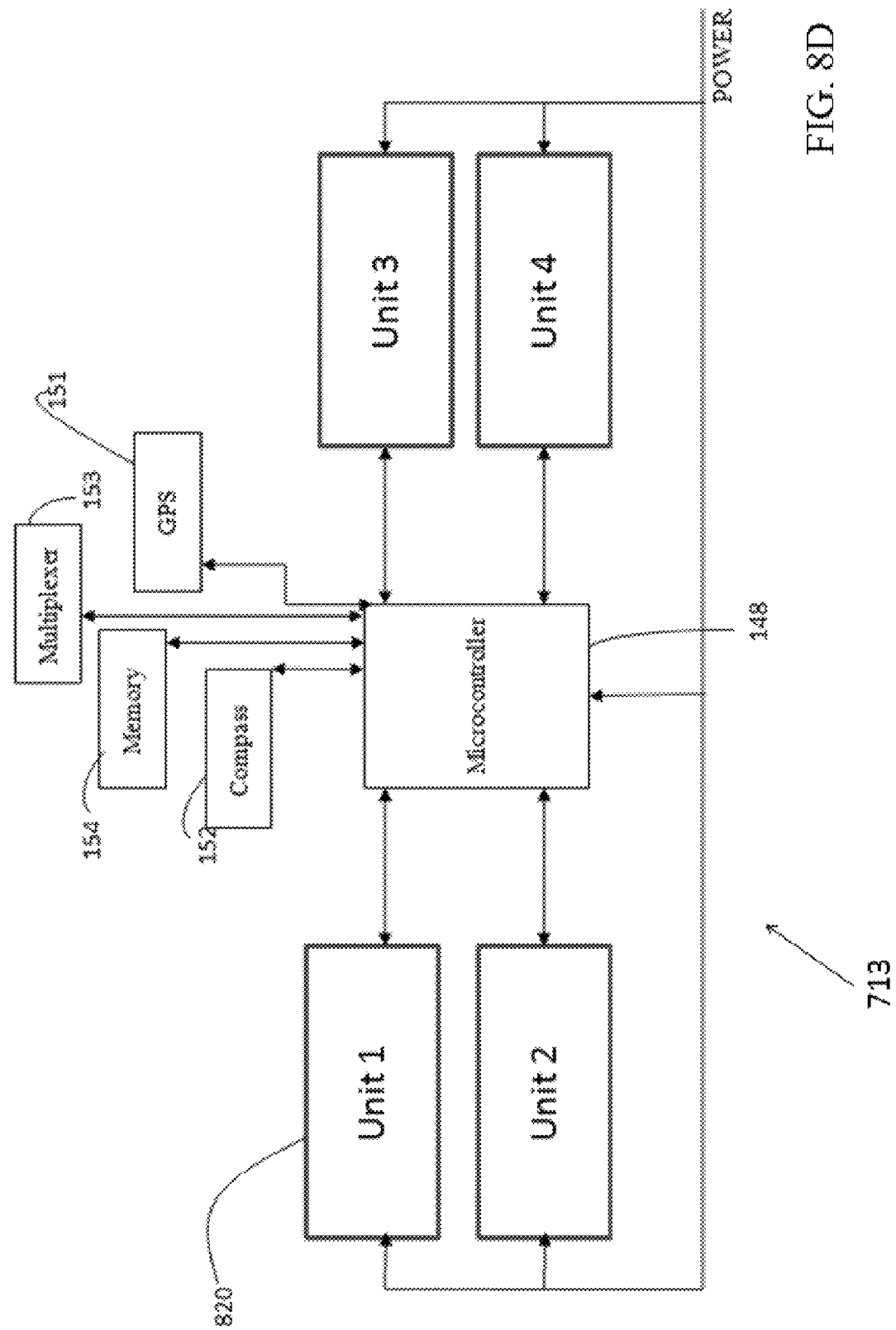
FIG. 8D is a block diagram illustrating a third alternative set of hardware components of the invention.

FIG. 8D is a block diagram illustrating a third alternative set of hardware components of the invention 713. Each unit in the multi-user version of the invention encapsulates a touch screen 108, speaker 104, and speakers 122. The microcontroller 148 multitasks between those units supporting all of user interaction. Those familiar in the art will immediately recognize how to use operating systems, such as Linux, to support such use of multi-terminals with a single processor 148.

Once the device of the present invention is switched on, the device displays a start screen and begins sampling the sensors. The device supports four exclusive modes, namely, prayer mode, camouflage mode, notification mode, and direction-finding mode. These various modes are described below.

Prayer Mode

In the prayer mode, the user interaction with the device is identical to a traditional rug. The user stands at one end of the device and perform the rituals. To avoid modifying the prayer ritual, every prayer posture is treated as a body gesture, which signals events to the interface. The device detects the user's postures using the embedded sensors. A finite state machine (FIG. 3J)—where every state represents a posture—is used to detect additions and omissions in the prayer. During prayer, the display operates in one of two modes, namely, scripture mode and camouflage mode. The scripture mode is active when the user is in the recitation state during which the adherent is expected to recite verses from the Quran. The displayed verses are either selected by the user before prayer, or by the device based on predetermined criteria. The device uses a set of parameters obtained from tradition to select chapters from the scripture pages, namely, ritual type, day of the week, and date. In addition, the user can specify the desired amount of time to spend in prayer. The verses are displayed automatically page-by-page and the user can interrupt at any time by moving to the next state. If the user performs an error during prayer, either by missing or adding a step, the two vibration disc motors embedded in the invention are used to alert the user to the error.

Camouflage Mode

The interface switches to the camouflage mode once the user is not in the recitation state. In this mode, the screen displays a blank image (FIG. 4E)

Notification Mode

The device of the present invention comprises an ambient display made of two light bar displays 133 placed on the sides. The light frames are used as a progress bar to notify the adherent of the time remaining before the current prayer time interval ends. Each of the light frames has white LEDs embedded inside. As time progresses, the white LEDs are switched on to alert the user. In the last half hour, red LEDs are used to communicate a sense of urgency. After the adherent performs the current required prayer, the ambient display is switched off until the next prayer time interval begins; hence, the display acts as a memory aid tool in case the adherent forgets whether he/she performed the prayer. The display also includes support for special events notification. Blue LEDs placed at one side of the light frame are switched on if any particular day or date has a religious significance.

Direction-Finding Mode

The device of the present invention switches automatically to a direction-finding mode if it is pointing away from a user selected location. Using an embedded electronic compass and knowledge of the current geographic location, the device determines the right direction. The invention uses a 3D model of the selected location (loaded from configuration files) to indicate to the user how close or far away the device is pointing from the right direction. The user rotates the device until the 3D model is located in the center of the screen. A locked-in cursor appears when the 3D model is centered in screen, indicating that the device is pointing in the correct direction. This technique has the advantage of combining the typical interaction one performs when trying to reorient a physical object towards a specific direction with the expected 3D visualization of an object when the viewer turns away from or towards it.

Among the improvements provided by the device of the present invention are:

The device is driven by the body postures prescribed by the religion or meditative practice rather than by traditional or new human-computer interaction techniques.

The device enhances the ritual experience by facilitating access to relevant ritual content (scripture, video, audio).

The device enhances the ritual experience by notifying the user of commission and omission errors during performance of ritual.

The device alerts the user regarding the onset of the next ritual-time and date.

The device aids the user by scheduling the ritual activity and also scheduling the viewing of ritual-related content. The device removes the burden of scheduling the rituals and viewing related content from the user.

For religions that require their adherents to face a specific location, the device supports locating geographic directions.

The device enables the user to read instructions during activity that is otherwise inaccessible to him/her.

The device does not violate relevant religious rules by not adding any new body gesture and by avoiding the modification of the ritual sequence, yet enables the user to enhance the quality of the practice. Similarly, the device does not violate the meditative rules by not adding any new body gesture or modifying the sequence.

The device enables the user to schedule the reading of instructions according to the user's own schedule.

The device detects errors in activity, hence, enhancing the quality of activity.

The device notifies the user with onset of activity time using a non-intrusive means.

The device supports displaying content and its translation and transliteration.

The device uses vibration to signify that errors have occurred, hence it does not interrupt the user's concentration—a vital requirement for ritualistic practices.

The device utilizes a touch screen. As such, there is no need for the user to learn how to work with graphical user interfaces using a mouse or keyboard.

The device enables the user to track the performed and missing prayer, thereby enabling the user to fulfill his/her religious duties.

The device is based on the traditional prayer rug; thus, the user is not required to learn how to work with a new tool.

The device uses the prayer postures and sequence as the input events, which avoids the introduction of changes into the religious ritual.

The device provides a new visualization technique for location direction using GPS and compass chips.

The device provides a new device for assisting users in performing religious rituals.

The device provides a new feedback mechanism for teaching users where and how much to press using a light emitting diodes at location of press. The intensity of the LEDs change with the force applied by the user.

There are many alternative ways that the device of the present invention can be implemented. For example:

The screen could be of any size and resolution.

The device could use any GPS chip, for example, the Garmin GPS18 5 Hz.

In addition to Sharp GP proximity sensors, other sensors could be used.

In addition to the MLX90283 chip for the vibrating motor controller, other vibrating disc motors could be used.

Other types of force detection sensors could be used instead of the described force sensor, load cells, torque sensors, or pressure sensors. Those familiar in the art will immediately recognize how to connect such sensors to the primary circuit of the device.

The user interface could be designed differently.

The proximity sensors could be placed in the ritual panel or in the display panel.

The proximity sensors could be pointing with a predetermined angle instead of pointing straight up to detect the posture of the user.

The proximity sensor could be mounted on a moving head to take distance measurement of several proximity distances from the sensor to several areas in the user body.

The expansion slot is optional. The device shown and described herein is preloaded with a set of ritual description files—ready for use.

The prayer panel could be made of any number of layers.

The screen could be placed in landscape instead of portrait mode.

More than a single user could use the device at the same time. In this case, a larger prayer panel will be required and the graphical user interface needs to be modified to indicate the number of users performing the ritual.

Voltage-based sensors could be used instead of current-based sensors in the device.

Any combination of the input postures could be used.

Any type of energy source could be used.

Any type of sensors could be used to measure proximity.

Any type of sensors could be used to measure the amount of force exerted on the device by different body parts.

Different materials, sizes and interconnections can be used for all components shown and described herein.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. A device that is configured to train a user to perform a prayer ritual, which comprises:
    (a) a pad that includes a force sensor, which is configured to detect touch event data based upon when the user steps on the pad;
    (b) an infrared sensor or an ultrasonic sensor that is configured to detect proximity event data, which indicate a posture of the user based upon user proximity to specific areas within said pad; and
    (c) a computer that is configured to:
        (i) receive the touch event data and proximity event data;
        (ii) store data files, wherein said data files comprise religious scriptures and one or more specifications of valid steps and a valid sequence of steps correlated to one or more prayer rituals;
        (iii) process the touch event data and proximity event data;
        (iv) display said scripture to said user based upon a set of results of said processing, such that said user is able to read scripture during prayer; and
        (v) alert said user to any errors in said user's performance of the prayer ritual, as detected by said processing step.

2. The device of claim 1, wherein the pad is configured to detect the touch event data by (a) detecting a closure and opening of sets of contacts in at least one switch contained in said pad; (b) sensing a presence and absence of weight upon said pad; or (c) combinations of the foregoing.

3. The device of claim 1, wherein the infrared sensor or ultrasonic sensor is further configured to:
(a) acquire touch event data and proximity event data that indicate the posture of the user in a raw format; and
(b) pre-process said touch event data and proximity event data from raw format into a pre-processed format, prior to communicating said touch event data and proximity event data to said computer.

4. The device of claim 3, wherein the infrared sensor or ultrasonic sensor is further configured to filter or amplify said touch event data and proximity event data, which indicate the posture of the user.

5. The device of claim 3, wherein the infrared sensor or ultrasonic sensor is further configured to differentiate between data for an event of said user stepping on, and an event of said user stepping off, said pad.

6. The device of claim 5, which further comprises a camera for capturing images of the user while performing the prayer ritual.

7. The device of claim 6, wherein the computer is further configured to house a set of previously stored data files, which comprise valid postures and a valid sequence of postures required to perform the prayer ritual, stored parameters for identifying each valid posture, and scripture.

8. The device of claim 7, wherein the computer is further configured to detect user posture results by processing said captured images to extract a set of user parameters and comparing said user parameters to the stored parameters.

9. The device of claim 8, wherein the computer is further configured to:
(a) process said user posture results and displaying said scripture to said user based upon the user posture results, such that said user is able to read the scripture during the prayer ritual; and
(b) alert said user if, and when, an error has occurred in a performance of the prayer ritual, as detected by the processing step in paragraph (a) above.

* * * * *